US 8,269,923 B2

(12) United States Patent
Yamagishi et al.

(10) Patent No.: US 8,269,923 B2
(45) Date of Patent: *Sep. 18, 2012

(54) MULTILAYER DISPLAY ELEMENT AND METHOD OF FABRICATING THE SAME

(75) Inventors: Fumio Yamagishi, Ebina (JP); Junji Tomita, Kawasaki (JP); Hisashi Yamaguchi, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 124 days.

This patent is subject to a terminal disclaimer.

(21) Appl. No.: 12/561,635

(22) Filed: Sep. 17, 2009

(65) Prior Publication Data

US 2010/0097551 A1    Apr. 22, 2010

Related U.S. Application Data

(63) Continuation of application No. PCT/JP2007/055629, filed on Mar. 20, 2007.

(51) Int. Cl.
*G02F 1/1345* (2006.01)
*G02F 1/1347* (2006.01)
(52) U.S. Cl. ............ 349/74; 349/77; 349/149; 349/158; 349/176
(58) Field of Classification Search .............. 349/74, 349/77, 78, 115, 138, 149–152, 158, 176; 345/4; 439/74, 75, 67, 69
See application file for complete search history.

(56) References Cited

U.S. PATENT DOCUMENTS

| 5,729,312 | A  | 3/1998  | Yamagishi et al. |
| 6,961,111 | B1 | 11/2005 | Kuramasu |
| 2001/0046008 | A1 | 11/2001 | Ueda et al. |
| 2008/0068315 | A1 | 3/2008 | Kurosaki et al. |
| 2008/0068553 | A1 | 3/2008 | Tomita et al. |

FOREIGN PATENT DOCUMENTS

| EP | 1862847 A1 | 12/2007 |
| JP | 11-281983 A | 10/1999 |
| JP | 2001-306000 A | 11/2001 |
| JP | 2001-311952 A | 11/2001 |
| JP | 2002-169490 A | 6/2002 |
| JP | 2006-106516 A | 4/2006 |
| WO | 2006/100711 A1 | 9/2006 |
| WO | 2006/100713 A1 | 9/2006 |

OTHER PUBLICATIONS

European Search Report dated Jul. 14, 2010, issued in corresponding European Patent Application No. 07739072.2.
International Search Report of PCT/JP2007/055629, date of mailing Jul. 3, 2007.

(Continued)

*Primary Examiner* — Dung Nguyen
*Assistant Examiner* — Tai Duong
(74) *Attorney, Agent, or Firm* — Westerman, Hattori, Daniels & Adrian, LLP

(57) ABSTRACT

A multilayer liquid crystal display element has a plurality of data electrode layer-to-layer interconnects formed in a non-display area of a liquid crystal display panel for connecting data electrodes of liquid crystal display panels for R, G, and B to a plurality of data signal input terminals from layer to layer, and a plurality of scanning electrode layer-to-layer interconnects formed in the non-display area for connecting scanning electrodes of the liquid crystal display panels for R, G, and B to a plurality of scan signal input terminals from layer to layer.

16 Claims, 33 Drawing Sheets

OTHER PUBLICATIONS

Keizo Takeda et al.; "Multi Layer Color Reflection Type Liquid Crystal Display"; Monthly Display, p. 13-17, Jan. 2002.

Taiwanese Office Action dated Dec. 19, 2011, issued in corresponding Taiwanese Patent Application No. 096109560.
Search Report of R.O.C. Patent Application No. 96109560, dated of issue Dec. 19, 2011.

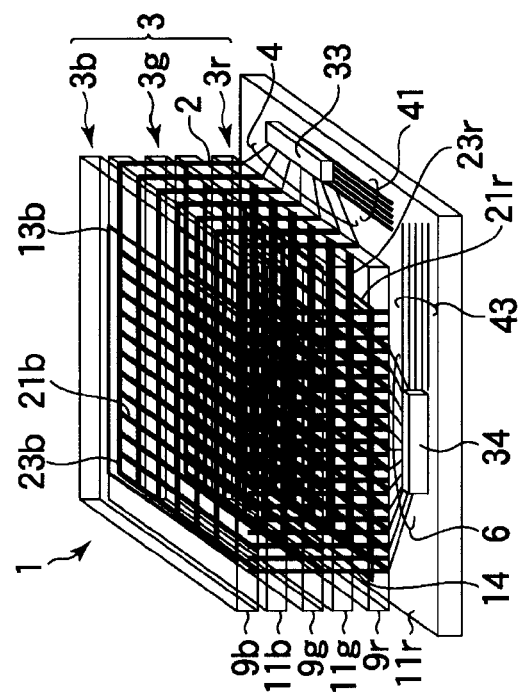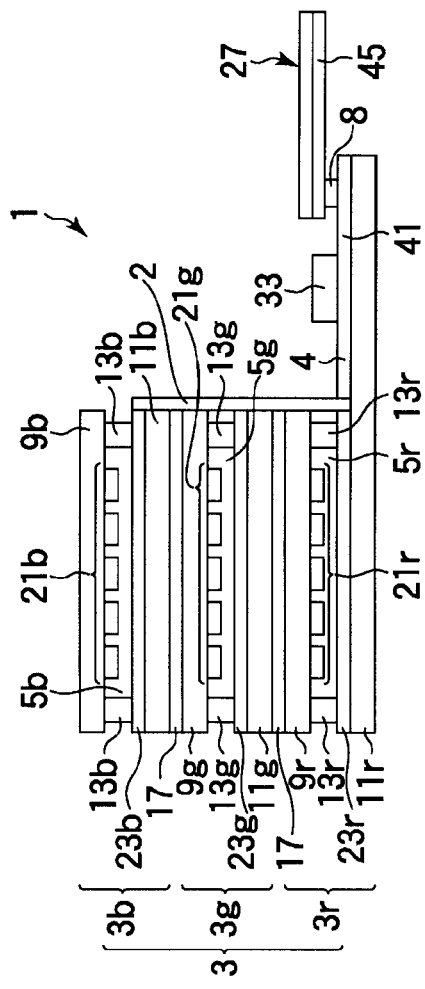
FIG.4A
FIG.4B

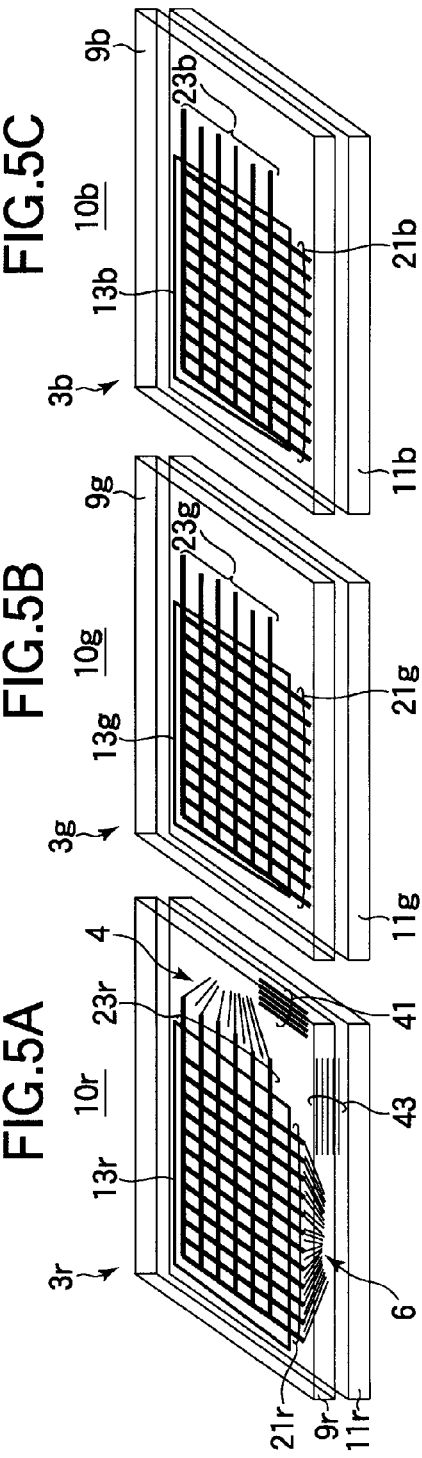
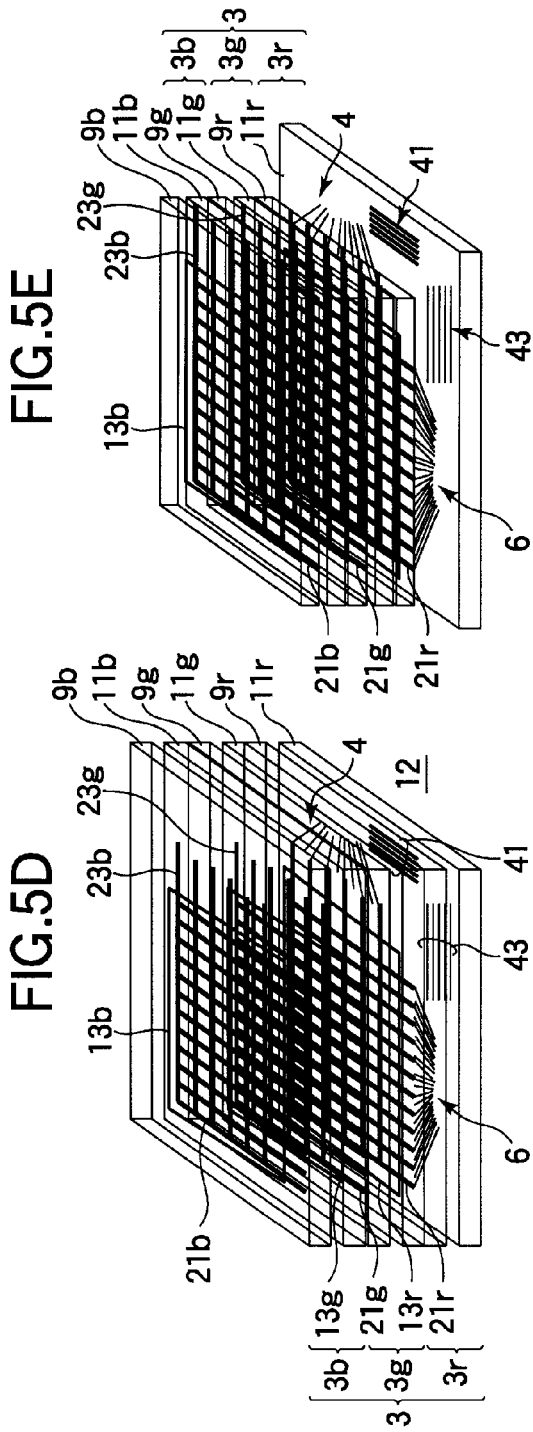

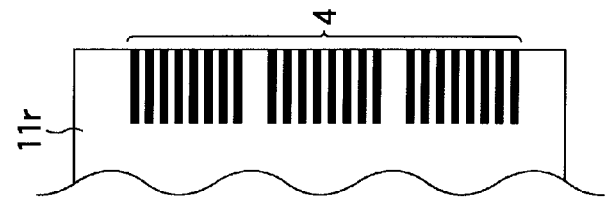
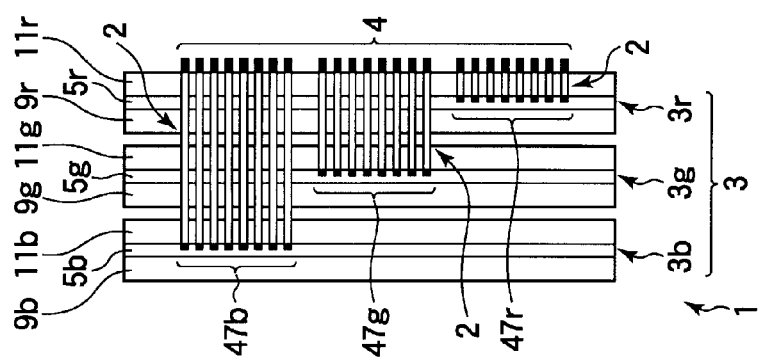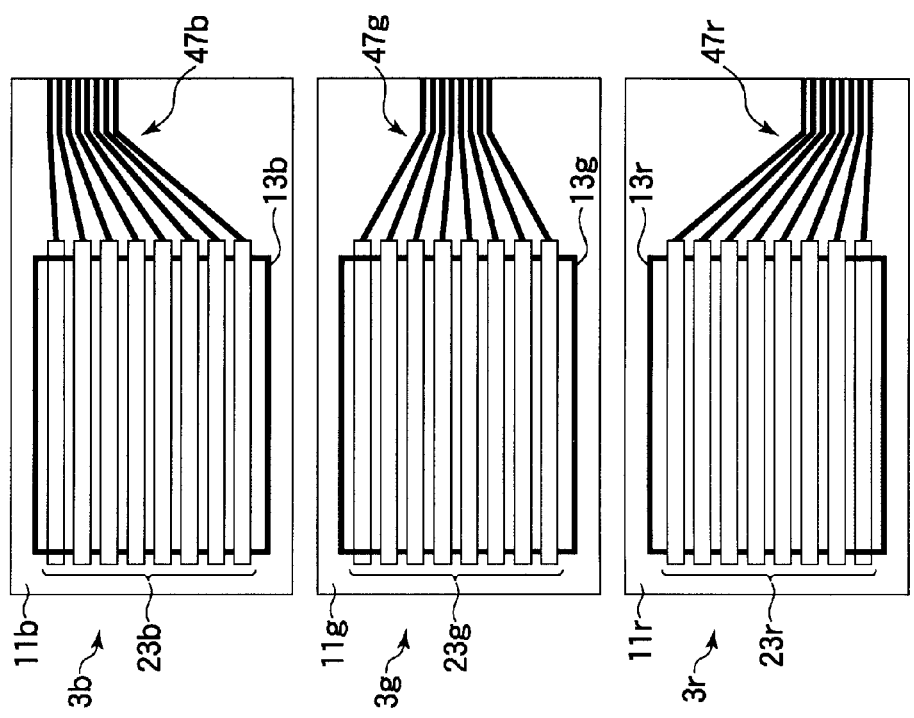

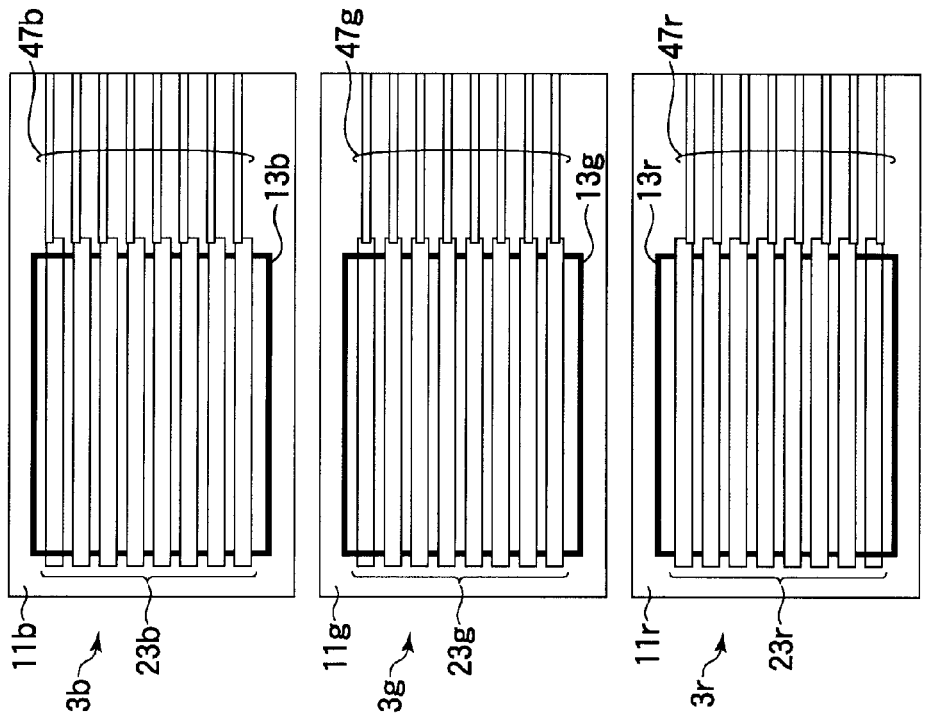
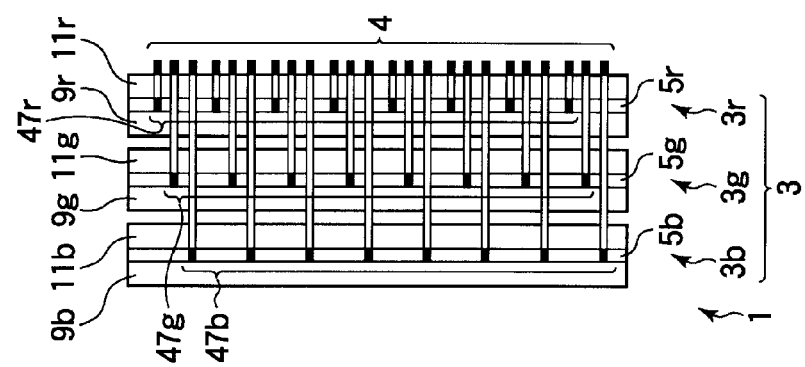
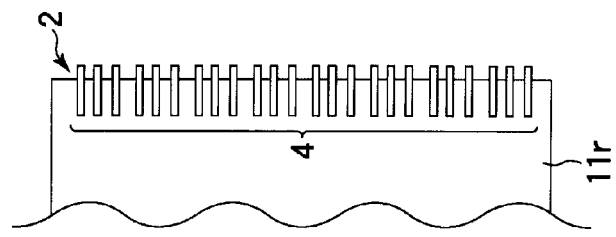

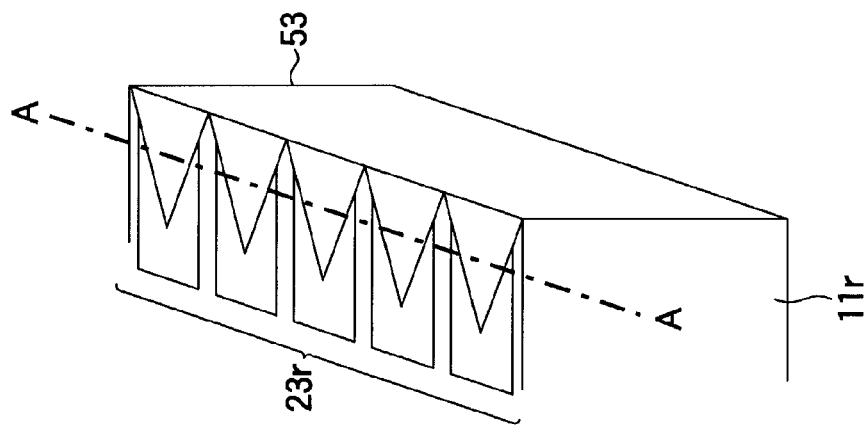
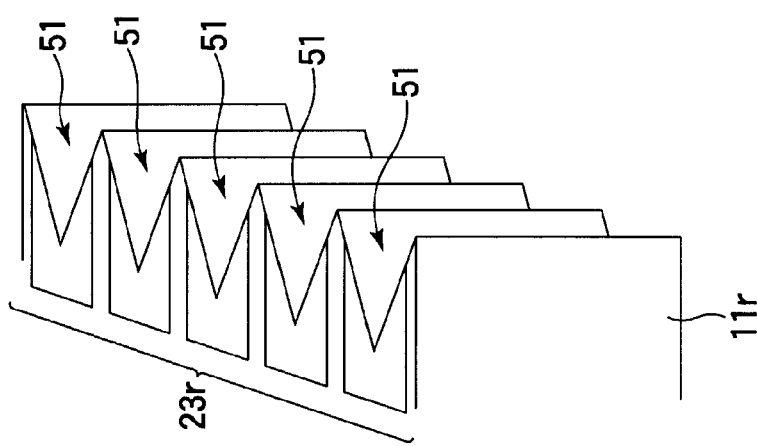
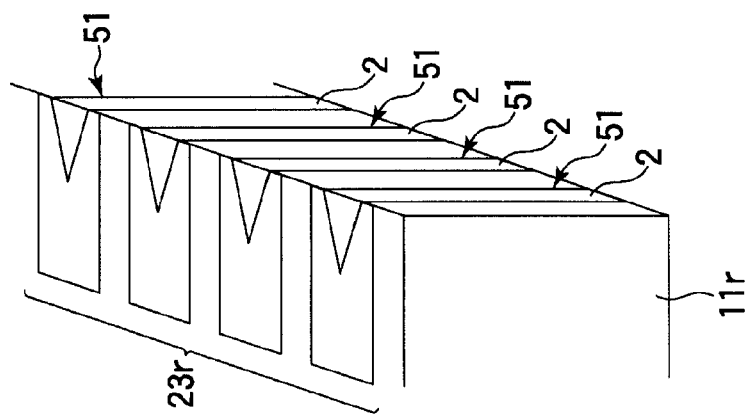

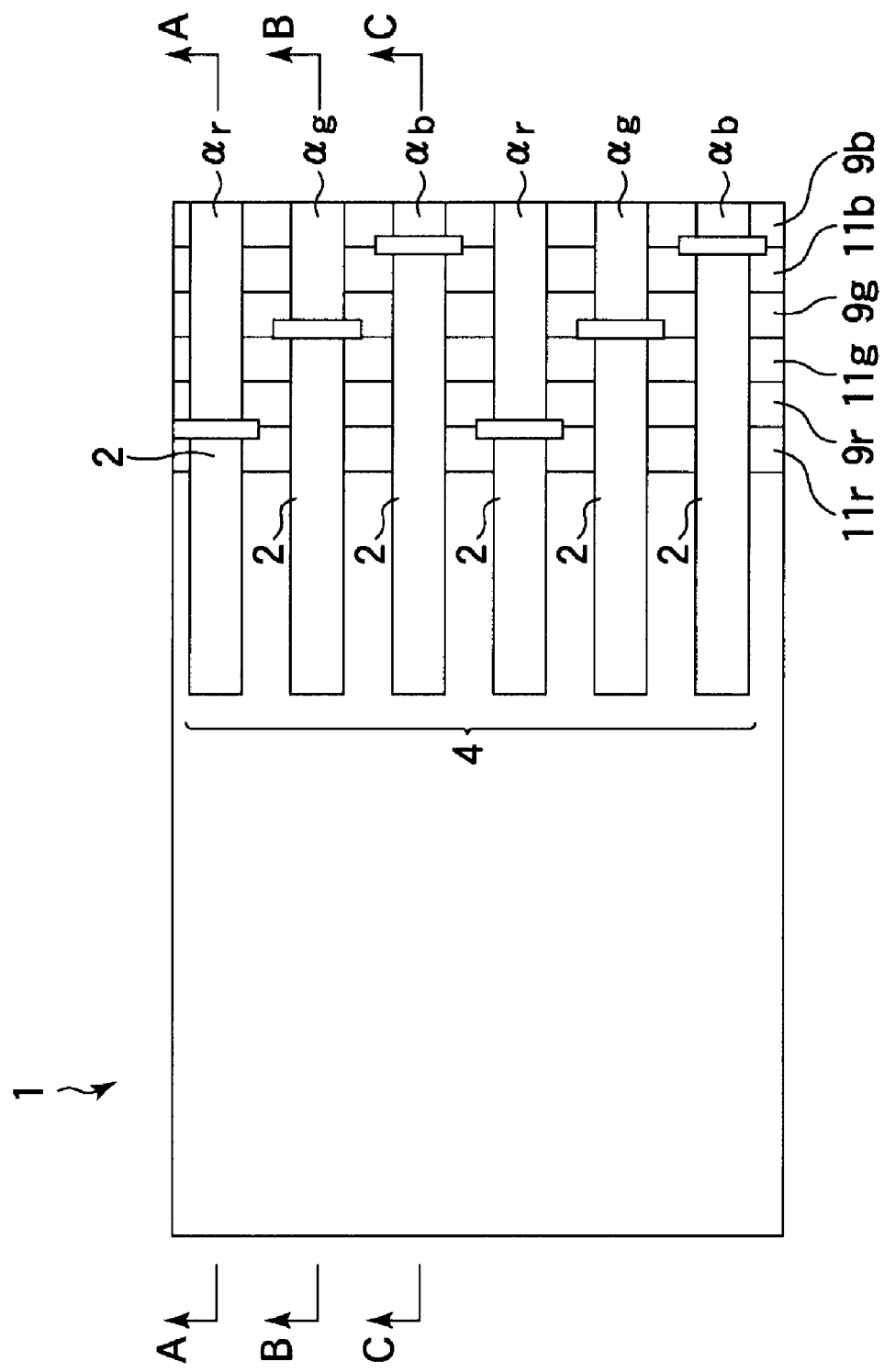

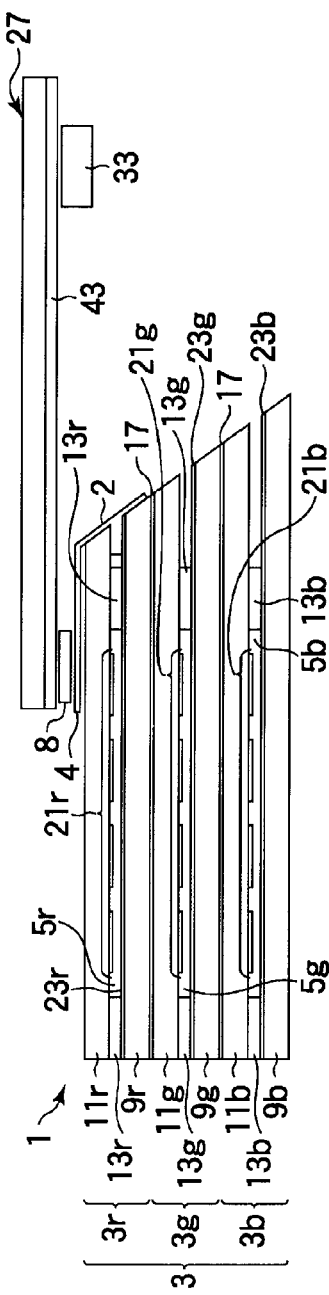
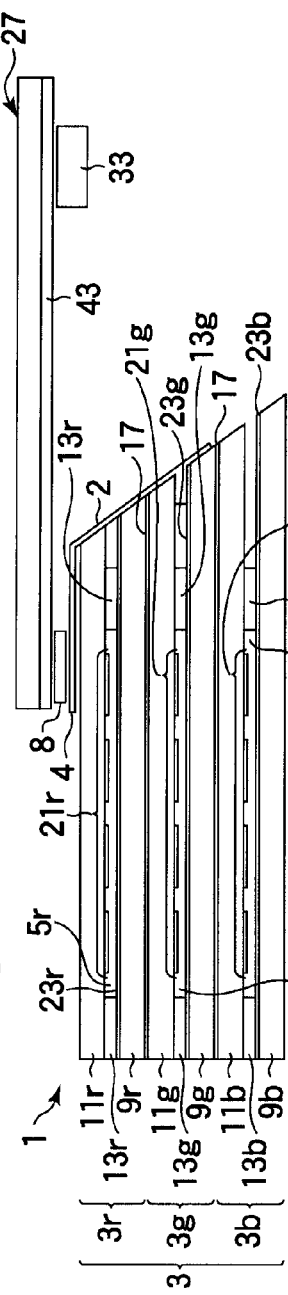
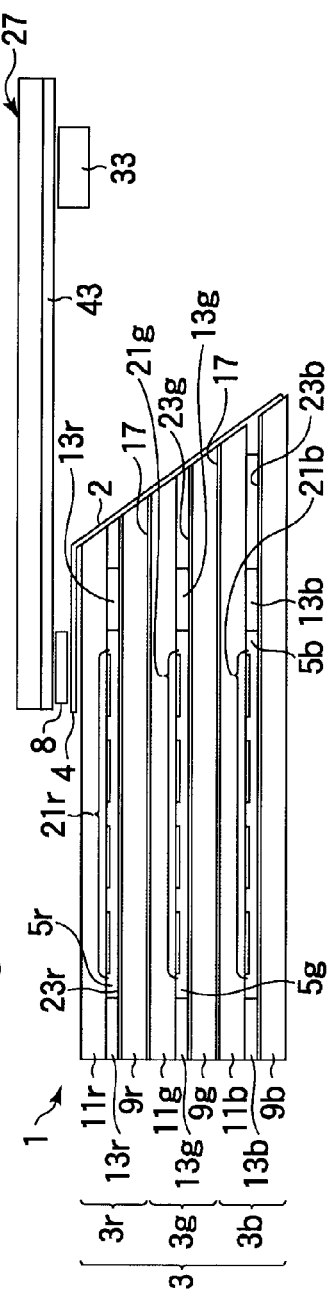

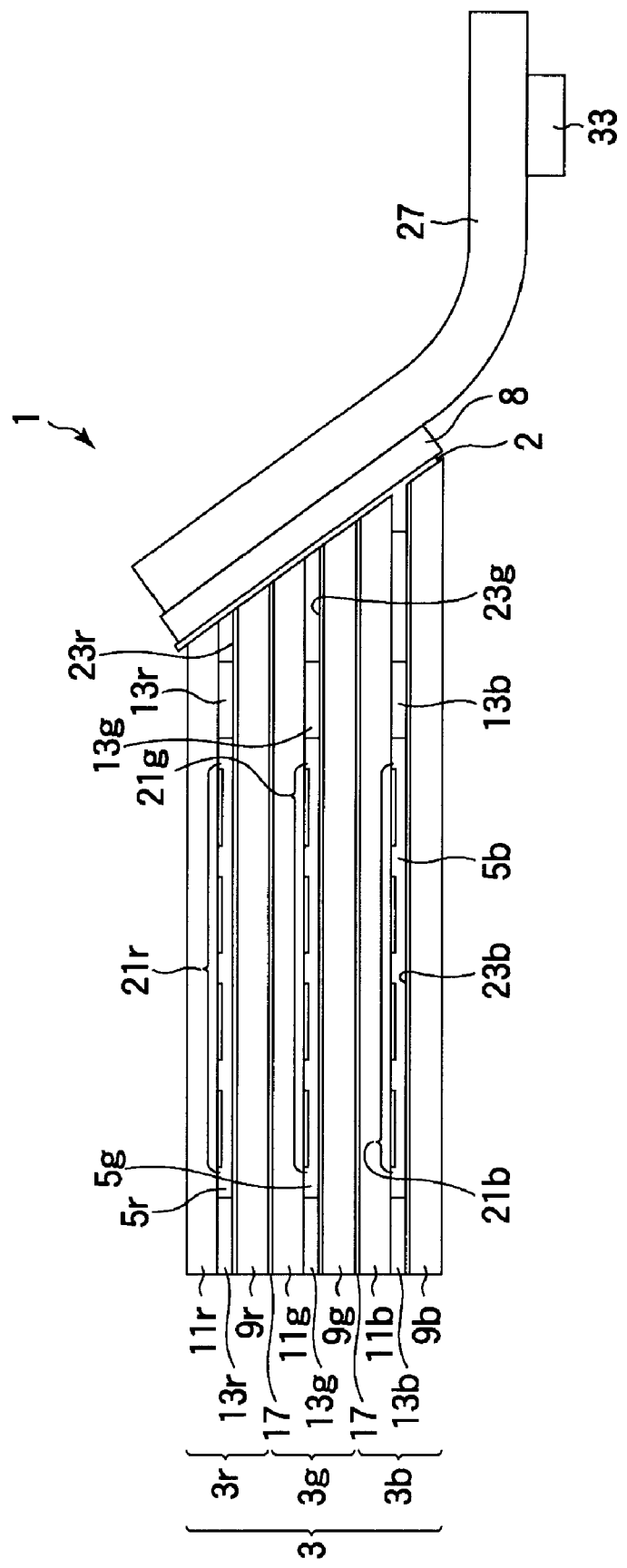

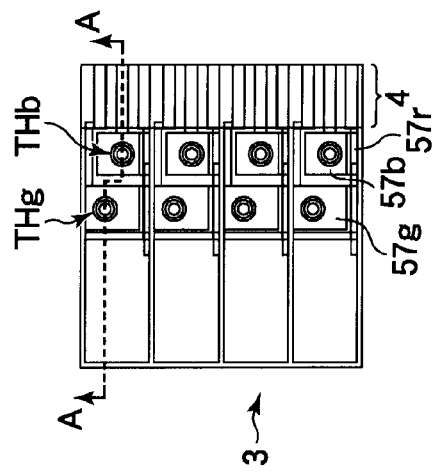
FIG.14A
FIG.14B
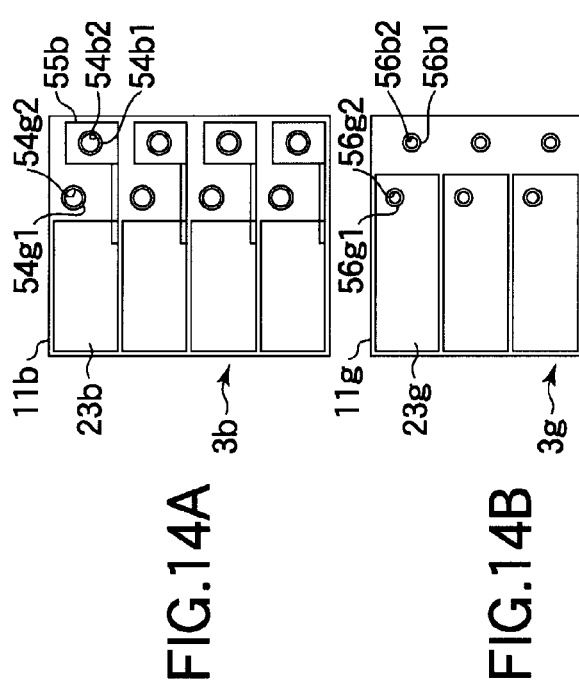
FIG.14C
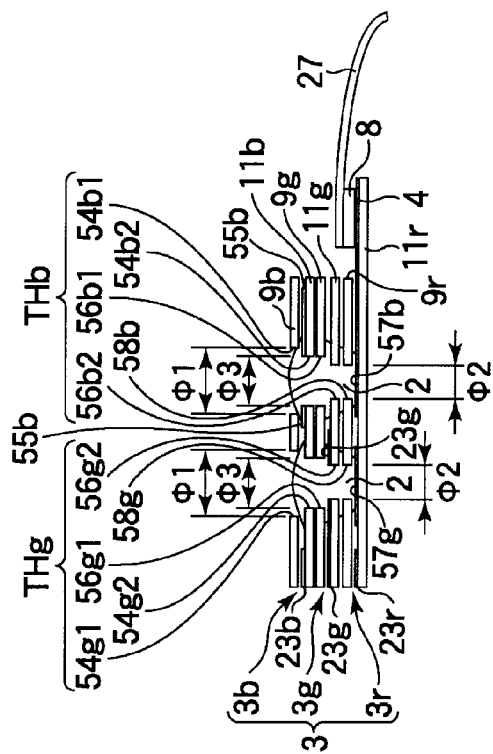
FIG.14D
FIG.14E
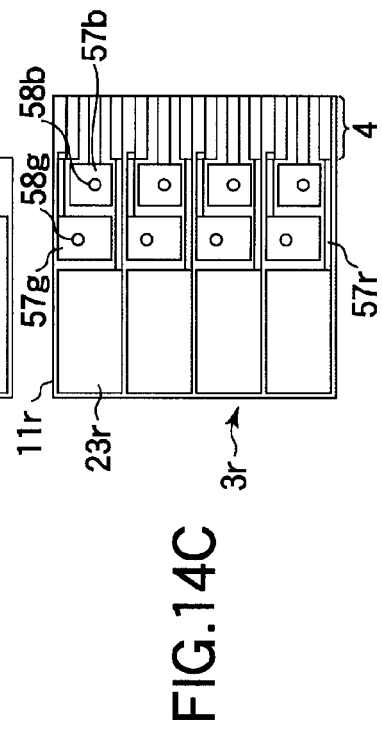

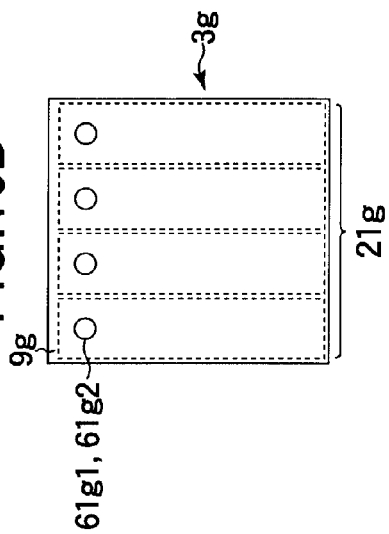
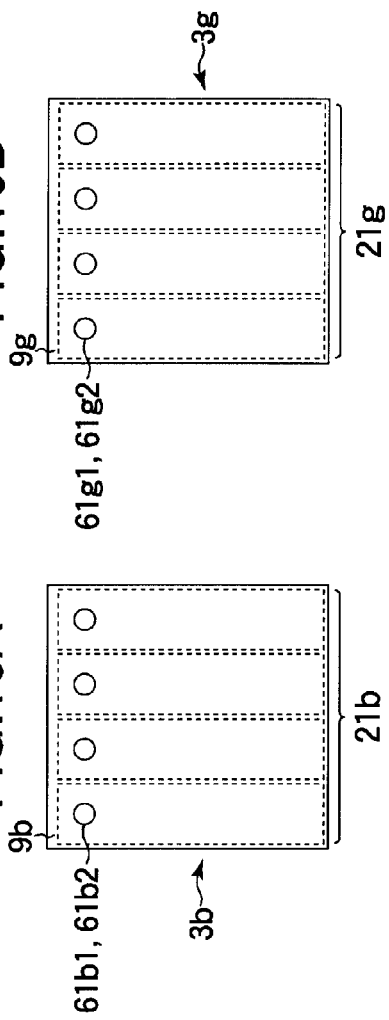
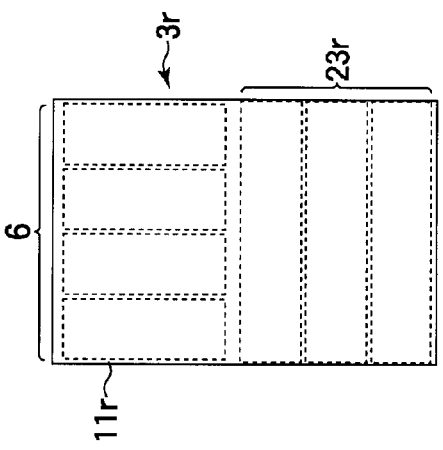
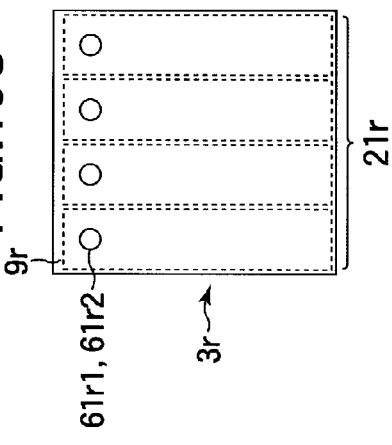

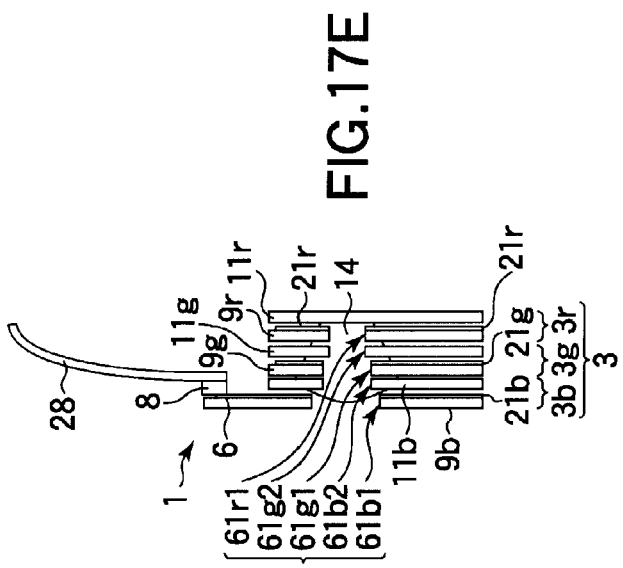
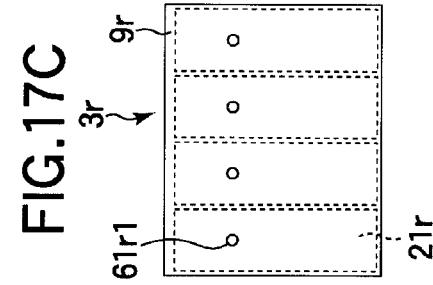
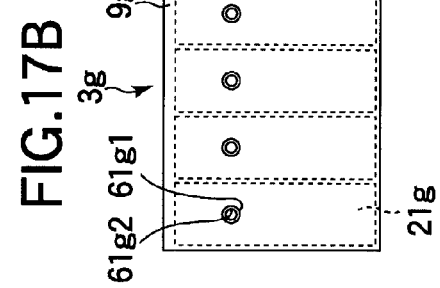
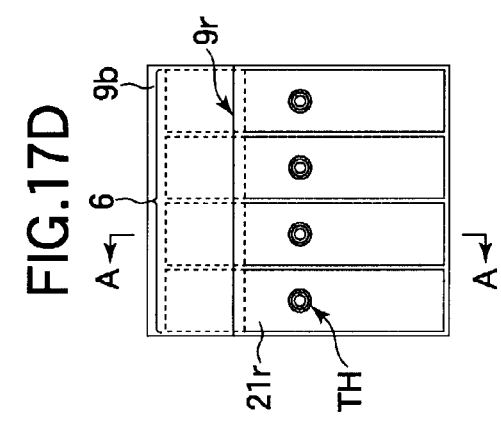
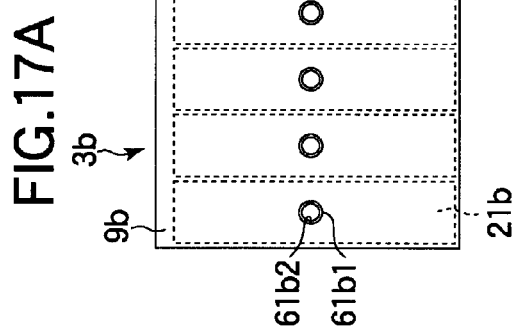

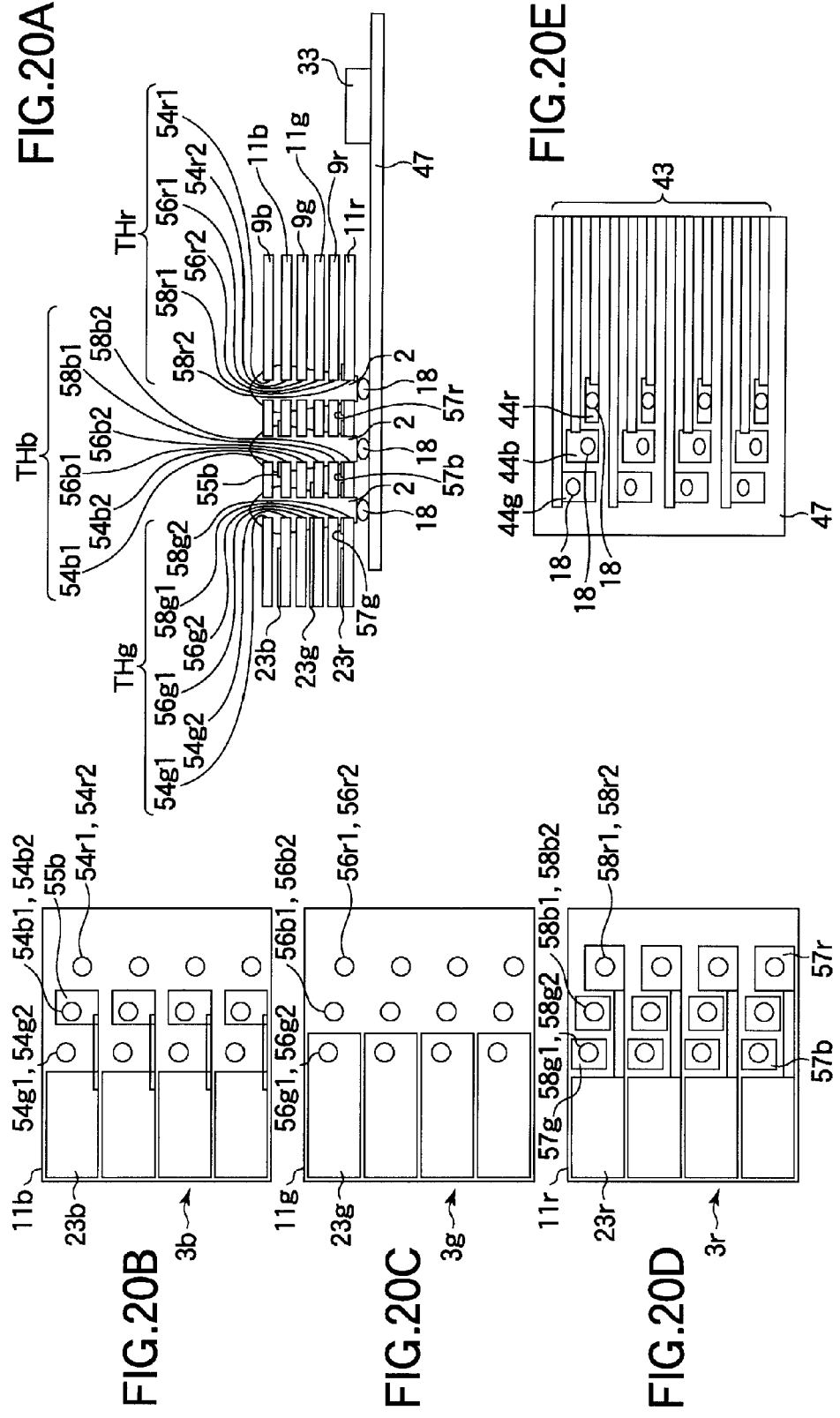

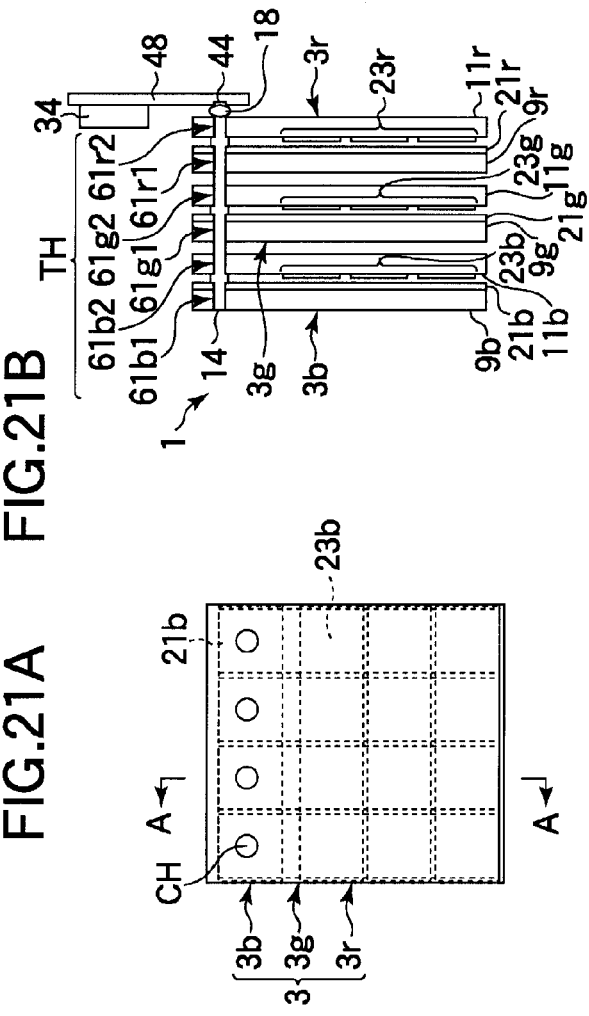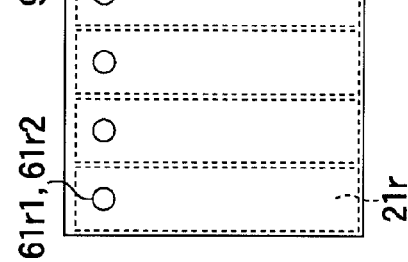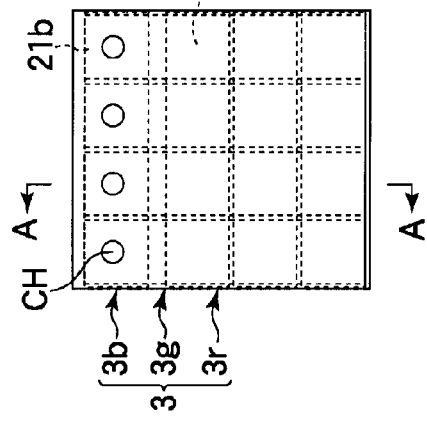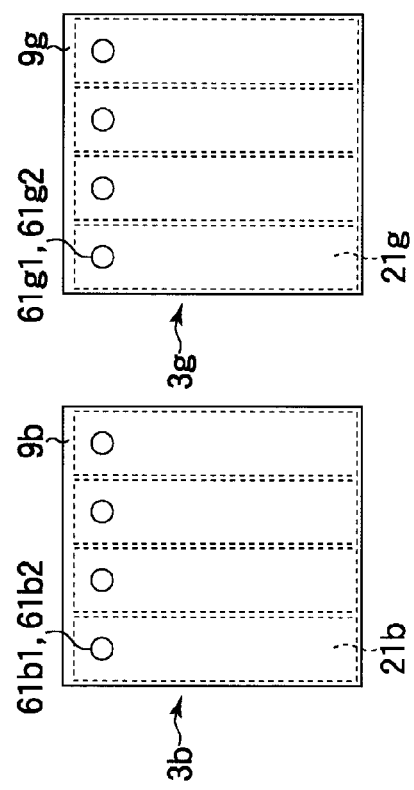

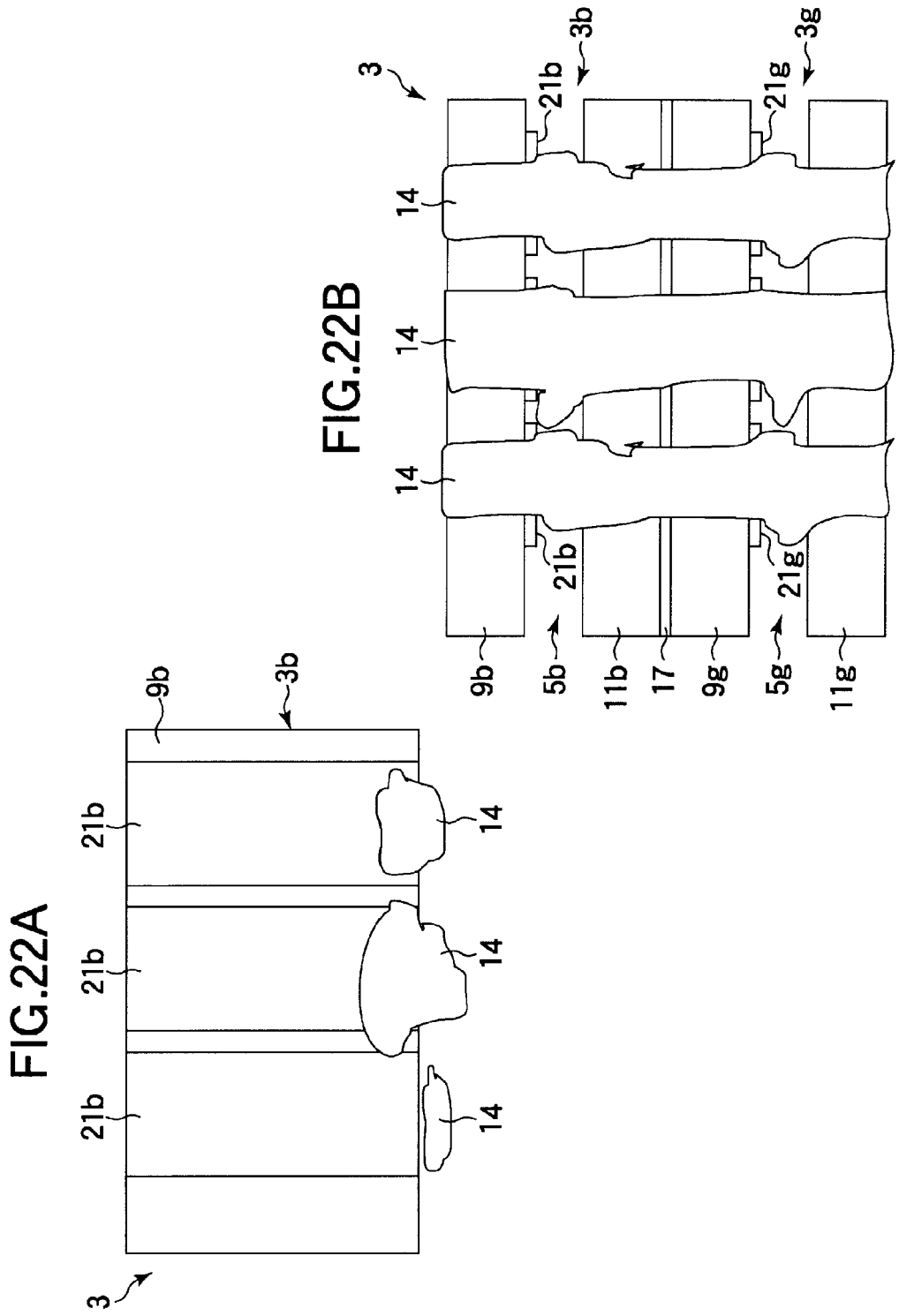

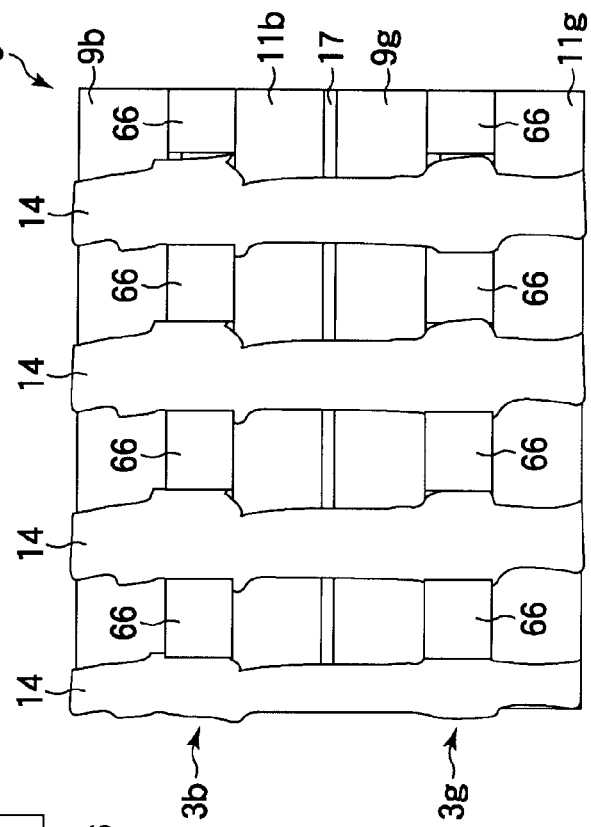
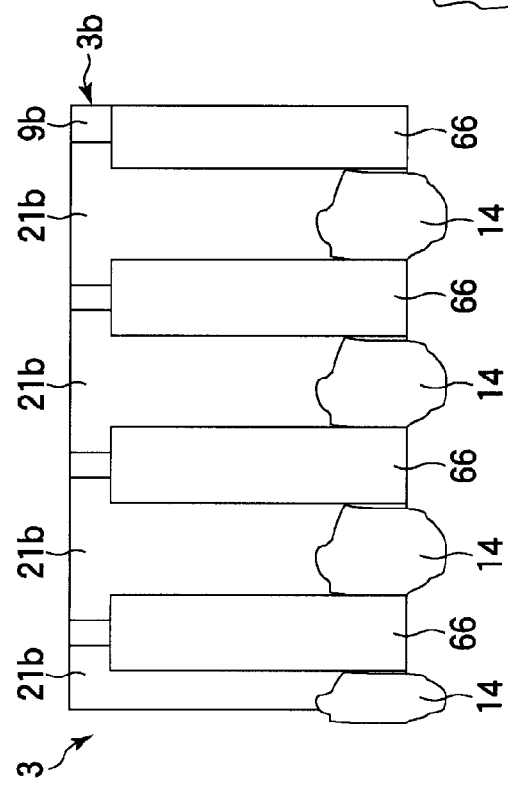
FIG. 23A
FIG. 23B

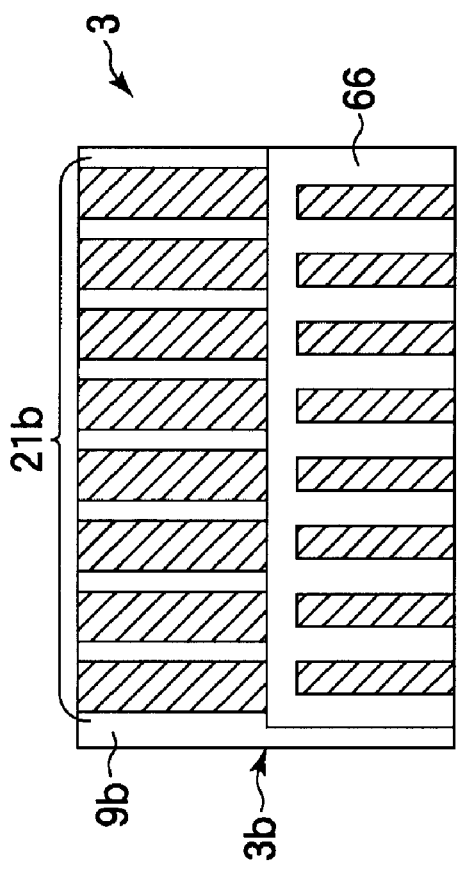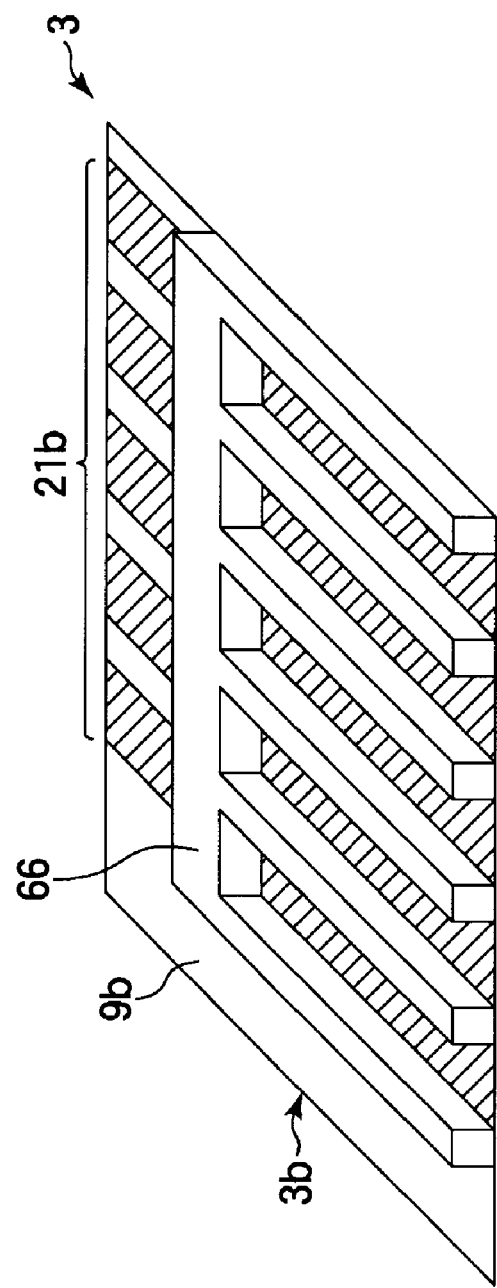
FIG.24A
FIG.24B

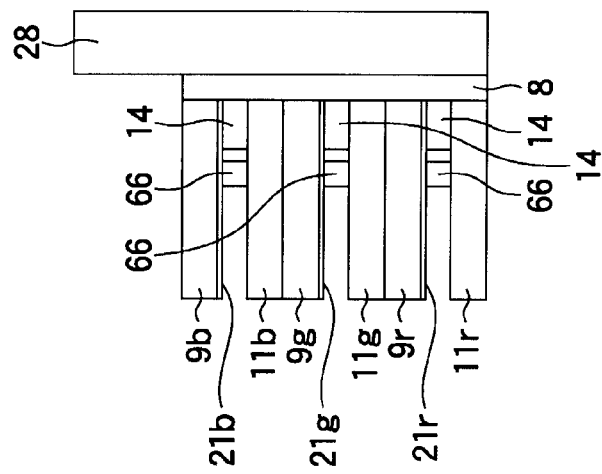
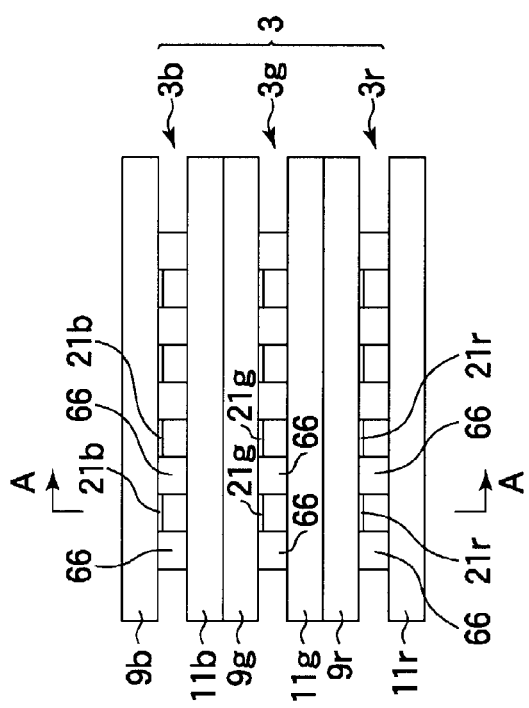

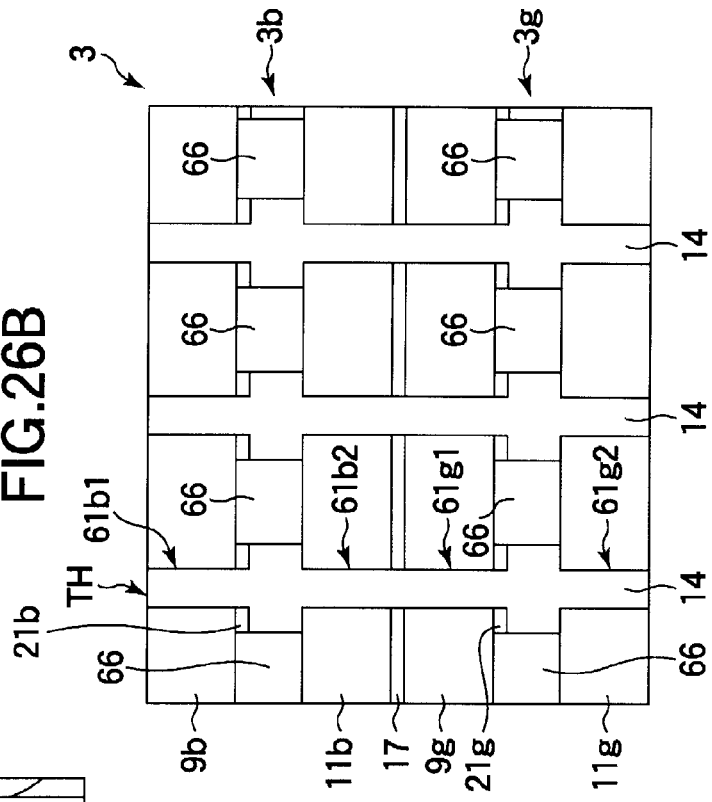
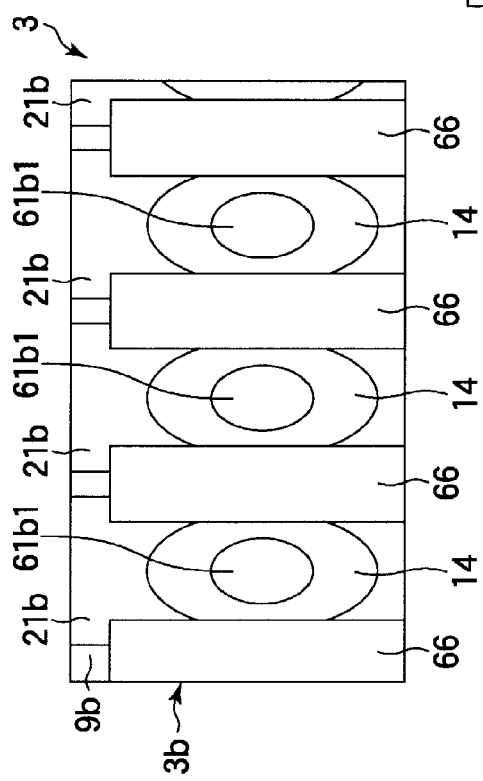
FIG.26A
FIG.26B

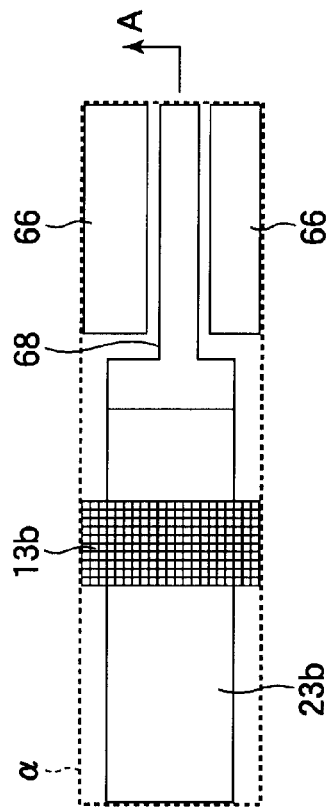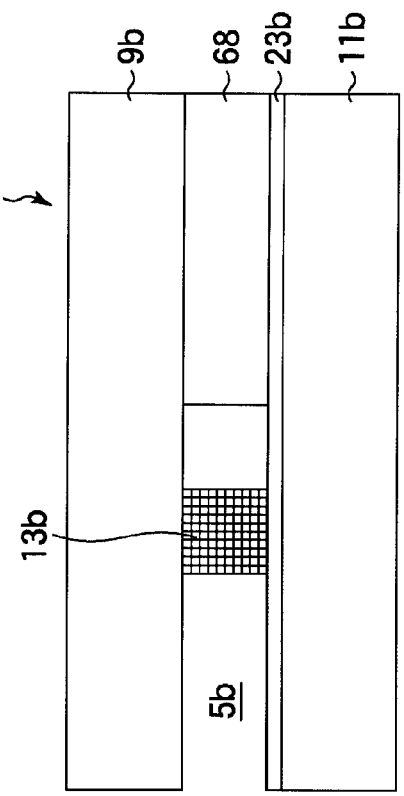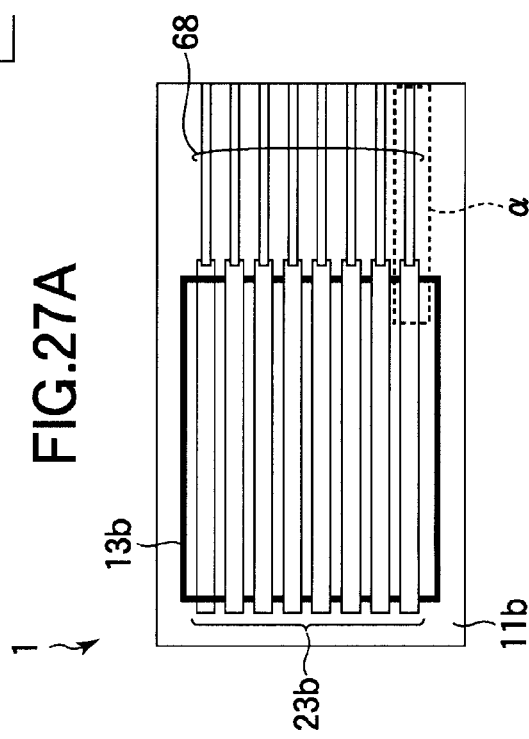

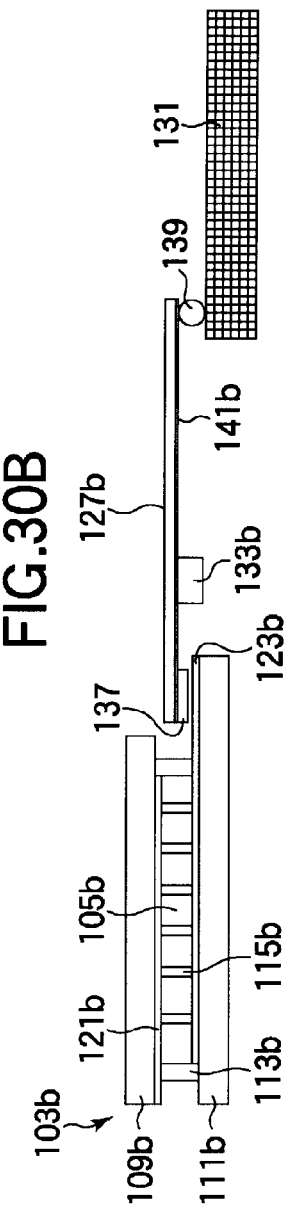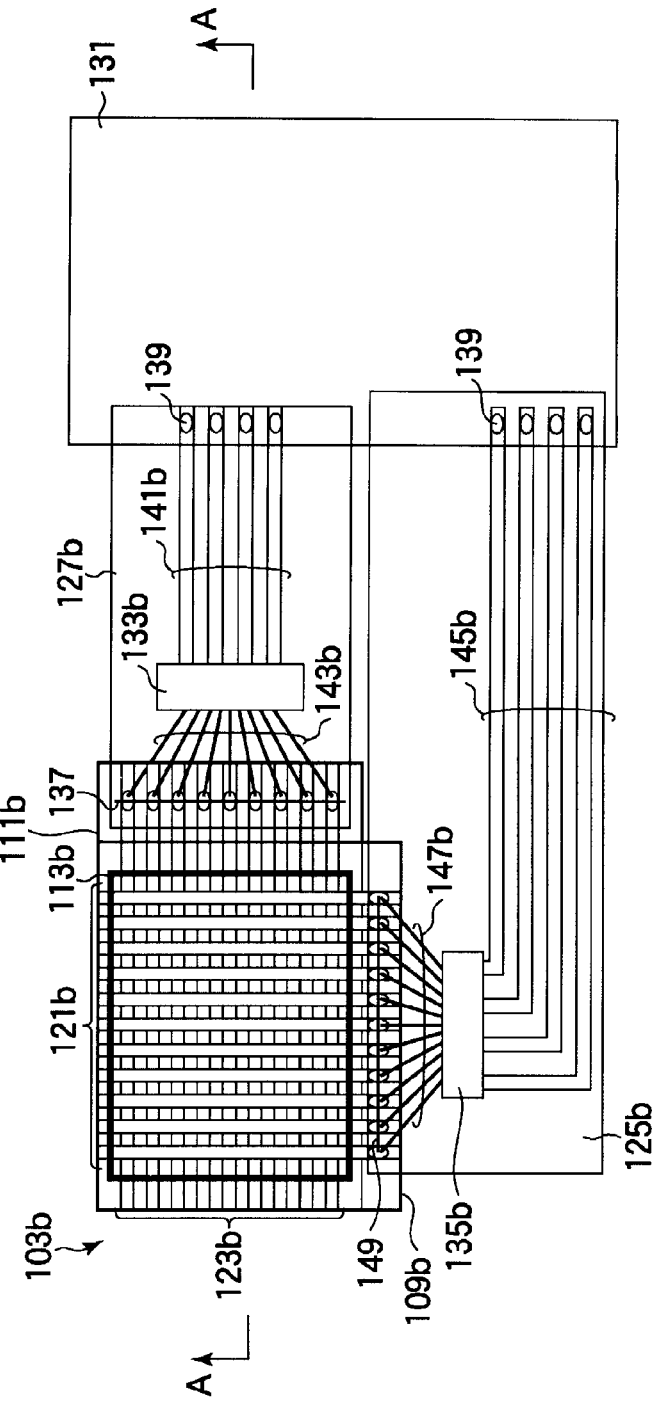

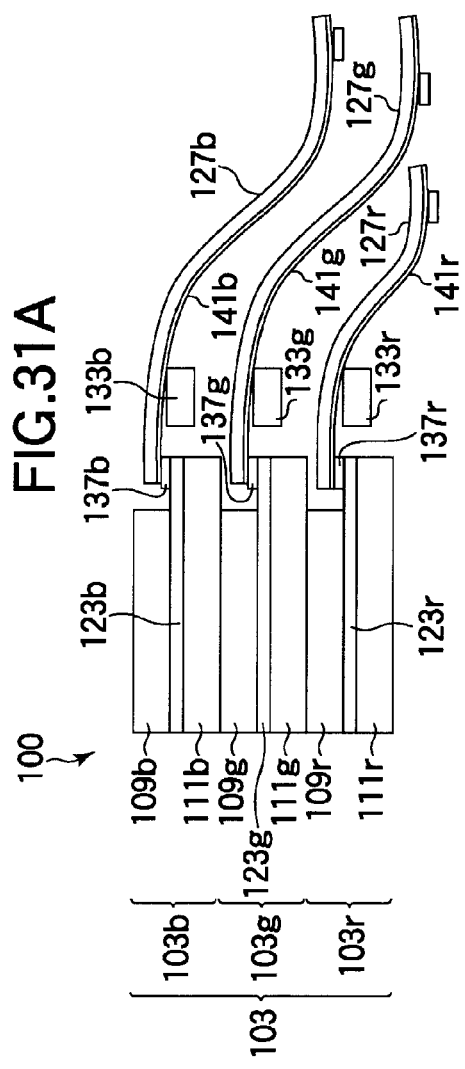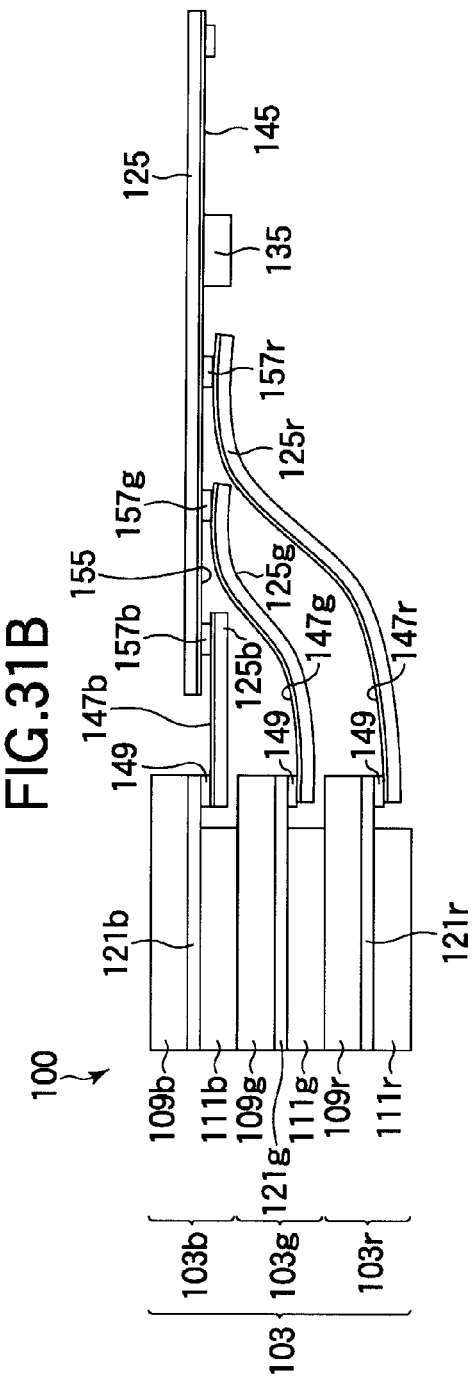

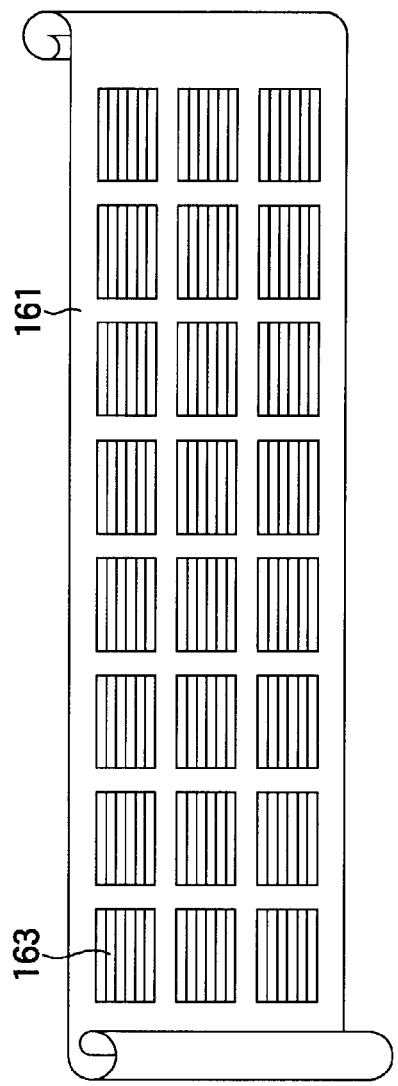
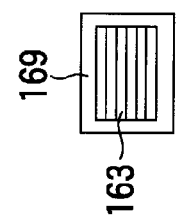
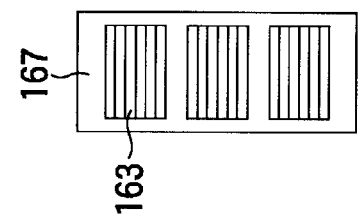
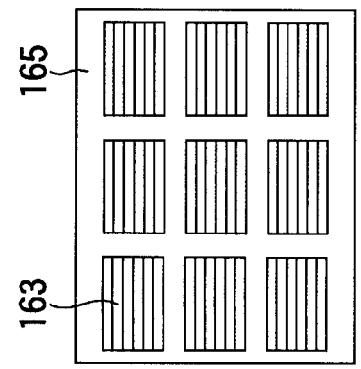

MULTILAYER DISPLAY ELEMENT AND METHOD OF FABRICATING THE SAME

This application is a continuation of International Application No. PCT/JP2007/055629, filed Mar. 20, 2007.

FIELD

The present invention relates to a structure of a multilayer display element having a plurality of display panels that are multilayered for use in electronic paper and the like, and a method of fabricating the same, and particularly to a multilayer display element at low costs with excellent reliability and a method of fabricating the same.

BACKGROUND

In the future, it is expected that electronic paper rapidly spreads, which is capable of holding displayed images with no power supply and can electrically rewrite a displayed content. Electronic paper is under development with the aim of providing ultralow power consumption to display images or text in memory even though a power supply is turned off, a reflective display easy on the eyes with no fatigue, and a flexible, low-profile display product with flexibility like paper. It is considered to apply electronic paper to the display components of electronic books, electronic newspapers, and digital signage.

Depending on differences of display types, electronic paper is categorized into such types as an electrophoretic type, a twisting ball type, a liquid crystal display element (liquid crystal display), an organic EL display element (organic electroluminescent display). The electrophoretic type is a type in which charged particles are moved in the air or in a liquid. The twisting ball type is a type in which charged particles each colored with two colors are rotated. The organic EL display element is a self-luminous display element having a structure in which a plurality of thin films formed of an organic material is sandwiched between a cathode and an anode. A liquid crystal display element is a non-self-luminous display element having a structure in which a liquid crystal layer is sandwiched between a pixel electrode and a counter electrode.

Cholesteric liquid crystals are selective reflective liquid crystals of bistable properties using the interference reflection of a liquid crystal layer. The research and development of electronic paper based on liquid crystal display elements proceed with the use of cholesteric liquid crystals. Here, the bistable properties are the properties that liquid crystals show stability in two different alignment states. The cholesteric liquid crystals have properties that two stable states, the planar (planer) state and the focal conic (focal conic) state, are held for a long time after an electric field is removed. In the cholesteric liquid crystals, the incident light is interfered and reflected in the planar state, and the incident light is transmitted in the focal conic state. Thus, because a liquid crystal display panel using cholesteric liquid crystals in a liquid crystal layer is capable of showing light and shade by the selective reflection of incident light in the liquid crystal layer, polarizers are unnecessary. In addition, the cholesteric liquid crystals are also called chiral nematic liquid crystals.

A cholesteric liquid crystal type is predominantly advantageous in the color representation of liquid crystal display elements. The cholesteric liquid crystal type reflects light in a predetermined color by the interference of liquid crystals. On this account, the cholesteric liquid crystal type allows color representation only by placing liquid crystal display panels that reflect lights in different colors in layers. Thus, the liquid crystal display type using cholesteric liquid crystals (here, for convenience, it is referred to as a "cholesteric liquid crystal type") is predominantly advantageous in regard to color representation as compared with the other types such as the electrophoretic type. In the other types, it is necessary to arrange a color filter tinted into three colors in each pixel in order to conduct color representation. On this account, in the other types, the brightness is about one-third as compared with that of the cholesteric liquid crystal type. Therefore, the other types have a huge problem of improvement of brightness in order to realize electronic paper.

As discussed above, the cholesteric liquid crystal type is a predominant type for electronic paper, which is capable of color representation. However, the cholesteric liquid crystal type has a structure in which three liquid crystal display panels for displaying red (R), green (G), and blue (B) images are placed in three layers in order to realize color representation. Because the cholesteric liquid crystal type has a structure in which three liquid crystal display panels are placed in layers and joined to one another, the cholesteric liquid crystal type has huge problems of a large number of components, complex fabrication processes, and the reliability of joining components.

FIG. 29 schematically shows the cross-sectional configuration of a color display cholesteric liquid crystal display element 100 before. In FIG. 29, for easy understanding, scanning electrode substrates 109b, 109g, and 109r are depicted as rotated at an angle of 90 degrees. FIGS. 30A and 30B show an exemplary state of connecting a liquid crystal display panel 103b for B among liquid crystal display panels 103r, 103g, and 103b for R, G, and B provided in the liquid crystal display element 100 shown in FIG. 29 to a display control circuit board 131. FIG. 30A shows the state in which the liquid crystal display panel 103b for B is seen from the display surface side, and FIG. 30B depicts a cross section cut at line A-A shown in FIG. 30A.

As shown in FIG. 29, the liquid crystal display element 100 has a structure in which three display panels in single colors, the liquid crystal display panels 103b, 103g, and 103r for B, G, and R, are laid on one another and a black opaque layer 119 is arranged on the rear side of the liquid crystal display panel 103r for R. The liquid crystal display panel 103b for B is fixed to the liquid crystal display panel 103g for G by an adhesive layer 117, and the liquid crystal display panel 103g for G is fixed to the liquid crystal display panel 103r for R by an adhesive layer 117.

As shown in FIGS. 29, 30A and 30B, the liquid crystal display panel 103b for B includes a scanning electrode substrate 109b having a plurality of scanning electrodes 121b, a data electrode substrate 111b having a plurality of data electrodes 123b, and a cholesteric liquid crystal layer (B liquid crystal layer 105b) having a thickness of a few micrometers, sealed between the two substrates 109b and 111b, and having a function of wavelength selective reflection. The two substrates 109b and 111b are glass substrates or film substrates. When the two substrates 109b and 111b is flexible film substrates, the thickness of the B liquid crystal layer 105b is sometimes changed by distortion, which degrades display. In order to prevent degraded display caused by the distortion of the two substrates 109b and 111b, the liquid crystal display panel 103b for B has a plurality of wall structures 115b provided between the two substrates 109b and 111b and having adhesive properties. The wall structure is disclosed in Brochure of International Publication No. 06/100713, for example.

One end of each of the scanning electrode 121b and the data electrode 123b is extended and exposed outside a liquid crystal sealing layer for functioning as an external connecting terminal. The liquid crystal sealing layer is a display area surrounded by a sealing agent 113b. Generally, the external connecting terminal of the scanning electrode 121b is connected to the connecting terminal (not shown) of an FPC (flexible printed circuit board) 125b through an ACF (anisotropic conductive film) 149. On the FPC 125b, a liquid crystal drive IC 135b is mounted to drive the scanning electrodes. From the liquid crystal drive IC 135b toward the connecting terminals of the FPC 125b, lead wires 147b are distributed in the same number as the number of the scanning electrodes 121b.

The external connecting terminal of the data electrode 123b is connected to the connecting terminal of an FPC 127b through an ACF 137. On the FPC 127b, a liquid crystal drive IC 133b is mounted to drive the data electrodes. From the liquid crystal drive IC 133b toward the connecting terminals of the FPC 127b, lead wires 143b are distributed in the same number as the number of the data electrodes 123b. Generally, the liquid crystal display panel 103b for B is externally connected at two places on the scanning electrodes 121b and the data electrodes 123b.

The liquid crystal drive IC 135b mounted on the FPC 125b is connected to input signal lines 145b having power supply wiring, data wiring, clock signal wiring, and the like. The input signal lines 145b are connected to external terminals on the display control circuit board 131 mounted with a control IC, a power supply circuit (they are not shown), and the like with solders 139. The liquid crystal drive IC 133b mounted on the FPC 127b is connected to input signal lines 141b having power supply wiring, data wiring, clock signal wiring, and the like. The input signal lines 141b are connected to external terminals on the display control circuit board 131 with solders 139. The FPCs 125b and 127b are sometimes connected with a socket instead of the solders 139.

The liquid crystal display panel 103g for G and the liquid crystal display panel 103r for R shown in FIG. 29 have the structure similar to that of the liquid crystal display panel 103b for B, and are connected to the display control circuit board 131.

FIGS. 31A and 31B schematically show cross sections of the liquid crystal display panel 103 connected to the FPC. In order to realize color representation, as shown in FIG. 29, it is necessary to lay the liquid crystal display panels 103r, 103g, and 103b for R, G, and B on one another and bond them together. As shown in FIG. 31B, in the typical technique before (hereinafter, referred to as "prior art 1"), the data electrodes 123r, 123g, and 123b of the liquid crystal display panels 103r, 103g, and 103b for R, G, and B are connected to the FPCs 127r, 127g, and 127b mounted with the liquid crystal drive ICs 133r, 133g, and 133b through the ACFs 137r, 137g, and 137b. In addition, in prior art 1, as shown in FIG. 31B, the scanning electrodes 121r, 121g, and 121b of the liquid crystal display panels 103r, 103g, and 103b for R, G, and B are connected to the FPCs 125r, 125g, and 125b with no liquid crystal drive ICs through the ACFs 149r, 149g, and 149b. In the liquid crystal display element 100, the liquid crystal display panels 103r, 103g, and 103b for R, G, and B are connected to the FPCs 127r, 127g, and 127b and to the FPCs 125r, 125g, and 125b, and then laid on three layers and bonded together. After that, as shown in FIG. 31B, the FPCs 125r, 125g, and 125b are connected to wire lines 155 of an FPC 125 mounted with a liquid crystal drive IC 135 through the ACFs 157r, 157g, and 157b, respectively. The FPC 125 for the scanning electrodes and the FPCs 127r, 127g, and 127b for the data electrodes are connected to the display control circuit board 131 mounted with the control circuit and the like (see FIGS. 30A and 30B).

The liquid crystal display element 100 is a small-sized display element, which is capable of driving the liquid crystal display panels 103r, 103g, and 103b for R, G, and B by single liquid crystal drive ICs 133r, 133g, and 133b, respectively. Even though the liquid crystal display element 100 is small, six places are required to connect the liquid crystal display panels 103r, 103g, and 103b for R, G, and B to the FPCs 125r, 125g, 125b, 127r, 127g, and 127b, three places are required to connect the FPCs 125r, 125g, and 125b to the FPC 125, and thus nine places are required for connections in total before and after placing the panels in layers. In addition, the liquid crystal display element 100 needs seven FPCs and four liquid crystal drive ICs, and the number of components is large. As to a large-sized liquid crystal display element, because a plurality of drive ICs is necessary to drive liquid crystal display panels for R, G, and B, connecting points between the liquid crystal display panels and FPCs are further increased. In addition, when these connecting points are increased, the reliability of liquid crystal display elements is compromised. On the other hand, in the multilayer liquid crystal display element, such a configuration that can reduce the number of FPCs is not realized yet. Because the configuration that can reduce the connecting points is not realized yet, in the multilayer liquid crystal display element, the expenses of component costs and man-hour costs are large and the reliability is also low.

FIG. 32 is a flowchart depicting a general fabrication process of a multilayer liquid crystal display element before using film substrates. FIGS. 33A to 33D schematically show a fabrication process of a multilayer liquid crystal display element before using film substrates. FIG. 33A is a diagram illustrative of a fabrication process in Step S1 shown in FIG. 32, and FIGS. 33B to 33D are diagrams illustrative of fabrication processes in Steps S4 to S11 shown in FIG. 32.

As shown in FIGS. 32 and 33A, on a roll upper film substrate 161, transparent conductors are formed in stripes extended in the longitudinal direction of the upper film substrate 161 to form upper substrate electrodes 163 (Step S1). A large number of the electrode patterns of the upper substrate electrodes 163 are formed on the upper film substrate 161. In addition, on a roll lower film substrate (not shown), transparent conductors are formed in stripes extended in the crosswise direction of the lower film substrate to form lower substrate electrodes (Step S2). The upper substrate electrodes 163 and the lower substrate electrodes are arranged such that they intersect with each other when the upper film substrate 161 and the lower film substrate are bonded together.

Subsequently, depending on the dimensions of the liquid crystal display panel and the final number of panels to be prepared, the upper film substrate 161 is cut into a sheet-like substrate 165 shown in FIG. 33B, a rectangular substrate 167 shown in FIG. 33C, or a separate piece substrate 169 shown in FIG. 33D (Step S3). Subsequently, in the area formed with the upper substrate electrodes 163, in order to keep the thickness of a liquid crystal display cell constant, a cylindrical spacer having a thickness of a few microns is formed (Step S4). Subsequently, the lower film substrate is cut into a sheet-like substrate, a rectangular substrate or a separate piece substrate shown in FIGS. 33B to 33D (Step S5). When the upper film substrate 161 is cut into a shape of the sheet-like substrate 163, for example, the lower film substrate is cut into a sheet-like substrate (Step S5). As described above, the lower film substrate is cut into the same shape as that of the upper film substrate 161. Subsequently, in the area of forming the lower substrate electrodes, spherical spacers are sprayed to hold the thickness of the liquid crystal display cell constant (Step S6). Subsequently, a sealing material (not shown) to seal liquid crystals is formed so as to surround the area of forming the upper substrate electrode 163 (Step S7). In addition, the sealing material may be formed to surround the lower substrate electrodes. Subsequently, the upper substrate and the lower substrate are bonded and joined together to form an empty cell in such a form that the upper substrate electrodes and the lower substrate electrodes intersect with each other and the cylindrical spacers and the sealing material are sandwiched between the upper and lower substrate electrodes (Step S8).

Subsequently, a vacuum filling method is used to fill R liquid crystals for selectively reflecting red light from a filling port of the empty cell (Step S9). When the filling of the R liquid crystals is finished, the filling port is sealed with an end-sealing material (Step S10). Subsequently, when both of the film substrates are cut into the sheet-like substrate or the rectangular substrate in Steps S3 and S5, the substrates are cut into separate pieces shown in FIG. 33D (Step S11). In Step S11, the upper substrate electrodes 163 are exposed in the cut edge of the upper substrate, and the lower substrate electrodes are exposed in the cut edge of the lower substrate. Because the liquid crystal layer has a thickness of a few microns, it is difficult to cut the upper substrate and the lower substrate so as not to damage the upper substrate electrodes 163 and the lower substrate electrodes. On this account, a cut or an opening is provided in advance in the upper substrate and the lower substrate, or the upper and lower film substrates are cut in advance into a separate piece shown in FIG. 33D, not into a sheet-like or rectangular shape shown in FIGS. 33B and 33C. Subsequently, the exposed portions of the upper substrate electrodes 163 and the lower substrate electrodes are formed into connecting terminals, an ACF is used to connect an FPC, and then a liquid crystal display panel for R (component panel R) is completed (Step S13). In addition, the FPC may be mounted with a liquid crystal drive IC, or not.

When a liquid crystal display element capable of color representation is fabricated, by the similar fabrication processes as Steps S1 to S13, a liquid crystal display panel for G (component panel G) connected with an FPC is formed (Step S14). In Step S14, G liquid crystals for selectively reflecting green light are used. Subsequently, by the similar fabrication processes as Steps S1 to S13, a liquid crystal display panel for B (component panel B) connected with an FPC is formed (Step S15). In Step S15, B liquid crystals for selectively reflecting blue light are used.

Subsequently, based on alignment marks formed on each of the liquid crystal display panels for R, G, and B, the individual liquid crystal display panels are aligned with one another from layer to layer, and the panels are bonded together with a photo-curable adhesive or the like (Step S16). In Step S16, for example, the liquid crystal display panels for R and G are placed in layers, and then the liquid crystal display panel for B is laid on the liquid crystal display panel for G. In Step S16, instead of the photo-curable adhesive, an adhesive film may be used. After the liquid crystal display panels for R, G, and B are laid on one another and bonded together, as shown in FIG. 31B, the lower substrate electrodes (data electrodes) of each of the liquid crystal display panels for R, G, and B are connected to the display control circuit board 131 (see FIGS. 30A and 30B) with solder through the FPC (Step S17). In Step S17, as shown in FIG. 31B, the upper substrate electrodes (scanning electrodes) of each of the liquid crystal display panels for R, G, and B are connected to a relay board mounted with the liquid crystal drive IC 135 (scan drive IC) through the ACF, and the relay board is joined to the display control circuit board 131 (see FIGS. 30A and 30B) with solder. Through the fabrication processes described above, a multilayer liquid crystal display element having a narrow picture frame is completed, which is capable of color representation (Step S18).

In the fabrication process of the multilayer liquid crystal display element before shown in FIG. 32, before the liquid crystal display panel are placed in layers, the terminals are joined through the ACF to connect the FPC to each of the liquid crystal display panels so as not to cover the exposed portions of the upper and lower substrate electrodes, and then three liquid crystal display panels are placed in layers. After the panels are placed in layers, the terminals are joined through the ACF to connect the FPC to the display control circuit board or to the relay board. As described above, the fabrication process of the multilayer liquid crystal display element before has a problem that it is necessary to perform the process of again conducting the step of joining the terminals through the ACF, which has been performed. In addition, it is difficult to handle the liquid crystal display panel having the FPCs connected, and a large number of fabrication failures occur, such as misalignment in placing panels in layers, adhesive stains, and joining defects between the FPC and the terminals. Moreover, in the fabrication process described above, because the FPCs are connected to the liquid crystal display panel and then the liquid crystal display panels are placed in layers, it is not possible to prepare multiple panels including the step of layering panels. On the other hand, because defective inspections can be conducted in the stage of preparing a liquid crystal display panel in a singe color, the fabrication process of the liquid crystal display element before has merits that yields are high overall and that liquid crystal display panels can have narrower picture frames.

JP-A-2001-306000 discloses a method in which display panels are collectively connected to each other after the panels are placed in layers in order to prevent a process of again conducting the step having been performed. In the method disclosed in JP-A-2001-306000 (hereinafter, referred to as "prior art 2"), such a structure is configured in which a step exposed portion is provided to the connecting portions of display panels placed in layers, and then an FPC is connected after the display panels are placed in layers. However, because the step exposed portion is provided on the connecting portion, the method has a problem that the picture frame area irrelevant to display is substantially broadened. In addition, because wiring layers overlap one another in the step exposed portions of the connecting portions, the method has a problem that breaks in lines tend to occur, which are caused by pressure in connecting an ACF. In addition, because the dimensions of three types of display panels for R, G, and B are varied, a problem still remains that it is difficult to conduct a so-called preparation of multiple panels in which a large number of multilayered panels are arranged. Such configurations and methods are desired that the picture frame of a display panel is narrow, FPCs can be connected with interconnects after display panels are placed in layers, the numbers of components and connecting points are small, and multiple panels placed in layers can be prepared.

Keizo Takeda, Keiji Matsumoto, Masaki Hasegwa, Kuniaki Sueoka, and Yoichi Taira, Sekiso Kara Hansha-gata Ekisyo Disupurei, Monthly Display, January 2002, PP. 13-17 discloses another method of configuring a multilayer product (hereinafter, referred to as "prior art 3"). Prior art 3 is a multilayer display element in which four glass substrates are used to conduct liquid crystal representation in three layers. The multilayer display element is a color liquid crystal display in which a drive array substrate is provided on the undermost side and transistors for driving pixels on the array substrate are electrically connected to each of liquid crystal cells by through wiring. Three liquid crystal layers can be driven by a single drive array substrate by through wiring. However, because the method of active matrix drive according to prior art 3 needs through wiring holes in the pixels, the method has a problem that the pixel area available for display is narrowed to reduce brightness. In addition, in the multilayer structure of prior art 3, ITO electrodes are provided on the front and back surfaces of the substrate to form a multilayer structure, and then liquid crystals are filled to form a display panel. On this account, when electrodes are formed on the front and back surfaces of the substrate, a problem arises that the electrodes tend to be damaged during processing, which leads to poor production yields. In addition, after three display panels are joined together in three layers, liquid crystals are filled to complete the multilayer display element. Thus, a problem arises that the defects of each of the display panels are multiplied to increase the rejection rate of the multilayer display element. In addition, because prior art 3 requires high temperature processes for joining by through wiring, it is necessary to use glass substrates, which also causes a problem that no film substrate can be used.

SUMMARY

According to aspects of embodiments, a multilayer display element includes: a first display panel having a first data electrode, a first scanning electrode formed as intersecting with the first data electrode, and at least one of a plurality of data signal input terminals to which a first data signal is inputted for driving the first data electrode and a plurality of scan signal input terminals to which a first scan signal is inputted for driving the first scanning electrode; a second display panel having a second data electrode, and a second scanning electrode formed as intersecting with the second data electrode and driven by a second scan signal, wherein the second display panel is placed on the first display panel in layers; a plurality of data electrode layer-to-layer interconnects formed in a non-display area of the first and second display panels for connecting the first and second data electrodes of the first and second display panels to the plurality of the data signal input terminals from layer to layer; and a plurality of scanning electrode layer-to-layer interconnects formed in the non-display area for connecting the first and second scanning electrodes of the first and second display panels to the plurality of the scan signal input terminals from layer to layer.

BRIEF DESCRIPTION OF THE DRAWINGS

FIGS. 4A and 4B are diagrams schematically depicting the schematic configuration of a multilayer liquid crystal display element 1 according to embodiment 3 of an exemplary embodiment;

FIGS. 5A to 5E are diagrams illustrative of a method of fabricating the multilayer liquid crystal display element 1 according to the embodiment 3 of an exemplary embodiment;

FIGS. 6A to 6C are diagrams schematically depicting the schematic configurations of data electrode layer-to-layer interconnects 2 and data signal input terminals 4 of a multilayer liquid crystal display element 1 according to embodiment 4 of an exemplary embodiment;

FIGS. 8A to 8C are diagrams schematically depicting the schematic configurations of data electrode layer-to-layer interconnects 2 and data signal input terminals 4 of a multilayer liquid crystal display element 1 according to an exemplary modification of the embodiment 4 of an exemplary embodiment;

FIGS. 9A to 9C are diagrams illustrative of a multilayer liquid crystal display element 1 according to embodiment 5 of an exemplary embodiment, and a method of fabricating the same;

FIG. 10 is a plan view depicting a multilayer liquid crystal display element 1 according to embodiment 6 of an exemplary embodiment;

FIGS. 11A to 11C are cross sections depicting the multilayer liquid crystal display element 1 according to the embodiment 6 of an exemplary embodiment;

FIG. 12 is a cross section depicting a multilayer liquid crystal display element 1 according to embodiment 7 of an exemplary embodiment;

FIGS. 14A to 14E are diagrams schematically depicting the vicinity of data electrode layer-to-layer interconnects 2 of a multilayer liquid crystal display element 1 according to embodiment 8 of an exemplary embodiment;

FIGS. 16A to 16D are diagrams schematically depicting the vicinity of scanning electrode layer-to-layer interconnects 14 of the multilayer liquid crystal display element 1 according to the embodiment 8 of an exemplary embodiment;

FIGS. 17A to 17E are diagrams schematically depicting the vicinity of scanning electrode layer-to-layer interconnects 14 of a multilayer liquid crystal display element 1 according to embodiment 9 of an exemplary embodiment;

FIGS. 20A to 20E are diagrams schematically depicting the vicinity of data electrode layer-to-layer interconnects 2 of a multilayer liquid crystal display element 1 according to embodiment 11 of an exemplary embodiment;

FIGS. 21A to 21E are diagrams schematically depicting the vicinity of scanning electrode layer-to-layer interconnects 14 of the multilayer liquid crystal display element 1 according to the embodiment 11 of an exemplary embodiment;

FIGS. 22A and 22B are diagrams schematically depicting scanning electrode layer-to-layer interconnects 14 of a multilayer liquid crystal display element 1 according to embodiment 12 of an exemplary embodiment;

FIGS. 23A and 23B are diagrams schematically depicting the essential part of the multilayer liquid crystal display element 1 according to the embodiment 12 of an exemplary embodiment;

FIGS. 24A and 24B are diagrams schematically depicting the essential part of a multilayer liquid crystal display element 1 according to an exemplary modification of the embodiment 12 of an exemplary embodiment;

FIGS. 25A and 25B are diagrams schematically depicting the essential part of a multilayer liquid crystal display element 1 according to the exemplary modification of the embodiment 12 of an exemplary embodiment;

FIGS. 26A and 26B are diagrams schematically depicting the essential part of a multilayer liquid crystal display element 1 according to embodiment 13 of an exemplary embodiment;

FIGS. 27A to 27C are diagrams schematically depicting the essential part of a multilayer liquid crystal display element 1 according to embodiment 14 of an exemplary embodiment;

FIGS. 30A and 30B are diagrams depicting the connection state between the liquid crystal display panel before and a display control circuit board;

FIGS. 31A and 31B are diagrams schematically depicting across section of the liquid crystal display element 100 before;

FIGS. 33A to 33D are diagrams schematically depicting a fabrication process of the multilayer liquid crystal display element before using film substrates.

DESCRIPTION OF EMBODIMENTS

A multilayer display element and a method of fabricating the same according to an exemplary embodiment will be described with reference to FIGS. 1 to 28. This exemplary embodiment is to present novel schemes of solving the above-described problems of the mounting structure of the multilayer display element before and the method of fabricating the same. Objects of this exemplary embodiment are summarized from object 1 to object 6 below.
(Object 1) This exemplary embodiment is to reduce the number of components of the multilayer structure for a plurality of film display panels. Particularly, the numbers of FPCs and drive ICs are reduced.
(Object 2) This exemplary embodiment is to present a structure and a fabrication method, which are capable of connecting and wiring FPCs after a plurality of display panels is placed in layers.
(Object 3) This exemplary embodiment is to provide a multilayer display element having a fewer number of connecting points for wiring.
(Object 4) This exemplary embodiment is to provide a multilayer display element having a narrow picture frame area.
(Object 5) This exemplary embodiment is to provide a structure and a fabrication method, which are capable of preparation of multiple panels until panels are placed in layers.
(Object 6) This exemplary embodiment is to provide a wiring configuration in which a plurality of component display panels placed in layers is connected from layer to layer.

Hereinafter, a multilayer display element and a method of fabricating the same according to this exemplary embodiment will be described with reference to embodiments. In addition, as a multilayer display element, a multilayer liquid crystal display element using cholesteric liquid crystals is taken and described as an example.

Embodiment 1

Figure 1:
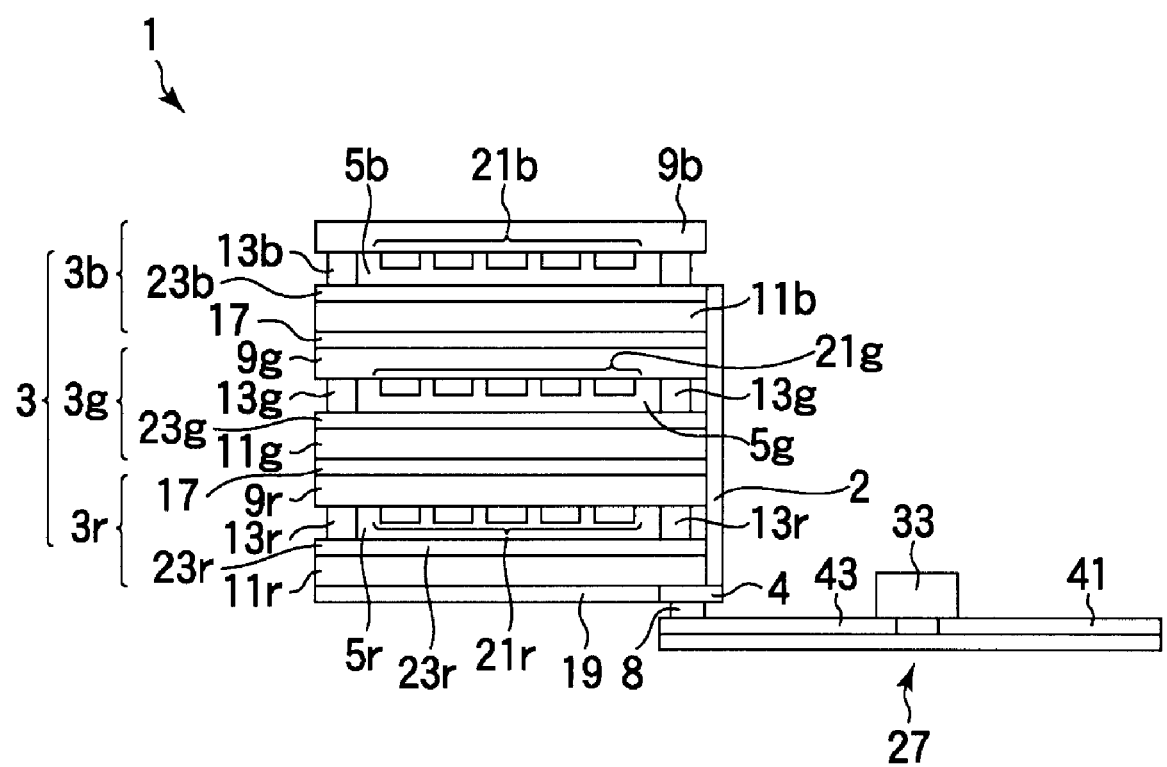
FIG. 1 is a diagram schematically depicting the cross-sectional configuration of a multilayer liquid crystal display element 1 according to embodiment 1 of an exemplary embodiment.
Figure 2:
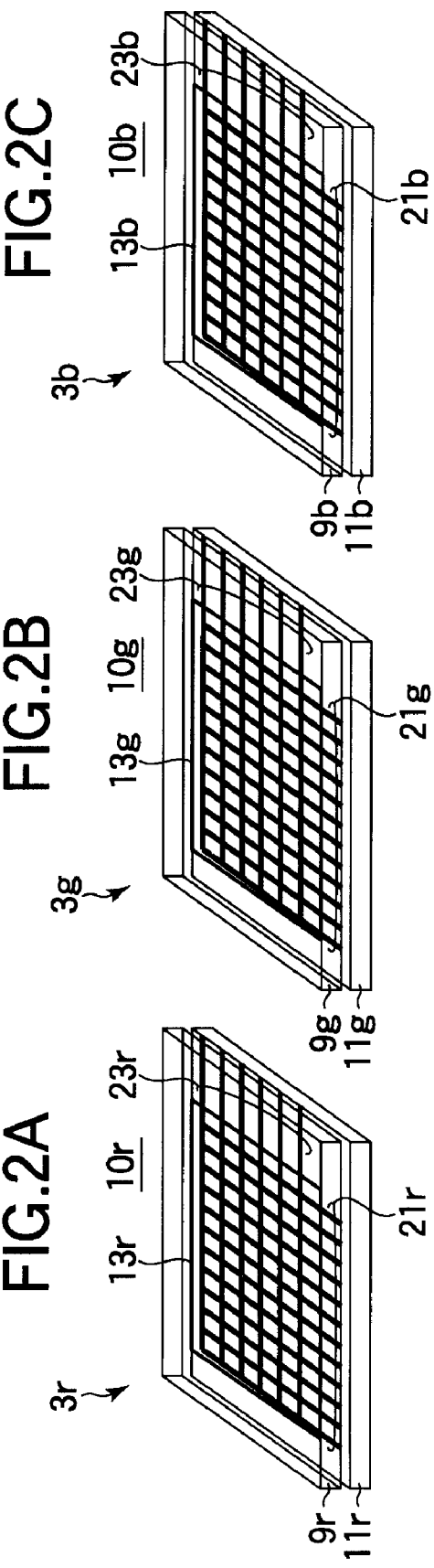
FIGS. 2A to 2d are diagrams illustrative of a method of fabricating the multilayer liquid crystal display element 1 according to the embodiment 1 of an exemplary embodiment.

A multilayer display element and a method of fabricating the same according to embodiment 1 of the exemplary embodiment will be described with reference to FIGS. 1 to 2D. FIG. 1 schematically shows the cross-sectional configuration of a multilayer liquid crystal display element (multilayer display element) 1 according to this embodiment. As shown in FIG. 1, the multilayer liquid crystal display element 1 according to the embodiment is provided with: a liquid crystal display panel (first display panel) 3r for R (red) having a plurality of data electrodes 23r, a plurality of scanning electrodes 21r formed as intersecting with a plurality of the data electrodes 23r, a plurality of data signal input terminals 4 to which data signals to drive a plurality of the data electrodes 23r are inputted, and a plurality of scan signal input terminals (not shown) to which scan signals to drive a plurality of the scanning electrodes 21r are inputted; a liquid crystal display panel (second display panel) 3g for G (green) having a plurality of data electrodes 23g driven by the data signals, and a plurality of scanning electrodes 21g formed as intersecting with a plurality of the data electrodes 23g and driven by the scan signals, in which the liquid crystal display panel 3g for G is laid on the liquid crystal display panel 3r for R; and a liquid crystal display panel (second display panel) 3b for B (green) having a plurality of data electrodes 23b driven by the data signals, and a plurality of scanning electrodes 21b formed as intersecting with a plurality of the data electrodes 23b and driven by the scan signals, in which the liquid crystal display panel 3b for B is laid on the liquid crystal display panels 3r, 3g for R and G. The liquid crystal display panels 3b, 3g, and 3r for B, G, and R are placed in layers in this order from the display surface side. A multilayer liquid crystal display panel 3 is configured of the liquid crystal display panels 3r, 3g, and 3b for R, G, and B.

In addition, the multilayer liquid crystal display element 1 has at least one of a plurality of data electrode layer-to-layer interconnects 2 and a plurality of scanning electrode layer-to-layer interconnects (not shown), a plurality of the data electrode layer-to-layer interconnects 2 being formed in the non-display area of the liquid crystal display panel 3 for connecting the data electrodes 23r, 23g, and 23b of the liquid crystal display panels 3r, 3g, and 3b for R, G, and B to a plurality of the data signal input terminals 4 from layer to layer, and a plurality of the scanning electrode layer-to-layer interconnects being formed in the non-display area for connecting the scanning electrodes 21r, 21g, and 21b of the liquid crystal display panels 3r, 3g, and 3b for R, G, and B to a plurality of the scan signal input terminals from layer to layer. The data electrode layer-to-layer interconnects 2 are formed on one side surfaces (first side surfaces) of the liquid crystal display panels 3r, 3g, and 3b for R, G, and B where one ends of the data electrodes 23r, 23g, and 23b are exposed. The scanning electrode layer-to-layer interconnects are formed on the other side surfaces (second side surfaces) which are different from these one side surfaces and one ends of the data electrodes 21r, 21g, and 21b are exposed. These one side surfaces and these other side surfaces are almost orthogonal to each other. Layer-to-layer interconnection is that predetermined electrodes are connected to each other between liquid crystal display panels across the liquid crystal display panels or between substrates across the substrates.

The liquid crystal display panel 3r for R has a data electrode substrate 9r with flexibility formed with a plurality of the data electrodes 23r, a scanning electrode substrate 11r with flexibility formed with a plurality of the scanning electrodes 21r and arranged as facing the data electrode substrate 9r such that the data electrodes 23r and the scanning electrodes 21r face each other, and a sealing material 13r formed around the outer regions of the two substrates 9r and 11r to bond the two substrates 9r and 11r together. The liquid crystal display panel 3r for R has an R liquid crystal layer 5r provided inside the sealing material 13r and sandwiched between the two substrates 9r and 11r. The R liquid crystal layer 5r shows a reflective state in which light is reflected, a transmissive state in which light is transmitted, or an intermediate state that is a middle state between the reflective state and the transmissive state, and the layer 5r reflects red light. The R liquid crystal layer 5r has R cholesteric liquid crystals whose mean refractive index n or helical pitch p is controlled such that red color is selectively reflected.

The data electrodes 23r and the scanning electrodes 21r formed on the liquid crystal display panel 3r for R are formed in stripes, for example. An R pixel is formed at the intersecting part of the data electrode 23r and the scanning electrode 21r. The R pixels are arranged in a matrix. For the materials of forming the data electrodes 23r and the scanning electrodes 21r, indium tin oxide (Indium Tin Oxide; ITO) is typical, for example. In addition to this, a transparent conductive film such as indium zinc oxide (Indium Zinc Oxide; IZO), or a photoconductive film such as amorphous silicon can be used.

The liquid crystal display panels 3g and 3b for G and B have similar configurations as those of the liquid crystal display panel 3r for R, except the points that the data signal input terminals 4 are not provided and their liquid crystal layers reflect lights in colors different from red. The liquid crystal display panel 3g for G has a G liquid crystal layer 5g that reflects green light different from red light reflected by the R liquid crystal layer 5r. The G liquid crystal layer 5g shows the reflective state in which light is reflected, the transmissive state in which light is transmitted, or the intermediate state between them. The G liquid crystal layer 5g has G cholesteric liquid crystals whose mean refractive index n or helical pitch p is controlled such that green color is selectively reflected.

The liquid crystal display panel 5b for B has a B liquid crystal layer 5b that reflects blue light different from red and green lights reflected by the R and G liquid crystal layers 5r and 5g, respectively. The B liquid crystal layer 5b shows the reflective state in which light is reflected, the transmissive state in which light is transmitted, or the intermediate state between them. The B liquid crystal layer 5b has B cholesteric liquid crystals whose mean refractive index n or helical pitch p is controlled such that blue color is selectively reflected.

The liquid crystal display panels 3g and 3b for G and B have G and B pixels at each of the intersecting parts of data electrodes 23g and 23b and the scanning electrodes 21g and 21b made of the similar material of forming the data electrodes 23r and the scanning electrodes 21r in the similar shape. A set of the B, G, and R pixels configures a single pixel of the multilayer liquid crystal display element 1. The multilayer liquid crystal display element 1 is a simple matrix type display device in which these single pixels are arranged in a matrix to form a display screen. The liquid crystal display panels 3r, 3b, and 3g for R, G, and B each have the liquid crystal layer reflecting lights in different colors from each other. Thus, the multilayer liquid crystal display element 1 is capable of color image representation.

The liquid crystal composition configuring the R, G, and B liquid crystal layers 5r, 5g, and 5b is cholesteric liquid crystals that 10 to 40 wt % of a chiral material is added to a nematic liquid crystal mixture. The added ratio of the chiral material is the value where the total amount of the nematic liquid crystal component and the chiral material is 100 wt %. Although various publicly known ones can be used for the nematic liquid crystals, preferably, the dielectric anisotropy $\Delta\in$ of the cholesteric liquid crystal composition is $20 \leqq \Delta\in 50$. When the dielectric anisotropy $\Delta\in$ is 20 or greater, the range of selecting usable chiral materials becomes wider. In addition, when the dielectric anisotropy $\Delta\in$ is much lower than the range described above, the drive voltage of each of the liquid crystal layers 5r, 5g, and 5b becomes high. On the other hand, when the dielectric anisotropy $\Delta\in$ is much higher than the range described above, the stability and reliability as the liquid crystal display element 1 are decreased to tend to cause image defects or image noise.

The refractive index anisotropy $\Delta n$ of the cholesteric liquid crystals is an important physical property to control image quality. Preferably, the value of the refractive index anisotropy $\Delta n$ is $0.18 \leqq \Delta n \leqq 0.24$. When the refractive index anisotropy $\Delta n$ is smaller than this range, display is dark with a lack of brightness because the reflectance of each of the liquid crystal layers 5r, 5g, and 5b in the planar state becomes low. On the other hand, when the refractive index anisotropy $\Delta n$ is greater than the range described above, the color purity and contrast of the display screen are short to blur display because each of the liquid crystal layers 5r, 5g, and 5b has large scatter reflections in the focal conic state. Moreover, when the refractive index anisotropy $\Delta n$ is greater than the range described above, the response speed of the cholesteric liquid crystals is decreased because the viscosity becomes high.

Preferably, the value of the resistivity $\rho$ of the cholesteric liquid crystals is $10^{10} \leqq \rho \leqq 10^{13}$ ($\Omega \cdot cm$). In addition, preferably, the viscosity of the cholesteric liquid crystals is low because a voltage rise or contrast reduction at low temperatures can be suppressed.

It is necessary that the scanning electrode substrates 9r, 9g, and 9b and the data electrode substrates 11r, 11g, and 11b have translucency. Each of the electrode substrates 9r, 9g, 9b, 11r, 11g, and 11b is a film substrate formed of polycarbonate (PC), polyethylene terephthalate (PET), or the like. In the exemplary embodiment, although each of the electrode substrates 9r, 9g, 9b, 11r, 11g, and 11b has translucency, the data electrode substrate 11r of the liquid crystal display panel 103r for R arranged in the undermost layer may be opaque.

The multilayer liquid crystal display element 1 has a visible light absorbing layer 19 on the outer surface (back surface) of the data electrode substrate 11r of the liquid crystal display panel 3r for R. On this account, when all of the R, G, and B liquid crystal layers 5r, 5g, and 5b are in the focal conic state, the display screen of the multilayer liquid crystal display element 1 appears black. In addition, the visible light absorbing layer 19 may be provided as necessary.

The multilayer liquid crystal display element 1 has an FPC 27 mounted with a liquid crystal drive IC 33 connected to a plurality of the data signal input terminals 4 through an ACF 8. The liquid crystal drive IC 33 outputs data signals to drive the data electrodes 23r, 23g, and 23b. The liquid crystal drive IC 33 is connected to the data signal input terminals 4 through lead wires 43 formed on the FPC 27. The data signal input terminals 4 are connected to the data electrodes 23r, 23g, and 23b through the data electrode layer-to-layer interconnects 2. The data signal input terminals 4 are terminated to the liquid crystal display panel 3r for R. Thus, the multilayer liquid crystal display element 1 uses a single FPC 27 to connect the liquid crystal drive IC 33 to the data electrodes 23r, 23g, and 23b. Moreover, the multilayer liquid crystal display element 1 can share the liquid crystal drive IC 33 among the liquid crystal display panels 3r, 3g, and 3b for R, G, and B when the number of output terminals of the liquid crystal drive IC 33 is the same as the total numbers of the data electrodes 23r, 23g, and 23b. Therefore, in the multilayer liquid crystal display element 1 of the exemplary embodiment, it is unnecessary to individually provide FPCs and liquid crystal drive ICs 33 for driving data electrodes for the liquid crystal display panels 3r, 3g, and 3b as the multilayer liquid crystal display element 100 before, and the numbers of components and connecting points can be reduced.

The multilayer liquid crystal display element 1 has an FPC mounted with a liquid crystal drive IC connected to a plurality of scan signal input terminals (they are not shown). The liquid crystal drive IC outputs scan signals to drive the scanning electrodes 21r, 21g, and 21b. The scanning electrodes 21r, 21g, and 21b are connected to the scan signal input terminals through the scanning electrode layer-to-layer interconnects. The scan signal input terminals are terminated to the liquid crystal display panel 3r for R. On this account, the multilayer liquid crystal display element 1 uses a single FPC to connect the liquid crystal drive IC to the scanning electrodes 21r, 21g, and 21b.

Next, a method of fabricating the multilayer display element according to the exemplary embodiment will be described with reference to FIGS. 1 to 2D. FIGS. 2A to 2D are diagrams illustrative of a method of fabricating the multilayer display element 1 according to the exemplary embodiment. FIG. 2A shows an R roll-formed panel 10r (first roll-formed panel) having a plurality of the liquid crystal display panels 3r for R (first display panel), FIG. 2B shows a G roll-formed panel 10g (second roll-formed panel) having a plurality of the liquid crystal display panels 3g for G (second display panel), FIG. 2C shows a B roll-formed panel 10b (second roll-formed panel) having a plurality of the liquid crystal display panels 3b for B (second display panel), and FIG. 2D shows a roll-formed multilayered panel formed by placing the R, G, and B roll-formed panels 10r, 10g, and 10b in layers and bonding them together. In FIGS. 2A to 2C, for easy understanding, although only single liquid crystal display panels 3r, 3g, and 3b (component panels) are shown, the drawings actually show roll-formed panels mounted with multiple liquid crystal display panels 3r, 3g, and 3b. In addition, in the descriptions below, although the roll-formed panel is taken as an example to describe the method of fabricating the multilayer display element 1, even a multilayer liquid crystal display element 1 in a sheet-like panel can be fabricated by the similar fabrication method.

First, as shown in FIG. 2A, the R roll-formed panel 10r having a plurality of the liquid crystal display panels 3r for R is formed. The R roll-formed panel 10r is formed in which the cylindrical spacers and the sealing material 13r are formed in the area of forming the upper electrodes 163 (scanning electrodes) formed on the roll upper film substrate 161 (scanning electrode substrate). As shown in FIG. 33A, the spacers are sprayed on the lower electrodes (data electrodes) formed on the lower film substrate (data electrode substrate), both of the substrates are bonded together, and then the cholesteric liquid crystals for selectively reflecting red color are filled and sealed. Subsequently, as shown in FIGS. 2B and 2C, by the fabrication method similar to that of the R roll-formed panel 10r, the G and B roll-formed panels 10g and 10b are formed which have a plurality of the liquid crystal display panels 3g and 3b for G and B, respectively.

Subsequently, the R, G, and B roll-formed panels 10r, 10g, and 10b are placed in layers and joined together such that the R, G, and B display panels 3r, 3b, and 3c are laid on one another, and then a roll-formed multilayered panel 12 is formed. The R, G, and B roll-formed panels 10r, 10g, and 10b are placed in layers and bonded together with an adhesive or adhesive film in order of B, G, and R from the upper side.

After that, as shown in FIG. 2D, the roll-formed multilayered panel is separately divided and cut at panel boundaries into the individual multilayer liquid crystal display panels 3 formed in the roll-formed multilayered panel to form a plurality of the multilayer liquid crystal display panels 3. In the cut end surface, the scanning electrodes 21r, 21g, and 21b and the data electrodes 23r, 23g, and 23b are exposed. At each of the exposed portions of the electrodes 21r, 21g, 21b, 23r, 23g, and 23b, conductive paste, silver nano paste, for example, is discharged and applied along the exposed electrodes by screen printing or an ink jet method to draw and form interconnects such that connections are made from layer to layer. A moisture-proof protective film may be formed on the exposed electrode surface, as necessary. Then, the multilayer liquid crystal display panel 3 is baked by infrared rays or the like at 150° C. to 170° C. for 30 minutes to 2 hours. Thus, the liquid crystal display panels 3r, 3g, and 3b for R, G, and B of the multilayer liquid crystal display panel 3 are interconnected from layer to layer.

Subsequently, as shown in FIG. 1, as similar to the side surface of the multilayer liquid crystal display panel 3, the data signal input terminals 4 are distributed to the under surface of the liquid crystal display panel 3r for R by conductive paste. The data signal input terminals 4 function as external connecting terminals for use in connection to the FPC 27. Subsequently, to the data signal input terminals 4 as lead electrodes (conductive paste electrodes), the FPC (flexible printed circuit board) is joined, on which the liquid crystal drive IC is mounted. The data signal input terminals 4 are joined to the FPC by using the ACF (anisotropic conductive film).

In FIG. 1, although only the data signal input terminals 4 on the data electrodes 23r, 23g, and 23b sides are shown, near the other end side that is rotated at an angle of 90° with respect to one end side on which the data signal input terminals 4 are formed, the scan signal input terminals (external lead terminals) are formed by the similar processes as those of the data signal input terminals 4, and the flexible printed circuit board is connected to the terminals. Thus, the multilayer liquid crystal display element 1 shown in FIG. 1 is completed.

As described above, according to the embodiment, the number of the flexible printed circuit boards is two boards (on the scanning electrode side and the data electrode side), the number of the liquid crystal drive ICs are two ICs, and the number of times to make ACF connections is also two times. As described above, in the method of fabricating the multilayer display element according to the exemplary embodiment, the number of components is drastically reduced as compared with prior art 1, the work to again conduct ACF compression bonding is unnecessary, compression bonding is conducted for two times, and man-hours are drastically reduced. In addition, in the exemplary embodiment, in contrast to prior art 2, since multiple panels can be prepared in the roll state or the sheet state up to the step of layering panels, facilities can be reduced and man-hours can be shortened because of preparation of multiple panels, and further cost-cutting can be made.

In prior art 1, large numbers of the FPCs 127r, 127g, 127b, 125r, 125g, and 125b and the relay board (FPC 125) are used for wiring in the multilayer liquid crystal display element 100. This is because connecting terminals are formed on the individual liquid crystal display panels 103r, 103g, 103b for R, G, and B. Prior art 1 has merits of a narrow picture frame and improved production yields by combining the liquid crystal display panels 103r, 103g, 103b for R, G, and B of good quality. On the other hand, prior art 1 has problems of large numbers of components, the occurrence of connection failure between the liquid crystal display panel and the FPC in placing panels in layers, a large number of connecting points, the difficulty of preparation of multiple panels in the multilayered state, and a large number of process steps.

There is also the method in which display panels are placed in layers and then the terminals are connected, as prior art 2. However, prior art 2 has a problem that the picture frame area is widened because the step exposed portion is provided in the connecting portion as described above. On the other hand, prior art 3 solves the problems of large numbers of components and a large number of connecting points, because panels are connected from layer to layer by through wiring. However, prior art 3 has three through wiring portions in a pixel. Because the through wiring portions do not contribute to display, the pixel area contributing to display is reduced. On this account, prior art 3 has a dark display screen, and prior art 3 also has a problem that unnecessary potential occurs because the through wiring contacts to liquid crystals. In addition, prior art 3 has a problem of a reduction in production yields, because electrodes are formed on the front and back surfaces of the substrate and then liquid crystals are filled to complete a multilayer liquid crystal display element after the panels are placed in layers.

In the embodiment, it is an object of the multilayer liquid crystal display element 1 to implement a multilayer structure at low costs with high reliability using the scanning electrode substrates 9r, 9g, and 9b and the data electrode substrates 11r, 11g, and 11b, which are film substrates, and a multilayer mounting configuration of simple matrix drive can be provided.

Prior art 3 is incapable of using film substrates because high temperature processes are involved to joining substrates from layer to layer and fabricating a pixel drive transistor array, and the technique uses glass substrates. The embodiment can provide a method of fabricating the multilayer display element, which is capable of joining substrates from layer to layer at low temperatures such that film substrates can be used for the scanning electrode substrates 9r, 9g, and 9b and the data electrode substrates 11r, 11g, and 11b. In the embodiment, as one of methods of layer-to-layer interconnection at low temperatures, side surface wiring by conductive paste is presented, in which conductive paste is applied to the scanning electrodes and the data electrodes exposed in the sections when the roll-formed multilayered panel or the sheet-like multilayered panel is separately divided and cut into individual multilayer liquid crystal display panels 3.

Prior art 3 uses a multilayer structure of a guest-host transmissive liquid crystal display element on the principles of RGB optical absorption, in which a reflective layer, a quarter-wave plate, a scattering layer, and a pixel drive transistor array layer are used to configure a reflective display. On this account, prior art 3 has to use glass plates, and the electrode inside the pixel causes the degradation of brightness when pixels are arranged in high density. In the embodiment, the multilayer liquid crystal display element 1 uses interference reflection cholesteric liquid crystals of simple matrix drive. Thus, the multilayer liquid crystal display element 1 can configure a simple, flexible multilayer structure with a fewer number of components, and can provide display with no occurrence of degradation of brightness even though pixels are arranged in high density (high definition pixels).

As described above, in the method of fabricating the multilayer display element according to the embodiment, there is no process of again conducting compression bonding in prior art 1, there is no occurrence of a picture frame area in prior art 2, and film substrates can be used in contrast to prior art 3. In addition, in the method of fabricating the multilayer display element according to the embodiment, because the roll-formed or sheet-like display panels 3r, 3g, and 3b for R, G, and B are placed in layers, cut the panels, and then the panels are interconnected from layer to layer, multiple panels can be prepared up to the step of layering panels.

There are not excellent methods of conducting side surface wiring by layer-to-layer interconnection at low temperatures in the past. In the embodiment, a discharging and coating method of conductive paste by an ink jet method and the like is used, which is developed in recent years. By this method, in the method of fabricating the multilayer liquid crystal display element according to the embodiment, the data electrode layer-to-layer interconnects and the scanning electrode layer-to-layer interconnects can be distributed on the side surface after the multilayered panel is cut.

Embodiment 2

Figure 3:
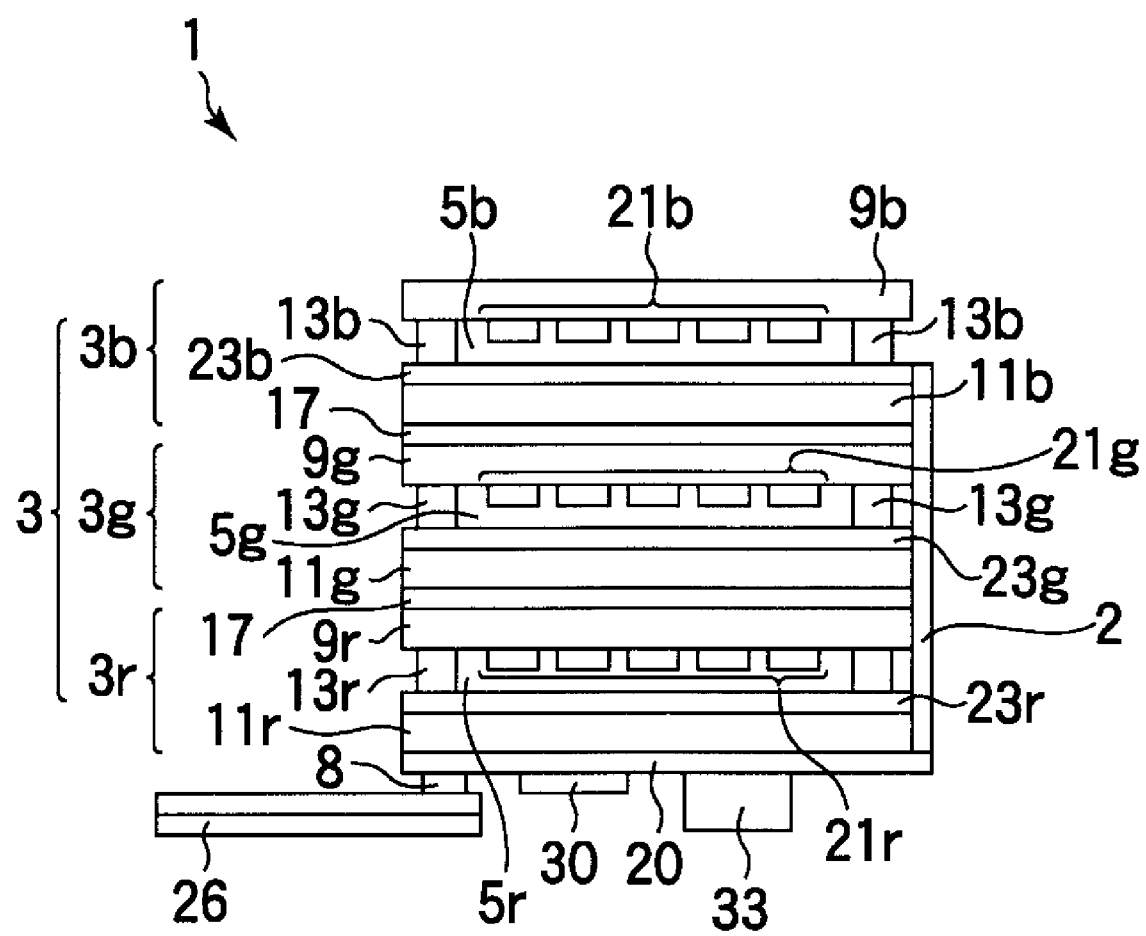
FIG. 3 is a diagram schematically depicting the cross-sectional configuration of a multilayer liquid crystal display element 1 according to embodiment 2 of an exemplary embodiment.

A multilayer display element and a method of fabricating the same according to embodiment 2 of the exemplary embodiment will be described with reference to FIG. 3. FIG. 3 schematically shows the cross-sectional configuration of a multilayer liquid crystal display element 1 according to this embodiment. In the embodiment and embodiments described below, the components exerting the same operations and functions as those of the embodiment 1 are designated the same numerals and signs, and the descriptions are omitted.

As shown in FIG. 3, the multilayer liquid crystal display element 1 according to the embodiment is characterized in that separate components such as a liquid crystal drive IC 33, a control IC 30, and a power supply circuit (not shown) are mounted on the undermost surface, that is, the back surface of a data electrode substrate 11r of a liquid crystal display panel 3r for R. In a wiring area 20 on the back surface of the data electrode substrate 11r, data signal input terminals and scan signal input terminals are formed. Various wire lines formed in the wiring area 20 are formed by printing with conductive paste, copper plating, or the like.

Because the method of fabricating the multilayer display element according to the embodiment is the same as the embodiment 1 described above, except that the liquid crystal drive IC 33 and the like are mounted on the back surface of the data electrode substrate 11r, the descriptions are omitted.

According to the embodiment, the multilayer liquid crystal display element 1 is provided with the circuit having the similar function as that of the display control circuit board 131 of the multilayer liquid crystal display element 100 before on the back surface of the data electrode substrate 11r. Thus, an FPC 26 connected to a multilayer liquid crystal display panel 3 is connected to an electronic appliance on the system side, not shown. Because the number of signals such as control signals outputted from the electronic appliance on the system side is relatively small, the multilayer liquid crystal display element 1 is connected to the electronic appliance on the system side by a fewer number of wire lines. The multilayer liquid crystal display element 1 according to the embodiment further facilitates mounting on the electronic appliance on the system side.

Embodiment 3

A multilayer display element and a method of fabricating the same according to embodiment 3 of the exemplary embodiment will be described with reference to FIGS. 4A to 5E. FIGS. 4A and 4B schematically show the schematic configuration of a multilayer liquid crystal display element 1 according to the embodiment. FIG. 4A is a perspective view schematically depicting the multilayer liquid crystal display element 1, and FIG. 4B is a cross section schematically depicting the multilayer liquid crystal display element 1. In FIG. 4A, two FPCs connected to a multilayer liquid crystal panel 3 are omitted in the drawing. In FIG. 4B, for easy understanding, an FPC 27 is shown as moved to the end part side of a data electrode substrate 11r with respect to the position originally mounted.

As shown in FIG. 4A, the multilayer liquid crystal display element 1 according to the embodiment is characterized by the forms of data signal input terminals 4 and scan signal input terminals 6 (lead parts) formed in advance on a data electrode substrate 11r, which is the undermost substrate. In the multilayer liquid crystal display element 1, for example, the data signal input terminals 4 and the scan signal input terminals 6 are provided in advance only on the data electrode substrate 11r in the same layer as data electrodes 23r, only five electrode substrates 9r, 9g, 9b, 11g, and 11b in the upper layers are cut, and then data electrode layer-to-layer interconnects 2 and scanning electrode layer-to-layer interconnects 14 are formed. In the embodiment, because the data signal input terminals 4 and the scan signal input terminals 6 are formed on the surface of forming the data electrodes 23r of the data electrode substrate 11r, five electrode substrates 9r, 9g, 9b, 11g, and 11b in the upper layers have unnecessary portions more or less to be cut.

As shown in FIG. 4A, the multilayer liquid crystal display element 1 has liquid crystal drive ICs 33 and 34 mounted on the surface of forming the data electrodes 23r of the data electrode substrate 11r. A plurality of the data signal input terminals 4 connects a plurality of the data electrodes 23r, 23g, 23b to the output terminals of the liquid crystal drive IC 33 through a plurality of the data electrode layer-to-layer interconnects 2. The liquid crystal drive IC 33 outputs data signals to drive the data electrodes 23r, 23g, and 23b individually connected to the output terminals. The input terminals of the liquid crystal drive IC 33 are connected to a plurality of lead wires 41 formed on the data electrode substrate 11r. As shown in FIG. 4B, the lead wires 41 are connected to wiring parts 45 of the FPC 27 through an ACF 8.

As shown in FIG. 4A, a plurality of the scan signal input terminals 6 connects a plurality of scanning electrodes 21r, 21g, 21b to the output terminals of the liquid crystal drive IC 34 through a plurality of the scanning electrode layer-to-layer interconnects 14. The liquid crystal drive IC 34 outputs scan signals to drive the scanning electrodes 21r, 21g, and 21b individually connected to the output terminals. The input terminals of the liquid crystal drive IC 34 are connected to a plurality of lead wires 43 formed on the data electrode substrate 11r. As similar to the lead wires 41, the lead wires 43 are connected to the wiring parts of the FPC, not shown, through an ACF.

Next, the method of fabricating the multilayer display element according to the embodiment will be described with reference to FIGS. 4A to 5E. FIGS. 5A to 5E show diagrams illustrative of the method of fabricating the multilayer display element according to the embodiment. FIG. 5A shows an R roll-formed panel (first roll-formed panel) 10r having a plurality of liquid crystal display panels 3r for R (first display panel), FIG. 5B shows a G roll-formed panel (second roll-formed panel) 10g having a plurality of liquid crystal display panels 3g for G (second display panel), FIG. 5C shows a B roll-formed panel (second roll-formed panel) 10b having a plurality of liquid crystal display panels 3b for B (second display panel), FIG. 5D shows a roll-formed multilayered panel 12 formed by placing the R, G, and B roll-formed panels 10r, 10g, and 10b in layers and joining them together, and FIG. 5E shows the roll-formed multilayered panel 12 in the state in which the panel 12 is divided into individual multilayer liquid crystal display panels 3. In FIGS. 5A to 5D, for easy understanding, although only single liquid crystal display panels 3r, 3g, and 3b are shown, they are actually roll-formed panels mounted with multiple liquid crystal display panels 3r, 3g, and 3b. In addition, in the descriptions below, although a roll-formed panel is taken as an example to describe the method of fabricating the multilayer display element 1, even a multilayer liquid crystal display element 1 in a sheet-like panel can be fabricated by the similar fabrication method.

Because the method of fabricating the multilayer display element according to the embodiment is almost the same as the embodiment 1 described above, different points will be briefly described. First, as shown in FIGS. 5A to 5C, as similar to the embodiment 1 described above, the R, G, and B roll-formed panels 10r, 10g, and 10b having a plurality of the liquid crystal display panels 3r, 3g, and 3b for R, G, and B, respectively, are formed. At this time, in the R roll-formed panel 10r, the data electrodes 23r, the data signal input terminals 4 partially connected to the data electrodes 23r, the scan signal input terminals 6, and the lead wires 41 and 43 are formed on the lower electrode substrate.

Subsequently, as shown in FIG. 5D, the R, G, and B roll-formed panels 10r, 10g, and 10b are placed in layers and joined together to form the roll-formed multilayered panel 12 such that the R, G, and B display panels 3r, 3b, and 3c are laid on one another, and then the roll-formed multilayered panel is separately divided and cut into the individual liquid crystal display panels 3r, 3g, and 3b for R, G and B placed in layers. Subsequently, as shown in FIG. 5E, the end parts of the scanning electrode substrates 9r, 9g, 9b and the data electrode substrates 11g, and 11b are cut such that the data signal input terminals 4, the scan signal input terminals 6, and the lead wires 41 and 43 are exposed.

Subsequently, as shown in FIGS. 4A and 4B, in order to connect the data electrodes 23g and 23b of the liquid crystal display panels 3g and 3b for G and B to the data signal input terminals 4 corresponding to the data electrodes 23g and 23b, conductive paste, silver nano paste, for example, is discharged by screen printing or an ink jet method, and the data electrode layer-to-layer interconnects 2 are formed to connect the electrodes from layer to layer. Subsequently, in order to connect the scanning electrodes 21r, 21g, and 21b of the liquid crystal display panels 3r, 3g, and 3b for R, G, and B to the scan signal input terminals 6 corresponding to the scanning electrodes 21r, 21g, and 21b, the scanning electrode layer-to-layer interconnects 14 are formed by the similar method as that of the data electrode layer-to-layer interconnects 2.

Subsequently, the liquid crystal drive ICs 33 and 34 are mounted at predetermined positions on the data electrode substrate 11r. Subsequently, as shown in FIG. 4B, the lead wires 41 are connected to the FPC 27, the lead wires 43 are connected to the FPC (not shown), and these FPCs are connected to a display control circuit board, not shown. Thus, the multilayer liquid crystal display element 1 is completed.

As described above, the multilayer display element and the method of fabricating the same according to the embodiment, because the numbers of components and connecting points can be reduced, the similar advantages as those of the embodiment 1 described above can be obtained.

Embodiment 4

A multilayer display element and a method of fabricating the same according to embodiment 4 of the exemplary embodiment will be described with reference to FIGS. 6A to 8C. FIGS. 6A to 6C schematically show the schematic configuration of preferable forms of data electrode layer-to-layer interconnects 2 and data signal input terminal 4 of a multilayer liquid crystal display element 1 according to the embodiment. FIG. 6A is a plan view depicting data electrode substrates 11r, 11g, and 11b in which the multilayer liquid crystal display element 1 is exploded into liquid crystal display panels 3r, 3g, and 3b for R, G, and B and scanning electrode substrates 9r, 9g, and 9b are removed. FIG. 6A shows the liquid crystal display panels 3b, 3g, and 3r for B, G, and R from the upper side in the drawing. FIG. 6B shows one side surface (first side surface) of the multilayer liquid crystal display element 1 on which the data electrode layer-to-layer interconnects 2 are formed, and FIG. 6C is a diagram depicting the vicinity of the data signal input terminals 4 formed on the back surface of the data electrode substrate 11r when seen in the normal direction to the back surface.

As shown in FIGS. 6A and 6B, the multilayer liquid crystal display element 1 according to the embodiment has lead wire lines 47r, 47g, and 47b formed in the non-display area on the outer region side of sealing materials 13r, 13g, and 13b, for example. A plurality of the lead wire lines 47b formed on the data electrode substrate 11b is connected to a plurality of data electrodes 23b, individually, and formed so as to come together in the upper right, for example, of the data electrode substrate 11b in the drawing at predetermined intervals. A plurality of the lead wire lines 47g formed on the data electrode substrate 11g is connected to a plurality of data electrodes 23g individually, and formed so as to come together at the center right, for example, of the data electrode substrate 11g in the drawing at predetermined intervals. A plurality of the lead wire lines 47r formed on the data electrode substrate 11r is connected to a plurality of data electrodes 23r, individually, and formed so as to come together in the lower right, for example, of the data electrode substrate 11r in the drawing at predetermined intervals. Therefore, the lead wire lines 47r, 47g, and 47b are formed to be moved such that they are not laid on one another at the substrate end parts when seen in the normal direction to the substrate surfaces of the data electrode substrates 11r, 11g, and 11b.

As shown in FIG. 6B, a plurality of the data electrode layer-to-layer interconnects 2 is formed on one side surface of the multilayer liquid crystal display element 1. The data electrode layer-to-layer interconnects 2 connect a plurality of the lead wire lines 47r, 47g, and 47b exposed in the one side surface to a plurality of the data signal input terminals 4 formed on the back surface of the data electrode substrate 11r. The data electrode layer-to-layer interconnects 2 that connect the lead wire lines 47b to the data signal input terminals 4 are formed on the one side surface across the liquid crystal display panels 3r, 3g, and 3b for R, G, and B. The data electrode layer-to-layer interconnects 2 that connect the lead wire lines 47g to the data signal input terminals 4 are formed across the one side surface of the liquid crystal display panels 3r and 3g for R and G. The data electrode layer-to-layer interconnects 2 that connect the lead wire lines 47r to the data signal input terminals 4 are formed only on one side surface of the liquid crystal display panel 3r for R.

As shown in FIG. 6C, the data signal input terminals 4 are formed on the substrate end part of the data electrode substrate 11r such that the terminals 4 are laid on the lead wire lines 47r, 47g, and 47b on the substrate end part side when seen in the normal direction to the back surface of the data electrode substrate 11r. B data signals are inputted to the data signal input terminals 4 arranged on the upper side in FIG. 6C, G data signals are inputted to the data signal input terminals 4 arranged in the center in the drawing, and R data signals are inputted to the data signal input terminals 4 arranged on the lower side in the drawing.

Figure 7C:
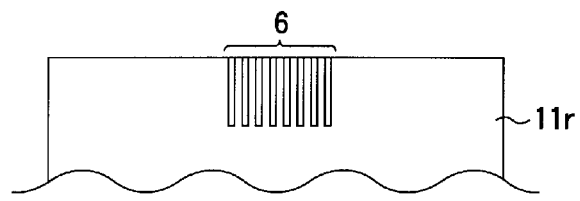
FIGS. 7A to 7C are diagrams schematically depicting the schematic configuration of scanning electrode layer-to-layer interconnects 14 and scan signal input terminals 6 of the multilayer liquid crystal display element 1 according to the embodiment 4 of an exemplary embodiment.
Figure 7B:
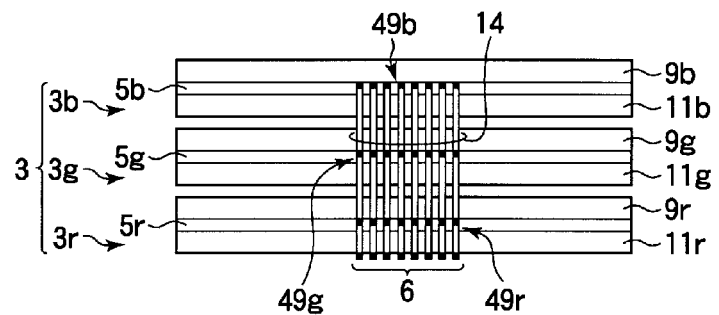
Figure 7A:
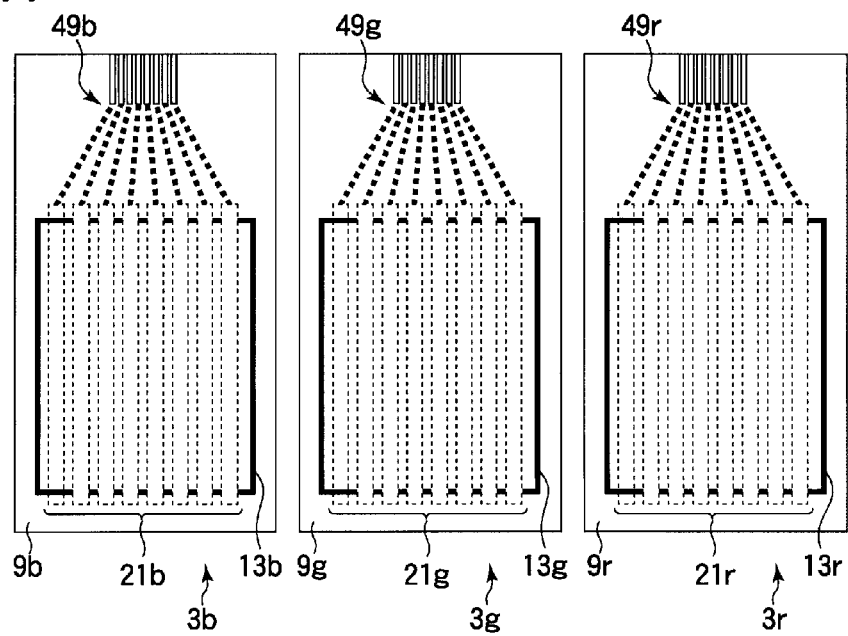

FIGS. 7A to 7C schematically show the schematic configuration of preferable forms of scanning electrode layer-to-layer interconnects 14 and scan signal input terminals 6 of the multilayer liquid crystal display element 1 according to the embodiment. FIG. 7A is a plan view depicting the liquid crystal display panels 3r, 3g, and 3b for R, G, and B as the multilayer liquid crystal display element 1 is exploded, FIG. 7B shows the other side surface (second side surface) of the multilayer liquid crystal display element 1, on which the scanning electrode layer-to-layer interconnects 14 are formed, and FIG. 7C shows the vicinity of the scan signal input terminals 6 formed on the back surface of the data electrode substrate 11r. FIG. 7A shows the liquid crystal display panels 3b, 3g, and 3r for B, G, and R from the left side in the drawing.

As shown in FIGS. 7A and 7B, the multilayer liquid crystal display element 1 according to the embodiment has lead wire lines 49r, 49g, and 49b formed in the non-display area on the outer region side of the sealing materials 13r, 13g, and 13b, for example. A plurality of the lead wire lines 49b formed on the scanning electrode substrate 9b is individually connected to a plurality of scanning electrodes 21b, and formed so as to come together in the center of one end side, for example, of the scanning electrode substrate 9b at predetermined intervals. A plurality of the lead wire lines 49g formed on the scanning electrode substrate 9g is individually connected to a plurality of scanning electrodes 21g, and formed so as to come together in the center of one end side, for example, of the scanning electrode substrate 9g at predetermined intervals. A plurality of the lead wire lines 49r formed on the scanning electrode substrate 9r is individually connected to a plurality of scanning electrodes 21r, and formed so as to come together in the center of one end side, for example, of the scanning electrode substrate 9r at predetermined intervals. The lead wire lines 49r, 49g, and 49b are formed such that they are laid on one another at the substrate end parts of the scanning electrode substrates 9r, 9g, and 9b when seen in the normal direction to the substrate surfaces of the scanning electrode substrates 9r, 9g, and 9b. The lead wire lines 49r, 49g, and 49b are led in the direction nearly orthogonal to the direction of leading the lead wire lines 47r, 47g, and 47b shown in FIG. 6A. In other words, the lead wire lines 49r, 49g, and 49b are led in the direction rotated at an angle of 90° with respect to the direction of leading the lead wire lines 47r, 47g, and 47b as the center axis orthogonal to the substrate surfaces of the scanning electrode substrates 9r, 9g, and 9b is the rotation axis.

As shown in FIG. 7B, a plurality of the scanning electrode layer-to-layer interconnects 14 is formed on the other side surface (second side surface) of the multilayer liquid crystal display element 1 different from one side surface on which the data electrode layer-to-layer interconnects 2 are formed. A plurality of the scanning electrode layer-to-layer interconnects 14 is formed so as to connect a plurality of the lead wire lines 49*r*, 49*g*, 49*b* exposed in the other side surface to a plurality of the scan signal input terminals 6 formed on the back surface of the data electrode substrate 11*r*. The lead wire lines 49*r*, 49*g*, and 49*b* are laid on one another when seen in the normal direction to the substrate surfaces. Thus, the lead wire lines 49*r*, 49*g*, and 49*b* laid on one another when seen in the normal direction to the substrate surface are connected in common by the scanning electrode layer-to-layer interconnects 14. Because the scanning electrode layer-to-layer interconnects 14 are shared among the liquid crystal display panels 3*r*, 3*g*, and 3*b* for R, G, and B, as shown in FIG. 7C, the scan signal input terminals 6 are also shared among the liquid crystal display panels 3*r*, 3*g*, and 3*b* for R, G, and B.

Next, the method of fabricating the multilayer display element according to the embodiment will be described with reference to FIGS. 6A and 7C. Because the method of fabricating the multilayer liquid crystal display element 1 according to the embodiment is almost the same as that of the embodiment 1 described above, different points will be described briefly. First, for example, an R roll-formed multi-layered panel is formed in which an R roll lower film substrate formed with the data electrodes 23*r* and the lead wire lines 47*r* shown in FIG. 6A is bonded to an R roll upper film substrate formed with the scanning electrodes 21*r* and the lead wire lines 49*r* shown in FIG. 7A. Similarly, G and B roll-formed multilayered panels are formed in which G and B roll lower film substrates formed with the data electrodes 23*g* and 23*b* and the lead wire lines 47*g* and 47*b* shown in FIG. 6A are bonded to G and B roll upper film substrates formed with the scanning electrodes 21*g* and 21*b* and the lead wire lines 49*g* and 49*b* shown in FIG. 7A. Subsequently, by the similar fabrication method as that of the embodiment 1 described above, for example, a roll-formed multilayered panel is separately divided and cut at panel boundaries into the individual liquid crystal display panels 3*r*, 3*g*, and 3*b* for R, G, and B placed in layers to form a plurality of the multilayer liquid crystal display panels 3.

Subsequently, as shown in FIG. 6B, the data electrode layer-to-layer interconnects 2 are formed so as to cover the exposed portions of the end parts of the lead wire lines 47*r*, 47*g*, and 47*b* to connect the electrodes from layer to layer. The data electrode layer-to-layer interconnects 2 are led to the back surface of the data electrode substrate 11*r*, which is the undermost side of the multilayer liquid crystal display panel 3, and the data signal input terminals 4 are formed. Similarly, as shown in FIG. 7B, the scanning electrode layer-to-layer interconnects 14 are formed so as to cover the exposed portions of the end parts of the lead wire lines 49*r*, 49*g*, and 49*b* to connect the electrodes from layer to layer. The scanning electrode layer-to-layer interconnects 14 are led to the back surface of the data electrode substrate 11*r* to form the scan signal input terminals 6. The data electrode layer-to-layer interconnects 2 and the scanning electrode layer-to-layer interconnects 14 are formed by an ink jet method or the like in which silver, copper, gold or the like nano paste is discharged and coated to bake the substrates at temperatures of 150 to 170° C. for about 30 minutes to 2 hours. After that, preferably, a moisture-proof coating is provided on the wiring parts. Here, other than the ink jet method, the data electrode layer-to-layer interconnects 2 and the scanning electrode layer-to-layer interconnects 14 may be formed by screen printing.

Subsequently, the data signal input terminals 4 and the scan signal input terminals 6 are connected to a flexible printed circuit board through an ACF (they are not shown). It is also considered that a flexible printed circuit board is directly joined to the exposed portions of the end parts of the lead wire lines 47*r*, 47*g*, and 47*b* and to the exposed portions of the end parts of the lead wire lines 49*r*, 49*g*, and 49*b* through an ACF. In this case, it is necessary to increase the area of the exposed portion having a film thickness of 1 μm or below in advance by copper plating, for example. Subsequently, the end part of the FPC on the side not connected to the multilayer liquid crystal display panel 3 is connected to a display control circuit board, not shown. Thus, the multilayer liquid crystal display element 1 is completed.

Next, a multilayer display element according to an exemplary modification of the embodiment will be described with reference to FIGS. 8A to 8C. FIGS. 8A to 8C schematically show the schematic configurations of data electrode layer-to-layer interconnects 2 and data signal input terminals 4 of a multilayer liquid crystal display element 1 according to the exemplary modification. FIG. 8A is a plan view depicting data electrode substrates 11*r*, 11*g*, and 11*b* in which the multilayer liquid crystal display element 1 is exploded into individual liquid crystal display panels 3*r*, 3*g*, and 3*b* for R, G, and B and scanning electrode substrates 9*r*, 9*g*, and 9*b* are removed, FIG. 8B shows one side surface of the multilayer liquid crystal display element 1 on which the data electrode layer-to-layer interconnects 2 are formed, and FIG. 8C shows the vicinity of the data signal input terminals 4 formed on the back surface of the data electrode substrate 11*r*.

In the structure of the lead wire lines 47*r*, 47*g*, and 47*b* shown in FIG. 6A, a problem arises that because the lead wire lines in each color are gathered for wiring, the lead wire lines 47*r*, 47*g*, and 47*b* come gather to cause an increase in the picture frame area. In contrast to this, in the exemplary modification, as shown in FIGS. 8A and 8B, lead wire lines 47*r*, 47*g*, and 47*b* are nested for wiring. Thus, when the liquid crystal display panels 3*b*, 3*g*, and 3*r* for B, G, and R are laid on one another, the lead wire lines 47*r*, 47*g*, and 47*b* are repeatedly arranged in order of B, G, and R when seen in the normal direction to the substrate surface of the data electrode substrate 11*r*. The lead wire 47*b* is arranged as moved to one corner side of the end part of the data electrode 23*b* (on the upper side in the drawing), the lead wire 47*g* is arranged almost in the center of the end part of the data electrode 23*b*, and the lead wire 47*r* is arranged as moved to the other corner side of the end part of the data electrode 23*r* (on the lower side in the drawing). The lead wire lines 47*r*, 47*g*, and 47*b* can be linearly formed in the direction almost in parallel with the direction of extending the data electrodes 23*r*, 23*g*, and 23*b*. Thus, the amount of gathering the lead wire lines 47*r*, 47*g*, and 47*b* is smaller, and the picture frame area can be made much smaller.

As shown in FIG. 8B, in the exemplary modification, the data electrode layer-to-layer interconnects 2 are formed in a minimum necessary length that can connect between the exposed portions of the lead wire lines 47*r*, 47*g*, and 47*b* exposed in one side surface of the multilayer liquid crystal display element 1 and the data signal input terminals. However, the data electrode layer-to-layer interconnects 2 unnecessarily have a minimum necessary length. Of course, all the data electrode layer-to-layer interconnects 2 may be formed to provide connections across the liquid crystal display panels 3*r*, 3*g*, and 3*b* for R, G, and B by screen printing, for example.

As described above, the multilayer display elements and the methods of fabricating the same according to the embodiment and the exemplary modification, because the numbers of components and connecting points can be reduced, the similar advantages as those of the embodiment 1 described above can be obtained.

Embodiment 5

A multilayer display element and a method of fabricating the same according to embodiment 5 of the exemplary embodiment will be described with reference to FIGS. 9A to 9C. FIGS. 9A to 9C show diagrams illustrative of a multilayer liquid crystal display element 1 according to the embodiment and a method of fabricating the same. FIG. 9A shows the substrate end part of a data electrode substrate 11r of a liquid crystal display panel 3r for R configuring the multilayer liquid crystal display element 1 according to the embodiment, and FIGS. 9B and 9C show a method of forming data electrode layer-to-layer interconnects 2. Although FIGS. 9A to 9C show only the side surface of the data electrode substrate 11r on which the data electrode layer-to-layer interconnects 2 are formed, the side surfaces of data electrode substrates 11g and 11b, scanning electrode substrates 9r, 9g, and 9b, and a multilayer liquid crystal display panel 3 formed with scanning electrode layer-to-layer interconnects have similar configurations.

As shown in FIG. 9A, the multilayer liquid crystal display element 1 according to the embodiment has a plurality of first interconnect forming grooves 51 for forming a plurality of the data electrode layer-to-layer interconnects 2 on one side surface (first side surface). The first interconnect forming grooves 51 are formed along the data electrode layer-to-layer interconnects 2. In addition, the first interconnect forming groove 51 is formed in a V-shape when seen in the normal direction to the substrate surface of the data electrode substrate 11r. On this account, the area of the exposed portions of the data electrodes 23r becomes larger in this one side surface. In addition, the data electrode layer-to-layer interconnects 2 are formed to bury the first interconnect forming grooves 51. Thus, as compared with the embodiments 1 to 4 described above, in the embodiment, the contact area between the data electrode layer-to-layer interconnects 2 and the data electrodes 23r becomes larger. Moreover, the first interconnect forming grooves 51 exert an advantage of preventing short circuits between adjacent interconnects of the data electrode layer-to-layer interconnects 2 in ink jet coating.

In addition, not shown in the drawing, the multilayer liquid crystal display element 1 has a plurality of second interconnect forming grooves for forming a plurality of the scanning electrode layer-to-layer interconnects on the other side surface (second side surface) in which scanning electrodes are exposed, the other side surface being different from the one side surface. The second interconnect forming groove is formed in a V-shape as similar to the first interconnect forming groove 51. Thus, the second interconnect forming grooves provide the similar advantages as those of the first interconnect forming grooves 51.

Next, the method of fabricating the multilayer liquid crystal display element 1 according to the embodiment will be described. The method of fabricating the multilayer liquid crystal display element 1 according to the embodiment is the same as that of the embodiment 1 described above, except that the first and second interconnect forming grooves are formed and the data electrode layer-to-layer interconnects and the scanning electrode layer-to-layer interconnects are formed in the first and second interconnect forming grooves. Therefore, in the descriptions below, only methods of forming the first interconnect forming grooves and the data electrode layer-to-layer interconnects will be described. In addition, because methods of forming the second interconnect forming grooves and the scanning electrode layer-to-layer interconnects are the same as the methods of forming the first interconnect forming grooves and the data electrode layer-to-layer interconnects, the descriptions are omitted.

For example, after a roll-formed multilayered panel is divided into individual multilayer liquid crystal display panels 3, as shown in FIG. 9B, the multilayer liquid crystal display panel 3 is aligned by using a die with grooves such that the tip end of the V-groove is nearly matched with the center of the patterns of the data electrode 23r and data electrodes 23g and 23b, not shown, and then the multilayer liquid crystal display panel 3 is cut. Thus, the first interconnect forming grooves 51 are formed. Subsequently, as shown in FIG. 9C, the first interconnect forming grooves 51 are buried with conductive paste 53 by brush coating, and baked at a temperature of 150° C. In this stage, because the conductive paste 53 is formed throughout one side surface of the multilayer liquid crystal display panel 3, the data electrodes 23r, 23g, and 23b are short-circuited with one another. Subsequently, the portion depicted by alternate long and short dashed line A-A shown in FIG. 9C is cut in a linear die. Thus, as shown in FIG. 9A, an electrical isolator is formed between the adjacent interconnects of the data electrode layer-to-layer interconnects 2, only the data electrode layer-to-layer interconnects 2 are joined along the direction of placing the liquid crystal display panel 3 in layers, and the adjacent data electrode layer-to-layer interconnects 2 and the data electrodes 23r, 23g, and 23b are insulated from one another. Thus, the data electrode layer-to-layer interconnects 2 are formed.

The shape of the first interconnect forming groove 51 is not limited to a V-shape, which may be a U-shape, or a wave shape. In addition, conductive paste may be formed by screen printing, an ink jet method, or plating. In addition, the grooves and the interconnects may be formed in which the first interconnect forming grooves 51 are formed and cut in a linear die to form an electrical isolator, and after that, a conductive member is filled in the first interconnect forming groove 51 to form the data electrode layer-to-layer interconnects 2. In addition, other than cutting by a die, the first interconnect forming grooves 51 may be cut and formed by laser ($CO_2$, or YAG).

In the multilayer display elements according to the embodiments 1 to 4 described above, the data electrodes and the scanning electrodes inside the multilayer are exposed in the section, and there is a problem that the areas of the exposed portions of both electrodes are small. In contrast to this, according to the embodiment, because the multilayer liquid crystal display element 1 has the first and second interconnect forming grooves in a V-shape, for example, in the section, the areas of the exposed portions of the data electrodes and the scanning electrodes can be increased. Therefore, according to the embodiment, the multilayer liquid crystal display element 1 can more readily and reliably provide electrical connections between the data electrodes and the data electrode layer-to-layer interconnects and electrical connections between the scanning electrodes and the scanning electrode layer-to-layer interconnects.

Embodiment 6

A multilayer display element and a method of fabricating the same according to embodiment 6 of the exemplary embodiment will be described with reference to FIGS. 10 to 11C. First, the schematic configuration of a multilayer liquid crystal display element 1 according to the embodiment will be described with reference to FIGS. 10 to 11C. FIG. 10 is a plan view depicting the multilayer liquid crystal display element 1 according to the embodiment. In FIG. 10, for easy understanding, FPCs originally connected are omitted in the drawing. FIGS. 11A to 11C are cross sections depicting the multilayer liquid crystal display element 1 according to the embodiment. FIG. 11A is a cross section cut at line A-A shown in FIG. 10, FIG. 11B is a cross section cut at line B-B shown in FIG. 10, and FIG. 11C is a cross section cut at line C-C shown in FIG. 10.

As shown in FIGS. 10 to 11C, the multilayer liquid crystal display element 1 according to the embodiment is characterized in that one side surface (first side surface), on which data signal layer-to-layer interconnects 2 are formed, is formed to have a slope. Among the lengths in the direction of extending data electrodes 23r, 23g, and 23b, that of the liquid crystal display panel 3b for B is the longest, that of the liquid crystal display panel 3g for G is the second longest, and that of the liquid crystal display panel 3r for R is the shortest. In addition, a scanning electrode substrate 9r has a longer length in the direction of extending the data electrode 23r than a data electrode substrate 11r has. Similarly, a scanning electrode substrate 9g has a longer length in the direction of extending the data electrode 23g than a data electrode substrate 11g has. Similarly, a scanning electrode substrate 9b has a longer length in the direction of extending the data electrode 23b than a data electrode substrate 11b has.

When the one side surface is formed to have a slope, the exposed areas of the data electrodes 23r, 23g, and 23b are substantially increased. In addition, as shown in FIGS. 11A to 11C, in the cross section, an angle which the data electrode layer-to-layer interconnect 2 and the data signal input terminal 4 form is an obtuse angle. Thus, the data electrode layer-to-layer interconnects 2 and the data signal input terminals 4 can be continuously formed by ink jet coating.

The electrode forming surfaces of the data electrodes 23r, 23g, and 23b and scanning electrodes 21r, 21g, and 21b are arranged on the top and under surfaces of R, G, and B liquid crystal layers 5r, 5g, and 5b having a thickness of a few micrometers. The non-display areas in the outer regions of sealing materials 13r, 13g, and 13b are an air gap having a thickness of a few micrometers. Conductive paste coated by an ink jet method basically enters spaces (air gaps) between the data electrode substrates 11r, 11g, and 11b and the scanning electrode substrates 9r, 9g, and 9b, and spreads into the in-plane direction of the substrates. Thus, the data electrode layer-to-layer interconnects 2 formed of the conductive paste reliably provide electrical contact to the data electrodes 23r, 23g, and 23b.

As shown in FIGS. 11A to 11C, it is sufficient that the coating area of the conductive paste (the data electrode layer-to-layer interconnects 2) is formed from the data electrodes 23r, 23g, and 23b to the back surface of the data electrode substrate 11r, for example. However, the conductive paste may be coated in areas αr, αg, and αb from the exposed portions of the data electrodes 23r, 23g, and 23b to the scanning electrode substrate 9b.

The other side surface (second side surface) in which the scanning electrodes 21r, 21g, and 21b are exposed may be formed to have a slope as similar to one side surface on which the data electrode layer-to-layer interconnects 2 are formed. On this account, the exposed areas of the scanning electrodes 21r, 21g, and 21b are substantially increased. In addition, in the cross section that the scanning electrode substrates 9r, 9g, and 9b are cut in parallel with the direction of extending the scanning electrodes 21r, 21g, and 21b, an angle which the scanning electrode layer-to-layer interconnect and a scan signal input terminal form is an obtuse angle. Thus, the scanning electrode layer-to-layer interconnects and the scan signal input terminals can be continuously formed by ink jet coating.

Because the method of fabricating the multilayer display element according to the embodiment is the same as that of the embodiment 4 described above, except that at least one of the exposed portions of the data electrodes and the scanning electrodes is cut to have a slope, the descriptions are omitted.

As described above, according to the embodiment, because the multilayer liquid crystal display element 1 has one side surface and/or the other side surface having a slope, the areas of the exposed portions of the data electrodes and/or the scanning electrodes can be increased, the similar advantages as those of the embodiment 5 can be obtained.

Embodiment 7

A multilayer display element and a method of fabricating the same according to embodiment 7 of the exemplary embodiment will be described with reference to FIGS. 12 and 13. First, the schematic configuration of a multilayer liquid crystal display element 1 according to the embodiment will be described with reference to FIG. 12. FIG. 12 is a cross section depicting the multilayer liquid crystal display element 1 according to the embodiment, showing that the element is cut on data electrodes 23b in the direction of extending the data electrodes 23b.

The multilayer display element according to the embodiment is characterized in that the side surface on which data electrode layer-to-layer interconnects are formed has a slope and the data electrode layer-to-layer interconnects also serve as the function of data signal input terminals. As shown in FIG. 12, the multilayer liquid crystal display element 1 has a configuration in which data electrode layer-to-layer interconnects 2 are connected to an FPC 27 through an ACF 8. The FPC 27 is connected to a multilayer liquid crystal display panel 3 such that a liquid crystal drive IC 33 is arranged on the liquid crystal display panel 3b for B side. Not shown in the drawing, the data electrode layer-to-layer interconnects 2 connected to data electrodes 23r and 23g are formed across the liquid crystal display panels 3 for R, G, and B as similar to the data electrode layer-to-layer interconnects 2 connected to the data electrodes 23b. Thus, mechanical and electrical connections between the entire data electrode layer-to-layer interconnects 2 and the FPC 27 can be sufficiently and reliably provided.

Figure 13:
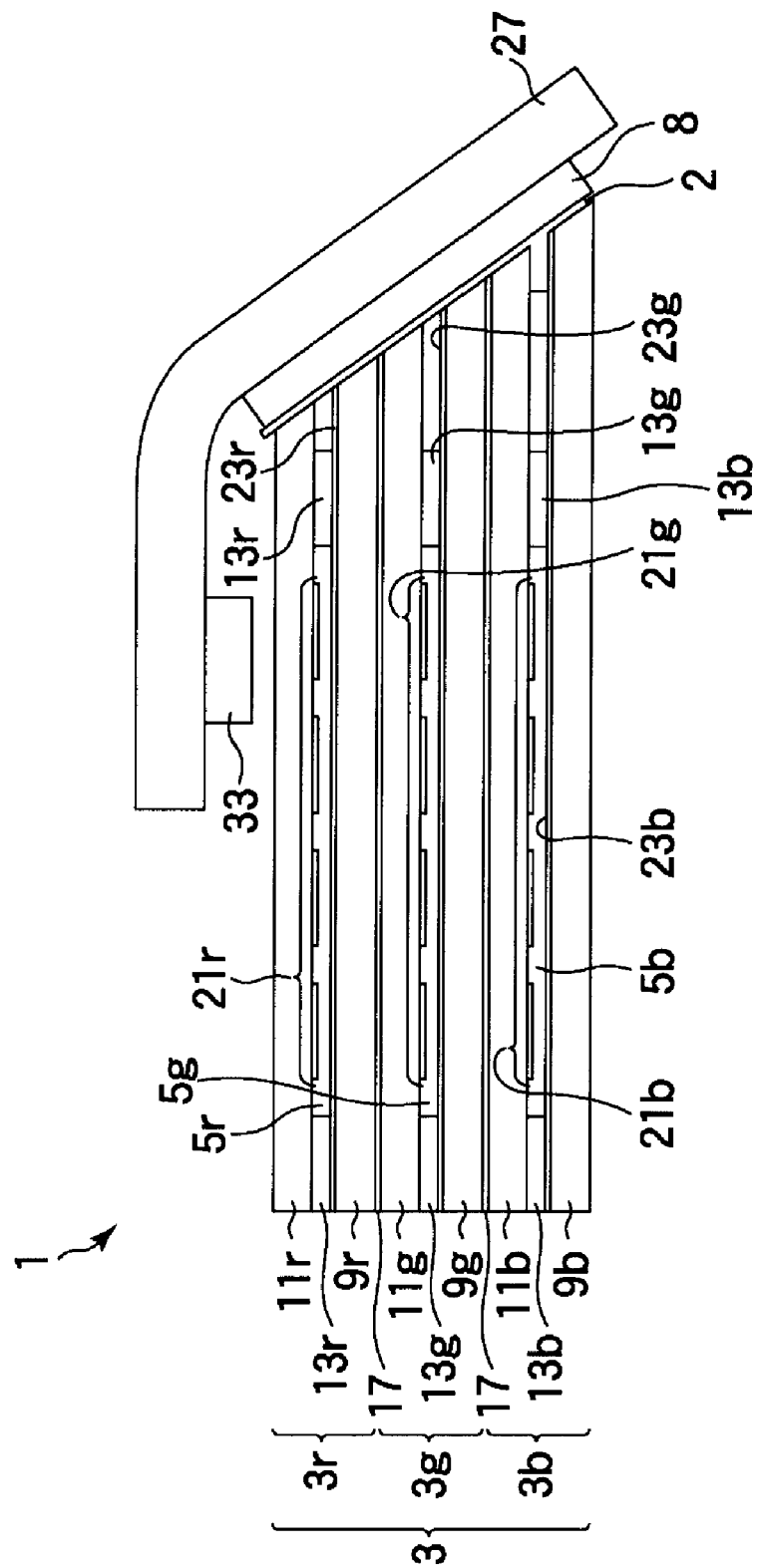
FIG. 13 is across section depicting a multilayer liquid crystal display element 1 according to an exemplary modification of the embodiment 7 of an exemplary embodiment.

FIG. 13 is a multilayer liquid crystal display element 1 according to an exemplary modification of the embodiment, showing a cross section that the element is cut on data electrodes 23b in the direction of extending the data electrodes 23b. The multilayer liquid crystal display element 1 according to the exemplary modification is characterized in that an FPC 27 is connected to a multilayer liquid crystal display panel 3 such that a liquid crystal drive IC 33 is arranged on the liquid crystal display panel 3r for R side. In the embodiment and the exemplary modification, when the liquid crystal display panel 3b for B side is the display surface, in the multilayer liquid crystal display element 1 according to the exemplary modification, the FPC 33 can be bent such that the multilayer liquid crystal display panel 3 is held. Thus, the FPC 27 is hard to come off the data electrode layer-to-layer interconnects 2.

In the embodiment and the exemplary modification, the multilayer liquid crystal display element 1 may have such a configuration that the other side surface in which the scanning electrodes 21r, 21g, and 21b are exposed is formed to have a slope as similar to one side surface on which the data electrode layer-to-layer interconnects 2 are formed, and the FPC is directly connected to scanning electrode layer-to-layer interconnects formed on the other side surface.

Because the methods of fabricating the multilayer display element according to the embodiment and the exemplary modification are the same as that of the embodiment 6 described above, except that the FPC 27 is connected to the data electrode layer-to-layer interconnects 2, the descriptions are omitted.

As described above, according to the embodiment and the exemplary modification, in the multilayer liquid crystal display element 1, because it is unnecessary to form the data signal input terminals and scan signal input terminals on the back surface of a data electrode substrate 11r, for example, fabrication man-hours can be shortened as compared with the embodiment 1 to 6 described above.

Embodiment 8

A multilayer display element and a method of fabricating the same according to embodiment 8 of the exemplary embodiment will be described with reference to FIGS. 14A to 16D. The multilayer display element according to the embodiment is characterized in that data electrode layer-to-layer interconnects and scanning electrode layer-to-layer interconnects are through wiring formed to penetrate through data electrode substrates and scanning electrode substrates. In addition, the through wiring is formed in the non-display area. Moreover, the multilayer display element according to the embodiment has a configuration in which data signal input terminals and scan signal input terminals are formed on the data electrode substrates.

FIGS. 14A to 14E schematically show the vicinity of data electrode layer-to-layer interconnects 2 of a multilayer liquid crystal display element 1 according to the embodiment. FIGS. 14A to 14C are plan views depicting liquid crystal display panels 3b, 3g, and 3r for B, G, and R, respectively, as the multilayer liquid crystal display element 1 is exploded, FIG. 14D is a plan view depicting the vicinity of the data electrode layer-to-layer interconnects 2 of the multilayer liquid crystal display element 1, and FIG. 14E is a cross section cut at line A-A in FIG. 14D. In FIGS. 14A to 14D, scanning electrode substrates are omitted in the drawings. In FIGS. 14C and 14D, an FPC 27 is omitted in the drawings.

As shown in FIG. 14E, the data electrode layer-to-layer interconnects 2 are formed by filling a conductive material in through holes THg and THb that are formed by making opening in data electrode substrates 11g and 11b and scanning electrode substrates 9r, 9b, and 9g. The liquid crystal display panel 3r for R (first display panel) has through holes 58g and 58b only in the scanning electrode substrate 9r arranged on the display surface side between the data electrode substrate 11r and the scanning electrode substrate 9r.

As shown in FIG. 14A, the liquid crystal display panel 3b for B has a plurality of lead electrodes 55b that is individually connected to a plurality of data electrodes 23b and lead to the substrate end part when seen in the normal direction to the substrate surface of the data electrode substrate 11b. Almost in the center of the lead electrode 55b, a through hole 54b2 is formed. In addition, the scanning electrode substrate 11b, not shown, has a through hole 54b1 formed to be laid on the through hole 54b2. As shown in FIGS. 14A and 14E, a diameter φ1 of the through hole 54b1 is about 0.16 mm. A diameter φ3 of the through hole 54b2 is about 0.12 mm. Thus, the lead electrode 55b is partially exposed in the through hole 54b1.

As shown in FIG. 14B, the liquid crystal display panel 3g for G has a plurality of through holes 56b1 and 56b2 formed at the positions laid on a plurality of the through holes 54b1 and 54b2. The through hole 56b1 is formed in the scanning electrode substrate 9g (see FIG. 14E), and the through hole 56b2 is formed in the data electrode substrate 11g. The diameter of the through hole 56b1 is formed to be almost the same length as that of the through hole 54b2. A diameter φ2 of the through hole 56b2 is about 0.08 mm. A data electrode 23g is formed not to extend to the throughholes 56b1 and 56b2. On this account, as described later, even though the data electrode layer-to-layer interconnects 2 are formed, the data electrode 23g is prevented from having a short circuit with the data electrode 23b.

As shown in FIG. 14C, the data electrode substrate 11r has a plurality of connecting terminal wiring parts 57b formed at the positions laid on a plurality of the lead electrodes 55b. The scanning electrode substrate 9r (see FIG. 14E) has a through hole 58b formed at the position laid on the through holes 54b1, 54b2, 56b1, and 56b2. The through hole 58b is formed above the connecting terminal wiring part 57b when seen in the normal direction to the substrate surface of the data electrode substrate 11r. The diameter of the through hole 58b is formed to have almost the same length as the diameter of the through hole 56b2. The through hole THb is configured of the through holes 54b1, 54b2, 56b1, 56b2, and 58b. As shown in FIG. 14E, when a conductive material is filled in the through hole THb to form the data electrode layer-to-layer interconnect 2, the lead electrode 55b exposed in the through hole 54b1 is electrically connected to the connecting terminal wiring part 57b. The connecting terminal wiring part 57b is connected to the data signal input terminal 4. Thus, the data electrode 23b of the liquid crystal display panel 3b for B is connected to the data signal input terminal 4 through the lead electrode 55b, the data electrode layer-to-layer interconnect 2, and the connecting terminal wiring part 57b. In addition, because the data electrode 23g is not formed around the through holes 56b1 and 56b2, the liquid crystal display panel 3g for G electrically bypasses the data electrode layer-to-layer interconnects 2.

As shown in FIG. 14A, the liquid crystal display panel 3b for B has a plurality of through holes 54g1 and 54g2 formed between a plurality of the data electrodes 11b and a plurality of the lead electrodes 55b when seen in the normal direction to the substrate surface of the data electrode substrate 11b. The through holes 54g1 and 54g2 are formed to be laid on each other when seen in the normal direction to the substrate surface of the same. The through hole 54g1 is formed in the scanning electrode substrate 9b (see FIG. 14E), and the through hole 54g2 is formed in the data electrode substrate 11b. A diameter φ1 of the through hole 54g1 is about 0.16 mm. A diameter φ3 of the through hole 54g2 is about 0.12 mm. The data electrode 23b is formed not to extend to the through holes 54g1 and 54g2. On this account, as described later, even though the data electrode layer-to-layer interconnects 2 are formed, the data electrode 23b is prevented from having a short circuit with the data electrode 23g.

As shown in FIG. 14B, the liquid crystal display panel 3g for G has a plurality of through holes 56g1 and 56g2 formed at the positions laid on a plurality of the through holes 54g1 and 54g2 when seen in the normal direction to the substrate surface of the data electrode substrate 11g. The through holes 56g1 and 56g2 are formed to be laid on each other when seen in the normal direction to the substrate surface of the same. A plurality of the data electrodes 23g is formed to extend to a plurality of the through holes 56g1 and 56g2. The through hole 56g1 is formed in the scanning electrode substrate 9g (see FIG. 14E). The through hole 56g2 is formed by making an opening in the data electrode 23g of the data electrode substrate 11g. As shown in FIGS. 14B and 14E, the diameter of the through hole 56*b*1 is formed to have almost the same length as the diameter φ3 of the through hole 54*g*2. A diameter φ2 of the through hole 56*b*2 is about 0.08 mm. Thus, the data electrode 23*g* is partially exposed in the through hole 56*b*1.

As shown in FIG. 14C, the liquid crystal display panel 3*r* for R has a plurality of connecting terminal wiring parts 57*g* arranged between a plurality of the data electrodes 23*r* and a plurality of the connecting terminal wiring parts 57*b*. The connecting terminal wiring parts 57*g* are formed on the data electrode substrate 11*r*. The liquid crystal display panel 3*r* for R has through holes for forming the data electrode layer-to-layer interconnect on at least one of the scanning electrode substrate 9*r* and the data electrode substrate 11*r*. The liquid crystal display panel 3*r* for R has a through hole 58*g* in which the connecting terminal wiring part 57*g* is partially exposed when seen in the normal direction to the substrate surface of the data electrode substrate 11*r*. The through hole 58*g* is formed in the scanning electrode substrate 9*r* (see FIG. 14E). The through hole 58*g* is formed at the position laid on a plurality of the through holes 54*g*1, 54*g*2, 56*g*1, and 56*g*2 when seen in the normal direction to the substrate surface of the data electrode substrate 11*r*. The diameter of the through hole 58*g* is almost the same length as the diameter φ2 of the through hole 56*g*2. The through hole THg is configured of the through holes 54*g*1, 54*g*2, 56*g*1, 56*g*2, and 58*g*.

As shown in FIG. 14E, when a conductive material is filled in the through hole THb to form the data electrode layer-to-layer interconnect 2, the data electrode 23*g* exposed in the through hole 56*g*1 is electrically connected to the connecting terminal wiring part 58*g*. The connecting terminal wiring part 58*g* is connected to the data signal input terminal 4. Thus, the data electrode 23*g* of the liquid crystal display panel 3*g* for G is connected to the data signal input terminal 4 through the data electrode layer-to-layer interconnect 2 and the connecting terminal wiring part 58*g*. In addition, because the data electrode 23*b* is not formed around the through holes 54*g*1 and 54*g*2, the liquid crystal display panel 3*b* for B electrically bypasses the data electrode layer-to-layer interconnects 2.

As shown in FIG. 14C, the data electrode substrate 11*r* has a connecting terminal wiring part 57*r* arranged between the adjacent connecting terminal wiring parts 57*g* and between the adjacent connecting terminal wiring parts 57*b*. The connecting terminal wiring part 57*r* electrically connects the data electrode 23*r* to the data signal input terminal 4.

As shown in FIGS. 14C and 14D, the multilayer liquid crystal display element 1 has a configuration in which the wiring of the individual data electrode substrates 11*r*, 11*g*, and 11*b* for R, G, and B is gathered to the liquid crystal display panel 3*r* for R in the undermost layer by the data electrode layer-to-layer interconnects 2. As shown in FIG. 14D, when the liquid crystal display panels 3*r*, 3*g*, and 3*b* for R, G, and B are placed in layers, the connecting terminal wiring parts 57*r*, 57*g*, and 57*b* are covered by the liquid crystal display panels 3*g* and 3*b* for G and B, and only the data signal input terminals 4 are exposed in the end part of the data electrode substrate 11*r*. As shown in FIG. 14E, the FPC 27 is connected to the exposed data signal input terminals 4 through an ACF 8.

Figure 15B:
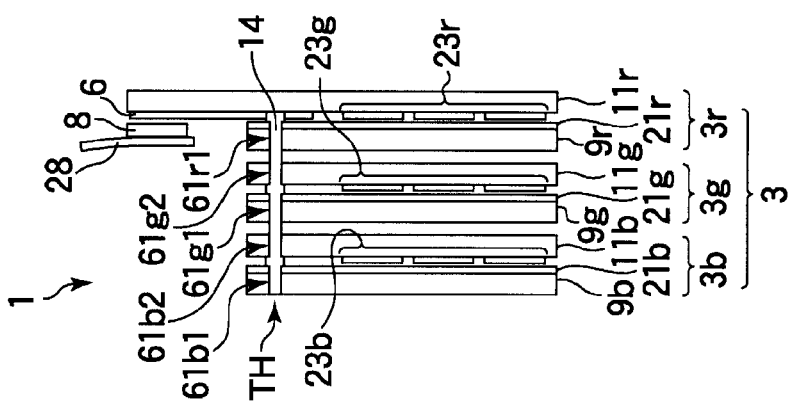
FIGS. 15A and 15B are diagrams schematically depicting the vicinity of scanning electrode layer-to-layer interconnects 14 of the multilayer liquid crystal display element 1 according to the embodiment 8 of an exemplary embodiment.
Figure 15A:
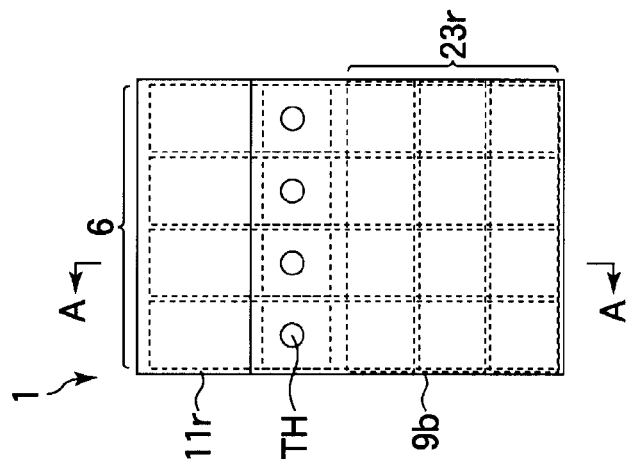

FIGS. 15A to 16D schematically show the vicinity of scanning electrode layer-to-layer interconnects 14 of the multilayer liquid crystal display element 1 according to the embodiment. FIG. 15A is a plan view depicting the vicinity of the scanning electrode layer-to-layer interconnects 14 of the multilayer liquid crystal display element 1, and FIG. 15B is a cross section cut at line A-A in FIG. 15A. FIGS. 16A to 16C are plan views depicting the liquid crystal display panels 3*b*, 3*g*, and 3*r* for B, G, and R as the multilayer liquid crystal display element 1 is exploded, showing the scanning electrode substrates 9*b*, 9*g*, and 9*r*, respectively, and FIG. 16D is a plan view depicting the data electrode substrate 11*r* of the liquid crystal display panel 3*r* for R. In FIGS. 16A and 16B, the data electrode substrates 11*b* and 11*g* are omitted in the drawing. In FIGS. 15A and 16D, an FPC 28 is omitted in the drawing.

Scanning electrodes 21*r*, 21*g*, and 21*b* are formed as orthogonal to the data electrodes 23*r*, 23*g*, and 23*b*. Thus, the scanning electrode layer-to-layer interconnects 14 are formed in the direction rotated at an angle of 90 degrees with respect to the data electrode layer-to-layer interconnects 2 as the center axis orthogonal to the display surface of the multilayer liquid crystal display element 1 is the rotation axis. The scanning electrodes 21*r*, 21*g*, and 21*b* are formed on the scanning electrode substrates 9*r*, 9*g*, and 9*b* arranged on the display surface side, for example.

As shown in FIG. 15B, the scanning electrode layer-to-layer interconnects 14 are formed by filling a conductive material in a through hole TH opened in the data electrode substrates 11*g* and 11*b* and the scanning electrode substrates 9*r*, 9*b*, and 9*g*.

As shown in FIG. 16A, the liquid crystal display panel 3*b* for B has a plurality of through holes 61*b*1 and 61*b*2 formed to penetrate through the scanning electrode substrate 9*b*, the scanning electrode 21*b*, and the data electrode substrate 11*b* when seen in the normal direction to the substrate surface of the scanning electrode substrate 9*b*. The through hole 61*b*1 is formed in the scanning electrode substrate 9*b*, and the through hole 61*b*2 is formed in the data electrode substrate 11*b*. The through holes 61*b*1 and 61*b*2 have the diameter in almost the same length, and are formed to be laid on each other when seen in the normal direction to the substrate surface.

As shown in FIG. 16B, the liquid crystal display panel 3*g* for G has a plurality of through holes 61*g*1 and 61*g*2 formed to penetrate through the scanning electrode substrate 9*g*, the scanning electrode 21*g*, and the data electrode substrate 11*g* when seen in the normal direction to the substrate surface of the scanning electrode substrate 9*g*. The through hole 61*g*1 is formed in the scanning electrode substrate 9*g*, and the through hole 61*g*2 is formed in the data electrode substrate 11*g*. The through holes 61*g*1 and 61*g*2 have the diameter in almost the same length, and are formed to be laid on each other when seen in the normal direction to the substrate surface. In addition, the through holes 61*g*1 and 61*g*2 are formed at the positions nearly laid on the through holes 61*b*1 and 61*b*2 when seen in the normal direction to the substrate surface. The through holes 61*g*1, 61*g*2, 61*b*1, and 61*b*2 have the diameter in almost the same length.

The liquid crystal display panel 3*r* for R has through holes for forming the scanning electrode layer-to-layer interconnects on at least one of the scanning electrode substrate 9*r* and the data electrode substrate 11*r*. As shown in FIG. 16C, the liquid crystal display panel 3*r* for R has a plurality of through holes 61*r*1 formed to penetrate through the scanning electrode substrate 9*r* and the scanning electrode 21*r* when seen in the normal direction to the substrate surface of the scanning electrode substrate 9*r*. The through hole 61*r*1 is formed at the position nearly laid on the through holes 61*b*1, 61*b*2, 61*g*1, and 61*g*2 when seen in the normal direction to the substrate surface. The through hole 61*r*1 has the diameter almost the same length as that of the through holes 61*b*1 and 61*b*2.

As shown in FIG. 16D, the liquid crystal display panel 3*r* for R has a plurality of scan signal input terminals 6 formed on the data electrode substrate 11*r*. The scan signal input terminals 6 are formed on the substrate end part outside the wiring area of the data electrode 23r. The data electrode substrate 11r may have a through hole formed to be almost laid on the through hole 61r1 when seen in the normal direction to the substrate surface of the data electrode substrate 11r. The through hole TH is configured of the through holes 61b1, 61b2, 61g1, 61g2, and 61r1.

As shown in FIGS. 15A and 15B, when the liquid crystal display panels 3r, 3g, and 3b for R, G, and B are placed in layers, the through holes 61b1, 61b2, 61g1, 61g2, and 61r1 are arranged to be almost laid on one another. In addition, the data electrode substrate 11r is placed in layers as extended from the end parts of the liquid crystal display panels 3g and 3b for G and B and the scanning electrode substrate 9r. The scan signal input terminals 6 are exposed in this extended part of the data electrode substrate 11r. The FPC 28 is connected to the exposed scan signal input terminals 6 through the ACF 8.

The scanning electrode layer-to-layer interconnect 14 is formed by filling a conductive material in the through hole TH. As shown in FIG. 15B, when a conductive material is filled in the through holes TH, the conductive material spreads between the scanning electrode substrates 9b, 9g, and 9r and the data electrode substrates 11b, 11g, and 11r. Thus, the scanning electrodes 21b, 21g, and 21r and the scan signal input terminals 6 are electrically connected to each other through the conductive material. The scanning electrodes 21r, 21g, and 21b laid on one another when seen in the normal direction to the substrate surface are shared by the scanning electrode layer-to-layer interconnects 14. In addition, because the scanning electrode layer-to-layer interconnects 14 can be distributed in common with the liquid crystal display panels 3 for R, G, and B, the through holes TH are formed in a single line almost in parallel with the data electrodes 23r.

In the multilayer liquid crystal display element 1 according to the embodiment, the scanning electrode layer-to-layer interconnects 14 are used to electrically connect the scanning electrodes 21r, 21g, and 21b to the scan signal input terminals 6. Thus, the multilayer liquid crystal display element 1 can be configured in which the scan signal input terminals 6 are gathered only on the data electrode substrate 11r.

Next, the method of fabricating the multilayer display element according to the embodiment will be described with reference to FIGS. 14A to 16D. In the descriptions below, although the roll-formed panel is taken and described as an example, even a multilayer display element in a sheet-like panel can be fabricated by the similar fabrication method. First, G and B roll-formed panels (second roll-formed panels) having a plurality of the liquid crystal display panels 3g and 3b for G and B having electrode patterns shown in FIGS. 14A to 16D are formed. The G roll-formed panel is formed in which cylindrical spacers and a sealing material are formed in the area of forming upper electrodes (scanning electrodes) formed on a roll upper film substrate (scanning electrode substrate), spacers are sprayed over lower electrodes (data electrodes) formed on a lower film substrate (data electrode substrate), both of the substrates are bonded together, and then cholesteric liquid crystals for selectively reflecting green light are filled and sealed. The B roll-formed panel is also formed by the similar method as that of the G roll-formed panel.

Subsequently, as shown in FIGS. 14A to 15B, the through holes 54g1, 54g2, 56g1, 56g2, 54b1, 54b2, 56b1, 56b2, 61g1, 61g2, 61b1, and 61b2 are formed to penetrate through liquid crystal display panels for G and B (second display panels) formed on the G and B roll-formed panels. The through holes are opened by $CO_2$ laser or the like.

Subsequently, a roll lower film substrate is formed, on which lower electrodes such as the data electrodes 23r and the scan signal input terminals 6 shown in FIGS. 15A to 16D are formed. Subsequently, a roll upper film substrate is formed, on which upper electrodes such as the scanning electrodes 21r shown in FIGS. 14A to 16D are formed, and the through holes 58g, 58b, and 61r1 are formed to penetrate through the roll upper film substrate. The through holes 58g, 58b, and 61r1 are formed by $CO_2$ laser, for example. Subsequently, through the similar steps as those of the G and B roll-formed panel, the roll upper film substrate formed with the through holes 58g, 58b, and 61r1 is bonded to the roll lower film substrate. Thus, an R roll-formed panel (first roll-formed panel) is formed. Because the roll upper film substrate and the roll lower film substrate have different positions to form the through holes, the through holes are formed in the state of the roll film substrates. In addition, in FIGS. 14A to 15B, when the through holes are formed in the data electrode substrate 11r side at the positions laid on the through holes 58g, 58b, and 61r1, the R roll-formed panel is formed, and then through holes can be formed as similar to the G and B roll-formed panels.

Subsequently, as shown in FIGS. 14A to 15B, the roll-formed panels are aligned, placed in layers, and joined together such that predetermined through holes are laid on each other, and then a roll-formed multilayered panel is formed. Subsequently, conductive paste is filled in the through holes by an ink jet method, and locally heated and baked with infrared rays or the like. Thus, the data electrode layer-to-layer interconnects and the scanning electrode layer-to-layer interconnects are formed to connect the liquid crystal display panels 3r, 3g, and 3b for R, G, and B placed in layers from layer to layer inside the roll-formed multilayered panel. Subsequently, the roll-formed multilayered panel is separately divided into the individual liquid crystal display panels 3r, 3g, and 3b for R, G, and B. In this manner, multiple multilayer liquid crystal display panels can be prepared at the same time. In dividing the roll-formed multilayered panel, the roll-formed multilayered panel is cut such that the data electrode substrate 11r is extended from the liquid crystal display panels 3g and 3b for G and B and the scanning electrode substrate 9r. Thus, as shown in FIGS. 14D and 15A, the data signal input terminals 4 and the scan signal input terminals 6 are exposed on the data electrode substrate 11r.

Subsequently, the FPC 27 is mounted on the data signal input terminals 4, and the FPC 28 is mounted on the scan signal input terminals 6. The FPCs 27 and 28 are connected to a display control circuit board, not shown. Thus, the multilayer liquid crystal display element 1 is completed.

As described above, according to the embodiment, in the multilayer liquid crystal display element 1, through wiring can be formed in the non-display area. On this account, in the multilayer liquid crystal display element 1, the pixel area contributing to display can be made larger, and bright image display is made possible. In addition, the multilayer liquid crystal display element 1 has the connecting terminal wiring parts 57g and 57b formed on the data electrode substrate 11r. On this account, the data electrode layer-to-layer interconnects 2 can contact with the connecting terminal wiring parts 57g and 57b in a larger area. Thus, electrical connections between the data electrode layer-to-layer interconnects 2 and the data signal input terminals 4 can be sufficiently and reliably provided. Moreover, such a structure is formed that through holes are not provided on the data electrode substrate 11r, whereby a conductive material can be prevented from flowing out of the through holes when the conductive material is filled in the through holes THg and THb. In addition, because the data signal input terminal 4 and the scan signal input terminals 6 are formed only on the data electrode substrate 11r, the roll-formed multilayered panel can be cut from one direction on the liquid crystal display panel 3b for B side in order to expose these input terminals 4 and 6, and thus fabrication man-hours can be reduced.

Embodiment 9

A multilayer display element and a method of fabricating the same according to embodiment 9 of the exemplary embodiment will be described with reference to FIGS. 17A to 17E. The multilayer display element according to the embodiment is characterized in that scan signal input terminals are provided on scanning electrode substrates. Because a multilayer liquid crystal display element 1 according to the embodiment has the similar configuration as that of the multilayer liquid crystal display element 1 according to the embodiment 8, except the characteristic described above, the descriptions are omitted on the similar configuration. FIGS. 17A to 17E schematically show the vicinity of scanning electrode layer-to-layer interconnects 14 of the multilayer liquid crystal display element 1 according to the embodiment. FIGS. 17A to 17C are plan views depicting liquid crystal display panels 3b, 3g, and 3r for B, G, and R as the multilayer liquid crystal display element 1 is exploded, FIG. 17D is a plan view depicting the vicinity of the scanning electrode layer-to-layer interconnects 14 in the state in which the liquid crystal display panels 3b, 3g, and 3r for B, G, and R are placed in layers, and FIG. 17E is a cross section cut at line A-A in FIG. 17D. In FIGS. 17A to 17D, data electrode substrates 11r, 11g, and 11b are omitted in the drawing. In FIGS. 17A and 17D, an FPC 28 is omitted in the drawing.

As shown in FIGS. 17D and 17E, the scanning electrode layer-to-layer interconnects 14 are formed by filling a conductive material in through holes TH opened in the data electrode substrates 11g and 11b and scanning electrode substrates 9r, 9b, and 9g. The scanning electrode substrate 9b of the liquid crystal display panel 3b for B is formed to extend from the end parts of the liquid crystal display panels 3r and 3g for R and G and the data electrode substrate 11b. In the extending area of the scanning electrode substrate 9b, scanning electrodes 21b are exposed. The exposed portions of the scanning electrodes 21b function as scan signal input terminals 6. The FPC 28 is connected to the scan signal input terminals 6 through an ACF 8.

As shown in FIG. 17A, the liquid crystal display panel 3b for B has a plurality of through holes 61b1 and 61b2 formed to penetrate through the scanning electrode substrate 9b, the scanning electrode 21b, and the data electrode substrate 11b when seen in the normal direction to the substrate surface of the scanning electrode substrate 9b. The through holes 61b1 and 61b2 are formed apart from the substrate end part at a predetermined distance. The through hole 61b1 is formed in the scanning electrode substrate 9b, and the through hole 61b2 is formed in the data electrode substrate 11b. The through hole 61b1 has the diameter longer than that of the through hole 61b2. The through holes 61b1 and 61b2 are formed to be laid on each other when seen in the normal direction to the substrate surface.

As shown in FIG. 17B, the liquid crystal display panel 3g for G has a plurality of through holes 61g1 and 61g2 formed to penetrate through the scanning electrode substrate 9g, the scanning electrode 21g, and the data electrode substrate 11g when seen in the normal direction to the substrate surface of the scanning electrode substrate 9g. The through hole 61g1 is formed in the scanning electrode substrate 9g, and the through hole 61g2 is formed in the data electrode substrate 11g. The through hole 61g1 has the diameter longer than that of the through hole 61g2, and has the diameter almost the same length as that of the through hole 61b2. The through holes 61g1 and 61g2 are formed to be laid on each other when seen in the normal direction to the substrate surface. In addition, the through holes 61g1 and 61g2 are arranged at the positions nearly laid on the through holes 61b1 and 61b2 when seen in the normal direction to the substrate surface.

As shown in FIG. 17C, the liquid crystal display panel 3r for R has a plurality of through holes 61r1 formed to penetrate through the scanning electrode substrate 9r when seen in the normal direction to the substrate surface of the scanning electrode substrate 9r. The through hole 61r1 is formed at the position nearly laid on the through holes 61b1, 61b2, 61g1, and 61g2 when seen in the normal direction to the substrate surface. The through hole 61r1 has the diameter almost the same length as that of the through hole 61g2. The through hole TH is configured of the through holes 61b1, 61b2, 61g1, 61g2, and 61r1.

As shown in FIGS. 17D and 17E, it is necessary that when the liquid crystal display panels 3r, 3g, and 3b for R, G, and B are placed in layers, the through holes 61b1, 61b2, 61g1, 61g2, and 61r1 are nearly laid on one another. To this end, as shown in FIGS. 17A to 17C, the through hole 61b, 61b2 are formed apart from the substrate end part than the other through holes 61g1, 61g2, and 61r1 by the amount of extending the scanning electrode substrate 9b.

The scanning electrode layer-to-layer interconnect 14 is formed by filling a conductive material in the through hole TH. As shown in FIG. 17E, the conductive material filled in the through hole TH spreads between the data electrode substrates 9b, 9g, and 9r and the scanning electrode substrates 11b, 11g, and 11r. Thus, the scanning electrodes 21b, 21g, and 21r and the scan signal input terminal 6 are electrically connected to each other through the conductive material. The scanning electrodes 21r, 21g, and 21b laid on one another when seen in the normal direction to the substrate surface are shared by the scanning electrode layer-to-layer interconnects 14. In addition, because the scanning electrode layer-to-layer interconnects 14 can be distributed in common with the liquid crystal display panels 3 for R, G, and B, the through holes are formed only in a single line almost in parallel with the data electrodes 23g, not shown.

Because the method of fabricating the multilayer display element according to the embodiment is the same as that of the embodiment 8 described above, except the positions of forming the through holes 61b1, 61b2, 61g1, 61g2, and 61r1, the electrode pattern of the data electrode substrate 11r, and cutting a roll-formed multilayered panel or a sheet-like multilayered panel such that the scan signal input terminals 6 and the data signal input terminals 4 are exposed, the descriptions are omitted.

As described above, according to the embodiment, in the multilayer liquid crystal display element 1, because through wiring can be formed in the non-display area, the similar advantages as those of the embodiment 8 described above can be obtained.

Embodiment 10

A multilayer display element and a method of fabricating the same according to embodiment 10 of the exemplary embodiment will be described with reference to FIGS. 18 and 19. A multilayer liquid crystal display element 1 according to the embodiment is characterized in the shape of a through hole. Because the other configurations of the multilayer liquid crystal display element 1 according to the embodiment are the same as those of the embodiment 8 or 9 described above, except that the shape of a through hole is different, the descriptions are omitted.

Figure 18:
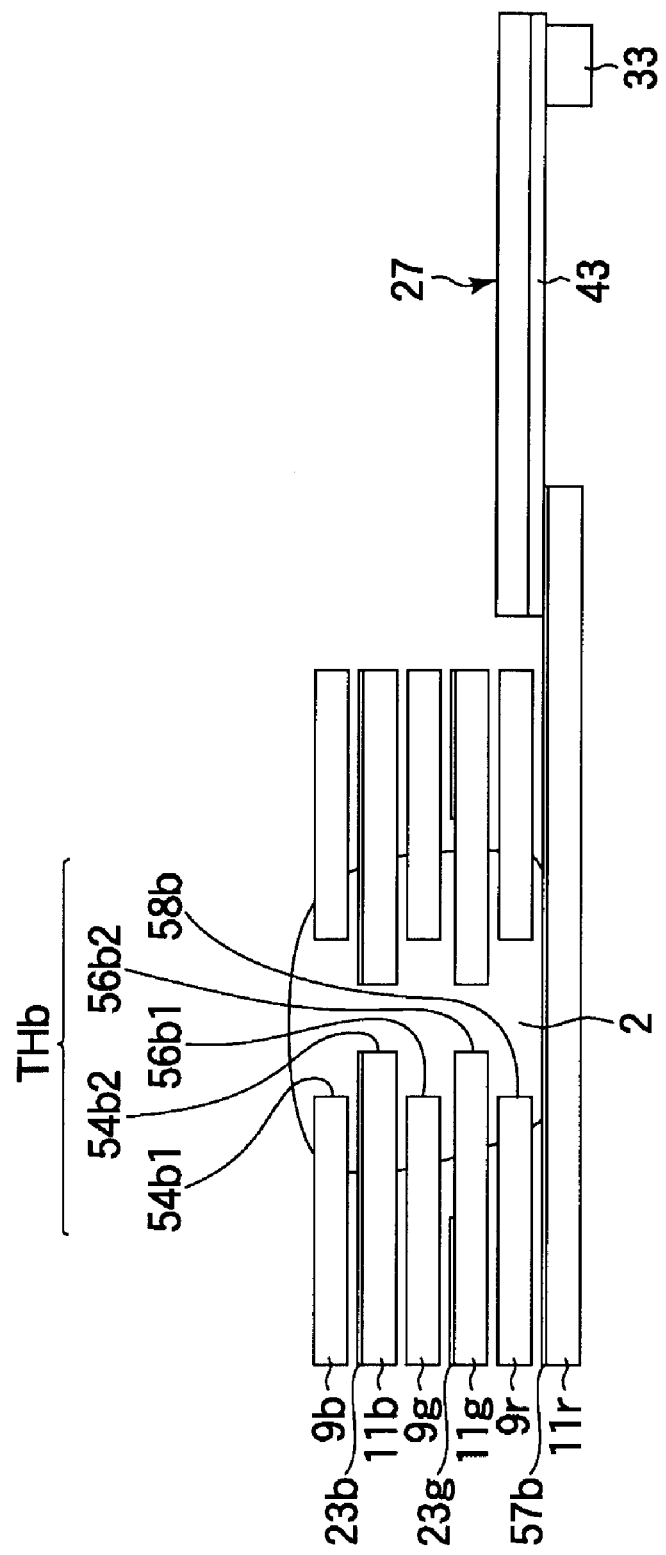
FIG. 18 is a diagram schematically depicting a cross section of a through hole THb of a multilayer liquid crystal display element 1 according to embodiment 10 of an exemplary embodiment.

FIG. 18 schematically shows an exemplary cross section of a through hole THb of the multilayer liquid crystal display element 1 according to the embodiment. In addition, the other through holes THr, THg, and TH shown in the embodiment 9 described above also have the similar configuration as that of the through hole THb. As shown in FIG. 18, the diameters of through holes 54b1 and 54b2 are different in a data electrode substrate 11b and a scanning electrode substrate 9b. For example, the diameter of the through hole 54b1 formed in the scanning electrode substrate 9b is formed longer than the diameter of the through hole 54b2 formed in the data electrode substrate 11b. Thus, a data electrode 23b desired to be electrically connected to a data signal input terminal 4 has a larger exposed area in the through hole THb. Thus, the data electrode 23b has a larger electrical contact area with a data electrode layer-to-layer interconnect 2. Therefore, the occurrence of connection failure between the data electrodes 23b and the data electrode layer-to-layer interconnects 2 can be prevented.

Figure 19:
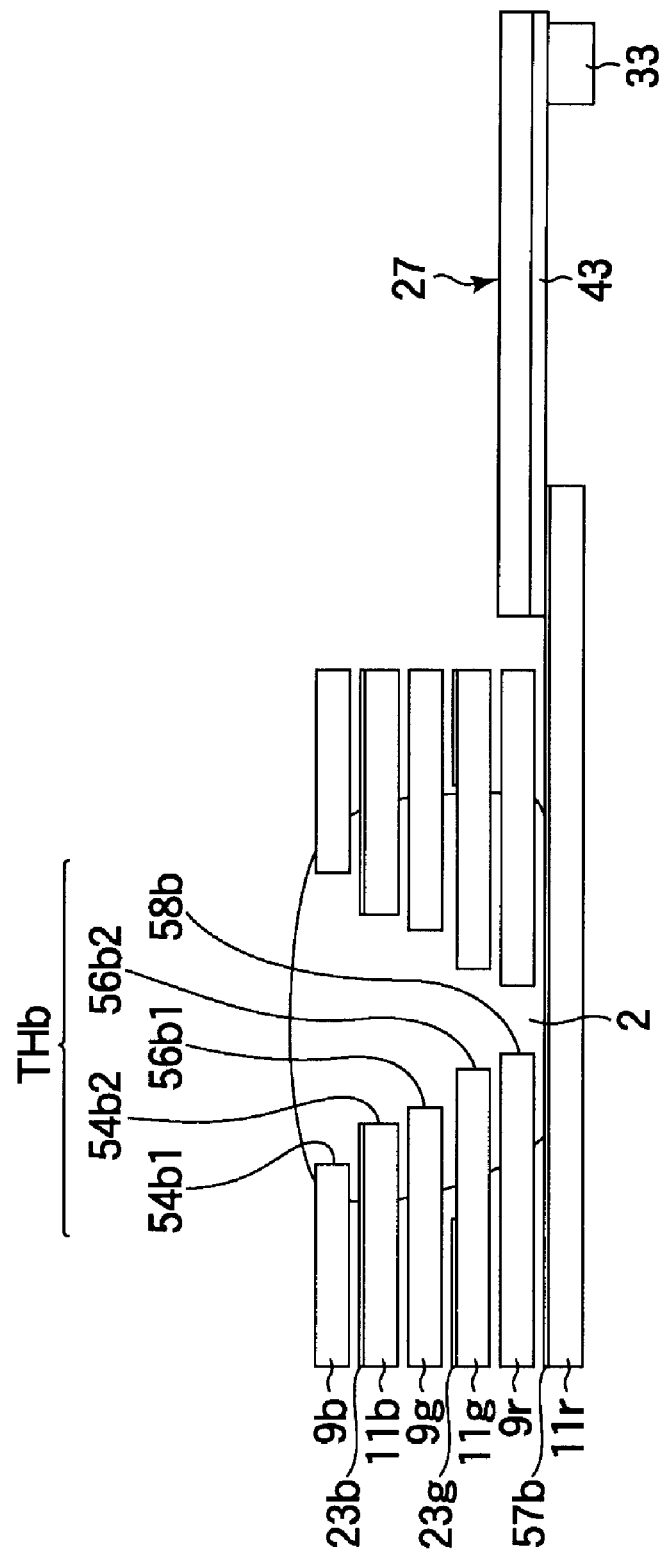
FIG. 19 is a diagram schematically depicting a cross section of a through hole THb of a multilayer liquid crystal display element 1 according to an exemplary modification of the embodiment 10 of an exemplary embodiment.

FIG. 19 schematically shows an exemplary cross section depicting a through hole THb of a multilayer liquid crystal display element 1 according to an exemplary modification of the embodiment. The other through holes THr, THg, and TH shown in the embodiment 9 described above have the similar configuration as that of the through hole THb. As shown in FIG. 19, in the exemplary modification, the diameters of through holes 54b1, 54b2, 56b1, 56b2, and 58b are greater toward the upper layer side (display surface side). The diameters of the through holes are made larger in the electrode substrates 9b, 11b, 9g, 11g, and 9r arranged toward the upper layer side, whereby the spread of conductive paste filled in the through hole THb is improved. In other words, as shown in FIG. 19, data electrode layer-to-layer interconnect 2 are formed in the state in which the conductive paste spreads between the scanning electrode substrates 9b, 9g, and 9r and data electrode substrates. On this account, the data electrodes 23b have a larger electrical contact area with the data electrode layer-to-layer interconnects 2. Thus, the occurrence of connection failure between the data electrodes 23b and the data electrode layer-to-layer interconnects 2 can be prevented.

Because the methods of fabricating the multilayer display element according to the embodiment and the exemplary modification are the same as that of the embodiment 9 described above, except that the through holes are formed before a roll-formed or sheet-like upper film substrate and a roll-formed or sheet-like lower film substrate are bonded together, the descriptions are omitted.

As described above, according to the embodiment, the diameters of the through holes formed in the data electrode substrates and the scanning electrode substrates are varied, whereby the area of the data electrode or the scanning electrode exposed in the through holes can be made larger. Thus, electrical contact between the data electrodes and the data electrode layer-to-layer interconnects, or electrical contact between the scanning electrodes and the scanning electrode layer-to-layer interconnects can be improved. In addition, the diameters of the through holes formed in the electrode substrates in the upper layer are made longer, whereby a conductive material member can spread between the data electrode substrates and the scanning electrode substrates. Therefore, because the conductive material member is stably filled in the through holes, electrical contact between the data electrodes and the data electrode layer-to-layer interconnects or electrical contact between the scanning electrodes and the scanning electrode layer-to-layer interconnects can be improved.

Embodiment 11

A multilayer display element and a method of fabricating the same according to embodiment 11 of the exemplary embodiment will be described with reference to FIGS. 20A to 21E. A multilayer display element according to the embodiment is characterized by providing data electrode layer-to-layer interconnects and scanning electrode layer-to-layer interconnects formed by filling conductive paste in through holes penetrating through liquid crystal display panels for R, G, and B placed in three layers. Furthermore, the multilayer display element is characterized in that an FPC having a liquid crystal drive IC is connected with bumps.

FIGS. 20A to 20E schematically show the vicinity of data electrode layer-to-layer interconnects 2 of a multilayer liquid crystal display element 1 according to the embodiment. FIG. 20A is a cross section schematically depicting the vicinity of the data electrode layer-to-layer interconnects 2 of the multilayer liquid crystal display element 1, FIGS. 20B to 20D are exploded diagrams depicting the multilayer liquid crystal display element 1 exploded, showing plan views depicting liquid crystal display panels 3b, 3g, and 3r for B, G, and R, and FIG. 20E is a plan view depicting the vicinity of data signal output terminals 43 of an FPC 4. In FIGS. 20B to 20D, scanning electrode substrates are omitted in the drawing.

FIGS. 21A to 21E schematically show the vicinity of scanning electrode layer-to-layer interconnects 14 of the multilayer liquid crystal display element 1 according to the embodiment. FIG. 21A is a plan view depicting the vicinity of the scanning electrode layer-to-layer interconnects 14 of the multilayer liquid crystal display element 1, and FIG. 21B is a cross section cut at line A-A in FIG. 21A. FIGS. 21C to 21D are exploded diagrams depicting the multilayer liquid crystal display element 1 exploded, showing plan views depicting the liquid crystal display panels 3b, 3g, and 3r for B, G, and R, respectively. In FIG. 21A, an FPC 28 is omitted in the drawing. In FIGS. 21C to 21E, data electrode substrates 11b, 11g, and 11r are omitted in the drawing.

As shown in FIGS. 20A to 21E, the multilayer liquid crystal display element 1 according to the embodiment has the liquid crystal display panel 3r for R (first display panel) having a plurality of data electrodes 23r, and a plurality of scanning electrodes 21r formed as intersecting with a plurality of the data electrodes 23r, the liquid crystal display panel 3g for G (second display panel) having a plurality of data electrodes 23g, and a plurality of scanning electrodes 21g formed as intersecting with a plurality of the data electrodes 23g, and placed on the liquid crystal display panel 3r for R in layers, and the liquid crystal display panel 3b for B (second display panel) having a plurality of data electrodes 23b, and a plurality of scanning electrodes 21b formed as intersecting with a plurality of the data electrodes 23b, and placed on the liquid crystal display panels 3r and 3g for R and G in layers. A multilayer liquid crystal display panel 3 is configured of the liquid crystal display panels 3r, 3g, and 3b for R, G, and B.

In addition, the multilayer liquid crystal display element 1 has an FPC (data electrode drive circuit board) 47 provided with a plurality of data signal output terminals 44r, 44g, and 44b from which data signals are outputted to drive the data electrodes 23r, 23g, and 23b of the liquid crystal display panels 3r, 3g, and 3b for R, G, and B, an FPC (scanning electrode drive circuit board) 48 provided with a plurality of scan signal output terminals 44 from which scan signals are outputted to drive the scanning electrodes 21r, 21g, and 21b of the liquid crystal display panels 3r, 3g, and 3b for R, G, and B, a plurality of the data electrode layer-to-layer interconnects 2 formed in the non-display area of the liquid crystal display panels 3r, 3g, and 3b for R, G, and B to connect the data electrodes 23r, 23g, and 23b of the liquid crystal display panels 3r, 3g, and 3b for R, G, and B to a plurality of the data signal output terminals 44r, 44g, and 44b from layer to layer, and a plurality of the scanning electrode layer-to-layer interconnects 14 formed in the non-display area to connect the scanning electrodes 21r, 21g, and 21b of the liquid crystal display panels 3r, 3g, and 3b for R, G, and B to a plurality of the scan signal output terminals 44 from layer to layer. Because the configurations of the liquid crystal display panels 3r, 3g, and 3b for R, G, and B are the same as those in the embodiment 1 described above, except that the configurations of the data electrode layer-to-layer interconnects 2 and the scanning electrode layer-to-layer interconnects 14 are different, the descriptions are omitted.

As shown in FIG. 20A, the data electrode layer-to-layer interconnects 2 are formed by filing a conductive material in through holes THr, THg, and THb opened in the multilayer liquid crystal display panel 3. In the back surface of the data electrode substrate 11r of the liquid crystal display panel 3r for R, the data electrode layer-to-layer interconnects 2 are exposed. In the exposed portions of the data electrode layer-to-layer interconnects 2, gold bumps 18, for example, are formed. The FPC 47 is connected to the multilayer liquid crystal display panel 3 through the gold bumps 18. The FPC 47 may be arranged on the liquid crystal display panel 3b for B side, not on the liquid crystal display panel 3r for R side.

As shown in FIG. 20B, the liquid crystal display panel 3b for B has a plurality of lead electrodes 55b connected to a plurality of the data electrodes 23b and lead to the substrate end part when seen in the normal direction to the substrate surface of the data electrode substrate 11b. Almost in the center of the lead electrode 55b, a through hole 54b2 is formed. In addition, the scanning electrode substrate 9b (see FIG. 20A) has a through hole 54b1 formed to be laid on the through hole 54b2 when seen in the normal direction to the substrate surface of the data electrode substrate 11b. The through holes 54b1 and 54b2 have the diameter in almost the same length.

As shown in FIG. 20C, the liquid crystal display panel 3g for G has a plurality of through holes 56b1 and 56b2 formed at the positions laid on a plurality of the through holes 54b1 and 54b2. The through hole 56b1 is formed in the scanning electrode substrate 9g (see FIG. 20A), and the through hole 56b2 is formed in the data electrode substrate 11g. The through holes 56b1 and 56b2 have the diameter in almost the same length. The diameters of the through holes 56b1 and 56b2 are almost the same length as the diameters of the through holes 54b1 and 54b2. The data electrode 23g is formed not to extend to the through holes 56b1 and 56b2. On this account, as described later, even though the data electrode layer-to-layer interconnects 2 are formed, the data electrode 23g is prevented from having a short circuit with the data electrode 23b.

As shown in FIG. 20D, the data electrode substrate 11r has a plurality of connecting terminal wiring parts 57b formed at the positions laid on a plurality of the lead electrodes 55b when seen in the normal direction to the substrate surface of the data electrode substrate 11r. The liquid crystal display panel 3r for R has through holes 58b1 and 58b2 formed at the positions laid on the through holes 54b1, 54b2, 56b1, and 56b2. The through hole 58b1 is formed in the scanning electrode substrate 9r (see FIG. 20A), and the through hole 58b2 is formed in the data electrode substrate 11r. The through holes 58b1 and 58b2 have the diameter in almost the same length. The diameters of the through holes 58b1 and 58b2 are almost the same length as the diameters of the through holes 56b1 and 56b2. The through hole THb is configured of the through holes 54b1, 54b2, 56b1, 56b2, 58b1, and 58b2.

As shown in FIG. 20B, the liquid crystal display panel 3b for B has a plurality of through holes 54g1 and 54g2 formed between a plurality of the data electrodes 23b and a plurality of the lead electrodes 55b when seen in the normal direction to the substrate surface of the data electrode substrate 11b. The through holes 54g1 and 54g2 are formed to be laid on each other when seen in the normal direction to the substrate surface of the same. The through hole 54g1 is formed in the scanning electrode substrate 9b (see FIG. 20A), and the through hole 54g2 is formed in the data electrode substrate 11b. The through holes 54g1 and 54g2 have the diameter in almost the same length. The data electrode 23b is formed not to extend to the through holes 54g1 and 54g2. On this account, as described later, even though the data electrode layer-to-layer interconnects 2 are formed, the data electrode 23b is prevented from having a short circuit with the data electrode 23g.

As shown in FIG. 20C, the liquid crystal display panel 3g for G has a plurality of through holes 56g1 and 56g2 formed at the positions laid on a plurality of the through holes 54g1 and 54g2 when seen in the normal direction to the substrate surface of the data electrode substrate 11g. The through holes 56g1 and 56g2 are formed to be laid on each other when seen in the normal direction to the substrate surface of the same. A plurality of the data electrodes 23g is formed to extend to a plurality of the through holes 56g1 and 56g2. The through hole 56g1 is formed in the scanning electrode substrate 9g (see FIG. 20A). The through hole 56g2 is formed by making an opening in the data electrode 23g of the data electrode substrate 11g. The through holes 56g1 and 56g2 have the diameter in almost the same length. The diameters of the through holes 56g1 and 56g2 are almost the same length as the diameters of the through holes 54g1 and 54g2.

As shown in FIG. 20D, the liquid crystal display panel 3r for R has a plurality of connecting terminal wiring parts 57g arranged between a plurality of the data electrodes 23r and a plurality of the connecting terminal wiring parts 57b. The connecting terminal wiring part 57g is formed on the data electrode substrate 11r. The liquid crystal display panel 3r for R has through holes 58g1 and 58g2 formed at the positions laid on a plurality of the through holes 56g1 and 56g2 when seen in the normal direction to the substrate surface of the data electrode substrate 11r. The through hole 58g1 is formed in the scanning electrode substrate 9r (see FIG. 20A). The through hole 58g2 is formed in the data electrode substrate 11r by making an opening in the connecting terminal wiring part 57g. The through holes 58g1 and 58g2 have the diameter in almost the same length. The diameters of the through holes 58g1 and 58g2 are almost the same length as the diameters of the through holes 56g1 and 56g2. The through hole THg is configured of the through holes 54g1, 54g2, 56g1, 56g2, 58g1, and 58g2.

As shown in FIG. 20B, the liquid crystal display panel 3b for B has a plurality of through holes 54r1 and 54r2 formed in the substrate end part side as adjacent to a plurality of the lead electrodes 55b when seen in the normal direction to the substrate surface of the data electrode substrate 11b. The through holes 54r1 and 54r2 are formed to be laid on each other when seen in the normal direction to the substrate surface of the same. The through hole 54r1 is formed in the scanning electrode substrate 9b (see FIG. 20A), and the through hole 54r2 is formed in the data electrode substrate 11b. The through holes 54r1 and 54r2 have the diameter in almost the same length. The lead electrode 55b is formed not to extend to the through holes 54r1 and 54r2. On this account, as described later, even though the data electrode layer-to-layer interconnects 2 are formed, the data electrode 23b is prevented from having a short circuit with the data electrode 23r.

As shown in FIG. 20C, the liquid crystal display panel 3g for G has a plurality of through holes 56r1 and 56r2 formed at the positions laid on a plurality of the through holes 54r1 and 54r2 when seen in the normal direction to the substrate surface of the data electrode substrate 11g. The through holes 56r1 and 56r2 are formed to be laid on each other when seen in the normal direction to the substrate surface of the same. The through hole 56r1 is formed in the scanning electrode substrate 9g (see FIG. 20A). The through hole 56r2 is formed in the data electrode substrate 11g. The through holes 56r1 and 56r2 have the diameter in almost the same length. The diameters of the through holes 56r1 and 56r2 are almost the same length as the diameters of the through holes 54r1 and 54r2. A plurality of the data electrodes 23g is formed not to extend to a plurality of the through holes 56r1 and 56r2. On this account, as described later, even though the data electrode layer-to-layer interconnects 2 are formed, the data electrode 23g is prevented from having a short circuit with the data electrode 23r.

As shown in FIG. 20D, the liquid crystal display panel 3r for R has a plurality of connecting terminal wiring parts 57r formed on the substrate end part side as adjacent to a plurality of the connecting terminal wiring parts 57b when seen in the normal direction to the substrate surface of the data electrode substrate 11r. The connecting terminal wiring part 57r is connected to the data electrode 23r. The connecting terminal wiring part 57r is formed on the data electrode substrate 11r. The liquid crystal display panel 3r for R has through holes 58r1 and 58r2 formed at the positions laid on a plurality of the through holes 56r1 and 56r2 when seen in the normal direction to the substrate surface of the data electrode substrate 11r. The through hole 58r1 is formed in the scanning electrode substrate 9r (see FIG. 20A). The through hole 58r2 is formed in the data electrode substrate 11r by making an opening in the connecting terminal wiring part 57r. The through holes 58r1 and 58r2 have the diameter in almost the same length. The diameters of the through holes 58r1 and 58r2 are almost the same length as the diameters of the through holes 56r1 and 56r2. The through hole THr shown in FIG. 20A is configured of the through holes 54r1, 54r2, 56r1, 56r2, 58r1, and 58r2.

The data electrode layer-to-layer interconnects 2 are formed by filling a conductive material in the through holes THr, THg, and THb. As shown in FIG. 20A, when a conductive material is filled in the through holes THr, THg, and THb, the conductive material spreads between the data electrode substrates 9b, 9g, and 9r and the scanning electrode substrates 11b, 11g, and 11r. Thus, electrical connections between the data electrodes 23r, 23g, and 23b and the data electrode layer-to-layer interconnects 2 are sufficiently and reliably provided.

As shown in FIGS. 20A and 20E, the FPC 47 has the data signal output terminals 44r, 44g, and 44b formed at the positions laid on the through holes THr, THg, and THb. The data signal output terminals 44r, 44g, and 44b are connected to a liquid crystal drive IC 33 through lead wires 43. The data electrode terminals 44r, 44g, and 44b are connected to the data electrodes 23r, 23g, and 23b, respectively, through the data electrode layer-to-layer interconnects 2. Thus, the liquid crystal drive IC 33 can output data signals corresponding to a displayed image to predetermined data electrodes 23r, 23g, and 23b. In FIG. 20E, to the lead wire 43 arranged at the top in the drawing, G data signals are inputted, to a lead wire 43 adjacent to that lead wire 43, B data signals are inputted, and to a lead wire 43 adjacent to that lead wire 43, R data signals are inputted. Then, in this order, to the lead wires 43, R, G, and B data signals are inputted.

The scanning electrodes 21r, 21g, and 21b are formed as orthogonal to the data electrodes 23r, 23g, and 23b. On this account, the scanning electrode layer-to-layer interconnects 14 are formed in the direction rotated at an angle of 90 degrees with respect to the data electrode layer-to-layer interconnects 2 as the center axis orthogonal to the display surface of the multilayer liquid crystal display element 1 is the rotation axis. The scanning electrodes 21r, 21g, and 21b are formed on the scanning electrode substrates 9r, 9g, and 9b arranged on the display surface side, for example.

As shown in FIG. 21B, the scanning electrode layer-to-layer interconnect 14 is formed by filling a conductive material in the through hole TH opened in the multilayer liquid crystal display panel 3. In the back surface of the data electrode substrate 11r of the liquid crystal display panel 3r for R, the scanning electrode layer-to-layer interconnects 14 are exposed. In the exposed portions of the scanning electrode layer-to-layer interconnects 14, gold bumps 18 are formed, for example. The FPC 48 is connected to the multilayer liquid crystal display panel 3 through the gold bumps 18. The FPC 48 may be arranged on the liquid crystal display panel 3b for B side, not on the liquid crystal display panel 3r for R side.

As shown in FIG. 21C, the liquid crystal display panel 3b for B has a plurality of through holes 61b1 and 61b2 formed to penetrate through the scanning electrode substrate 9b, the scanning electrode 21b, and the data electrode substrate 11b when seen in the normal direction to the substrate surface of the scanning electrode substrate 9b. The through hole 61b1 is formed in the scanning electrode substrate 9b, and the through hole 61b2 is formed in the data electrode substrate 11b. The through holes 61b1 and 61b2 have the diameter in almost the same length, and are formed to be laid on each other when seen in the normal direction to the substrate surface.

As shown in FIG. 21D, the liquid crystal display panel 3g for G has a plurality of through holes 61g1 and 61g2 formed to penetrate through the scanning electrode substrate 9g, the scanning electrode 21g, and the data electrode substrate 11g when seen in the normal direction to the substrate surface of the scanning electrode substrate 9g. The through hole 61g1 is formed in the scanning electrode substrate 9g, and the through hole 61g2 is formed in the data electrode substrate 11g. The through holes 61g1 and 61g2 have the diameter in almost the same length, and are formed to be laid on each other when seen in the normal direction to the substrate surface. In addition, the through holes 61g1 and 61g2 are formed at the positions nearly laid on the through holes 61b1 and 61b2 when seen in the normal direction to the substrate surface. The through holes 61g1, 61g2, 61b1, and 61b2 have the diameter in almost the same length.

As shown in FIG. 21E, the liquid crystal display panel 3r for R has a plurality of through holes 61r1 and 61r2 formed to penetrate through the scanning electrode substrate 9r, the scanning electrode 21r, and the data electrode substrate 11r when seen in the normal direction to the substrate surface of the scanning electrode substrate 9r. The through hole 61r1 is formed in the scanning electrode substrate 9r, and the through hole 61r2 is formed in the data electrode substrate 11r. The through holes 61r1 and 61r2 have the diameter in almost the same length, and are formed to be laid on each other when seen in the normal direction to the substrate surface. The through holes 61r1 and 61r2 are formed at the positions nearly laid on the through holes 61b1, 61b2, 61g1, and 61g2 when seen in the normal direction to the substrate surface. The through holes 61r1 and 61r2 have the diameter almost the same length as that of the through holes 61b1 and 61b2. The through hole TH shown in FIGS. 21A and 21B is configured of the through holes 61b1, 61b2, 61g1, 61g2, 61r1, and 61r2.

The scanning electrode layer-to-layer interconnect 14 is formed by filling a conductive material in the through hole TH. As shown in FIG. 21B, when a conductive material is filled in the through hole TH, the conductive material spreads between the data electrode substrates 9b, 9g, and 9r and the scanning electrode substrates 11b, 11g, and 11r. Thus, the scanning electrodes 21b, 21g, and 21r and the scan signal input terminals 6 are electrically connected to each other through the conductive material. The scanning electrodes 21r, 21g, and 21b laid on one another when seen in the normal direction to the substrate surface are shared by the scanning electrode layer-to-layer interconnects 14.

In the multilayer liquid crystal display element 1 according to the embodiment, the scanning electrode layer-to-layer interconnects 14 are used to electrically connect the scanning electrodes 21r, 21g, and 21b to the scan signal input terminal 6. Thus, the multilayer liquid crystal display element 1 can be configured in which the scan signal input terminals 6 are gathered only on the data electrode substrate 11r.

Next, the method of fabricating the multilayer display element according to the exemplary embodiment will be described with reference to FIGS. 20A to 21E. Because the method of fabricating the multilayer liquid crystal display element 1 according to the embodiment is almost the same as that of the embodiment 8 described above, only different points will be described. In the descriptions below, although the roll-formed panel is taken and described as an example, even a multilayer display element in a sheet-like panel can be fabricated by the similar fabrication method. First, R, G, and B roll-formed panels, on which pluralities of the data electrodes 23r, 23g, and 23b and the scanning electrodes 21r, 21g, and 21b shown in FIGS. 20A to 21E are formed, are placed in layers to form a roll-formed multilayered panel. Subsequently, for example, $CO_2$ laser is used to make openings at predetermined positions on the liquid crystal display panels 3r, 3g, and 3b for R, G, and B placed in layers to form the through holes THr, THg, THb, and TH.

Subsequently, a conductive material member is filled in the through holes THr, THg, THb, and TH to form the data electrode layer-to-layer interconnects 2 and the scanning electrode layer-to-layer interconnects 14. For example, conductive paste is filled in the through holes THr, THg, THb, and TH by an ink jet method, and locally heated and baked by infrared rays. Thus, the liquid crystal display panels 3r, 3g, and 3b for R, G, and B are connected to each other from layer to layer. Subsequently, the gold bumps 18 are formed on the data electrode layer-to-layer interconnects 2 and the scanning electrode layer-to-layer interconnects 14 exposed on the liquid crystal display panel 3r for R side. The gold bumps 18 may be formed after the roll-formed multilayered panel is separately divided and cut. Subsequently, the roll-formed multilayered panel is separately divided and cut into the individual liquid crystal display panels 3r, 3g, and 3b for R, G, and B connected from layer to layer to form the multilayer liquid crystal display panel 3. Subsequently, the FPCs 47 and 48 are compressed and connected to the multilayer liquid crystal display panel 3 with the gold bumps 18. After that, through the similar fabrication processes as those in the embodiment 8 described above, the multilayer liquid crystal display element 1 is completed.

As described above, according to the embodiment, the through holes THr, THg, THb, and TH made openings in all the substrates 9r and 11r, 9g, 11g, 9b, 11b provided in the liquid crystal display panels 3r, 3g, and 3b for R, G, and B can be collectively formed to provide through wiring. On this account, the roll-formed multilayered panel or the sheet-like multilayered panel can be cut into separate multilayer liquid crystal display panes 3 in a single process. In the embodiment 8 described above, because each of the electrode substrates 9r, 9g, 9b, 11g, and 11b is cut smaller than the data electrode substrate 11r, the electrode surface of the data electrode substrate 11r might be damaged in cutting the substrates. In contrast to this, in the embodiment, because all the electrode substrates 9r, 9g, 9b, 11r, 11g, and 11b are cut into the same size, the electrode surface can be prevented from being damaged. In addition, in prior art 2, it is necessary that through holes are provided on each of electrode substrates and the through holes are aligned with each other to lay panels on one another in placing panels in layers. In contrast to this, in the embodiment, such a processing scheme can be adopted that the R, G, and B roll-formed panels are placed in layers and then the through holes are provided. Thus, because it is unnecessary to align through holes with one another, the step of layering the R, G, and B roll-formed panels one another can be made easier.

Embodiment 12

A multilayer display element and a method of fabricating the same according to embodiment 12 of the exemplary embodiment will be described with reference to FIGS. 22A to 25B. A multilayer liquid crystal display element 1 according to the embodiment is characterized in that a data electrode short circuit prevention insulating layer is provided between a plurality of data electrode layer-to-layer interconnects 2 for preventing a short circuit between adjacent data electrodes and a scanning electrode short circuit prevention insulating layer is provided between a plurality of scanning electrode layer-to-layer interconnects 14 for preventing a short circuit between adjacent scanning electrodes.

The multilayer liquid crystal display element 1 according to the embodiments 1 to 11 described above has a problem that layer to layer interconnection failure is likely to occur in the data electrode layer-to-layer interconnects 2 and the scanning electrode layer-to-layer interconnects 14. FIGS. 22A and 22B schematically show the scanning electrode layer-to-layer interconnects 14 formed on the side surface of the multilayer liquid crystal display panel 3 with screen printing. FIG. 22A is a plan view depicting the multilayer liquid crystal display panel 3 seen from the liquid crystal display panel 3b for B side, and FIG. 22B is a side view depicting the multilayer liquid crystal display panel 3 seen from the scanning electrode layer-to-layer interconnects 14 side. In FIG. 22A, for easy understanding, the scanning electrode substrate 9b is shown transparently. In FIG. 22B, the liquid crystal display panel 3r for R is omitted in the drawing.

The substrate thickness of the data electrode substrates 11b and 11g and the scanning electrode substrates 9b and 9g is about 125 μm. The electrode thickness of the data electrodes 23b and 23g is 1 μm or below. The cell gap of the B and G liquid crystal layers 5b and 5g is about 5 μm. Therefore, the distance (the thickness of the air gap) between substrates in the non-display area arranged around the outer region of a sealing material (not shown), in which liquid crystals are not filled, is about 5 μm. The thickness of the adhesive layer 17 is a few micrometers. In addition, the electrode width of the scanning electrode layer-to-layer interconnect 14 is 100 μm to 800 μm, for example, which is varied depending on the resolution of the image area.

As shown in FIGS. 22A and 22B, when conductive paste is coated over the side surface of the multilayer liquid crystal display panel 3, the conductive paste spreads between the electrode substrates 9b and 11b and between the electrode substrates 9g and 11g from the side surface. Thus, because the conductive paste covers the areas of the scanning electrodes 21b and 21g to some extent, the scanning electrodes 21b and 21g can be electrically connected to each other. However, as the scanning electrode layer-to-layer interconnect 14 in the center in the drawing in FIGS. 22A and 22B, it is likely that the conductive material spreads to the adjacent scanning electrodes, and the adjacent scanning electrodes 9b are short-circuited with each other. In addition, when the conductive paste does not spread enough, as the scanning electrode layer-to-layer interconnect 14 on the left side in the drawing in FIG. 22A, it is likely to cause connection failure that the scanning electrode layer-to-layer interconnect 14 is not electrically connected to the scanning electrode 21b. When the air gap between the scanning electrode substrate 9b and the data electrode 11b or the air gap between the scanning electrode substrate 9g and the data electrode 11g is shorter than 5 μm to collapse the space, the conductive material might not enter the air gap. In order to solve these problems, the multilayer display element according to the exemplary embodiment has a configuration in which an insulating wall is arranged around the area of forming a conductive material. Thus, the scanning electrodes are excellently connected to the scanning electrode layer-to-layer interconnects, and the data electrodes are excellently connected to the data electrode layer-to-layer interconnects.

FIGS. 23A and 23B schematically show the essential part of the multilayer liquid crystal display element 1 according to the embodiment. FIG. 23A is a plan view depicting the multilayer liquid crystal display element 1 seen from the liquid crystal display panel 3b for B side, and FIG. 23B is a side view depicting the multilayer liquid crystal display element 1 seen from the scanning electrode layer-to-layer interconnects 14 side. In FIG. 23A, for easy understanding, the scanning electrode substrate 9b is shown transparently. In FIG. 23B, the liquid crystal display panel 3r for R is omitted in the drawing.

As shown in FIGS. 23A and 23B, the multilayer liquid crystal display element 1 has a plurality of insulating walls (scanning electrode short circuit prevention insulating layers) 66 arranged between a plurality of the scanning electrode layer-to-layer interconnects 14 to prevent a short circuit between the adjacent scanning electrodes. The insulating wall 66 has almost the same thickness as the thickness of the liquid crystal layer and the thickness of the air gap. The insulating wall 66 is provided between the data electrode substrate 11b and the scanning electrode substrate 9b and between the data electrode substrate 11g and the scanning electrode substrate 9g. The insulating wall 66 is formed of the same material as that of a wall structure (wall member) for use in maintaining the cell gap of the liquid crystal layer at the same time in the same layer. The insulating wall 66 maintains the cell gap in a predetermined thickness along with the wall structure.

Each of the insulating walls 66 covers a part of the adjacent scanning electrodes 21r, and are arranged between the adjacent scanning electrodes 21r. The insulating wall 66 has the thickness of about 5 μm the same as the thickness of the liquid crystal layer, and has the width equal to or greater than a gap of 5 to 50 μm between the patterns of the adjacent scanning electrodes 21r and 21g.

A roll-formed multilayered panel formed with the insulating walls 66 is prepared, and the multilayered panel is cut as the pattern of the insulating wall 66 is crossed. In the section, the insulating walls 66 and the air gaps appear. Because the scanning electrodes 21b and 21g are exposed in the air gap, conductive paste is distributed and coated along the exposed portions of the scanning electrodes 21b, 21g, and 21r. Then, as shown in FIG. 23A, the conductive paste spreads enough into the air gap. Therefore, connection failure does not occur between the scanning electrodes 21b and 21g and the scanning electrode layer-to-layer interconnects 14 shown in FIG. 22A, or short circuit failure does not occur between the adjacent scanning electrodes 21b and between the adjacent scanning electrodes 21g shown in FIG. 22B. As shown in FIGS. 23A and 23B, in the multilayer liquid crystal display element 1 according to the embodiment, excellent electrical connections can be obtained with no connection failure or short circuit failure. In addition, the similar advantage can be obtained when conductive paste is coated by using an ink jet method.

The liquid crystal display panel 3r for R omitted in FIG. 23B also has an insulating wall in the same configuration as that of the liquid crystal display panels 3g and 3b for G and B. Moreover, the liquid crystal display panels 3r, 3g, and 3b for R, G, and B also have insulating walls (data electrode short circuit prevention insulating layers) having the same configurations and functions as those of the insulating wall 66 on the data electrodes 23r, 23g, and 23b side.

Because the method of fabricating the multilayer liquid crystal display element 1 according to the embodiment is the same as that of the embodiment 8 described above, except that the insulating walls 66 are formed, the descriptions are omitted.

As described above, according to the embodiment, because the multilayer liquid crystal display element 1 has the insulating walls 66, a short circuit between the adjacent data electrodes or a short circuit between the adjacent scanning electrodes can be prevented. Moreover, the multilayer liquid crystal display element 1 can prevent the occurrence of connection failure between the data electrodes and the data electrode layer-to-layer interconnects or the occurrence of connection failure between the scanning electrodes and the scanning electrode layer-to-layer interconnects. Thus, the production yields of the multilayer liquid crystal display element 1 are improved to reduce fabrication costs. Moreover, because the insulating wall 66 functions as the adhesive layer for bonding the data electrode substrate to the scanning electrode substrate, the mechanical strength of the multilayer liquid crystal display element 1 can be improved.

Next, a multilayer liquid crystal display element and a method of fabricating the same according to an exemplary modification of the embodiment will be described with reference to FIGS. 24A to 25B. FIGS. 24A to 25B schematically show the essential part of a multilayer liquid crystal display element 1 according to the exemplary modification. FIG. 24A is a plan view depicting the electrode forming surface of a scanning electrode substrate 9b, and FIG. 24B is a perspective view depicting the electrode forming surface of the scanning electrode substrate 9b. FIG. 25A shows the side surface of the multilayer liquid crystal display element 1 on which scanning electrode layer-to-layer interconnects 14 are formed, and FIG. 25B shows a cross section cut at line A-A in FIG. 25A.

As shown in FIGS. 24A and 24B, insulating walls 66 provided in the multilayer liquid crystal display element 1 according to the exemplary modification are formed in comb teeth. The insulating walls 66 have dead ends on the center side of the scanning electrode substrate 9b. Thus, in the multilayer liquid crystal display element 1, a conductive member is sucked from openings surrounded by the electrode substrates 9b and 11b and the adjacent insulating walls 66 and opened in the side surface of the multilayer liquid crystal display panel 3 by capillary phenomena, and the scanning electrode layer-to-layer interconnects 14 can be formed (see FIG. 25B). In addition, liquid crystal display panels 3r and 3g for R and G also have insulating walls 66 in comb teeth. Not shown in the drawing, the liquid crystal display panels 3r, 3g, and 3b for R, G, and B also have insulating walls 66 in comb teeth on the data electrodes 23r, 23g, and 23b side.

Subsequently, the method of fabricating the multilayer display element according to the exemplary modification will be described with reference to FIGS. 25A and 25B. A roll-formed multilayered panel formed with the insulating walls 66 is cut to form the multilayer liquid crystal display panel 3 such that the insulating walls 66 are exposed. Subsequently, as shown in FIGS. 25A and 25B, a conductive member is sucked from the openings surrounded by the two electrode substrates 9b and 11b and the adjacent insulating walls 66, and then dried and baked. Subsequently, an ACF 8 is formed on the side surface in which the conductive member is exposed, and an FPC 28 is electrically connected to the multilayer liquid crystal display panel 3 through the ACF 8. Subsequently, the FPC 28 is connected to a display control circuit board (not shown), and the multilayer liquid crystal display element 1 is completed.

As described above, according to the exemplary modification, in the multilayer liquid crystal display element 1, capillary phenomena are used to suck the conductive member into the multilayer liquid crystal display panel 3, and the scanning electrode layer-to-layer interconnects 14 and data electrode layer-to-layer interconnects 2 can be formed. On this account, according to the exemplary modification, because it is unnecessary to form the scanning electrode layer-to-layer interconnects 14 and the data electrode layer-to-layer interconnects 2 by using screen printing or ink jet coating, the fabrication processes can be simplified.

Embodiment 13

A multilayer display element and a method of fabricating the same according to embodiment 13 of the exemplary embodiment will be described with reference to FIGS. 26A and 26B. FIGS. 26A and 26B schematically show the essential part of a multilayer liquid crystal display element 1 according to the embodiment. FIG. 26A is a plan view depicting the multilayer liquid crystal display element 1 seen from the liquid crystal display panel 3b for B side, and FIG. 26B is a side view depicting the multilayer liquid crystal display element 1 seen from the scanning electrode layer-to-layer interconnects 14 side. In FIG. 26A, for easy understanding, a scanning electrode substrate 9b is shown transparently. In FIG. 26B, a liquid crystal display panel 3r for R is omitted in the drawing.

As shown in FIGS. 26A and 26B, the multilayer liquid crystal display element 1 according to the embodiment has the scanning electrode layer-to-layer interconnects 14 in a through wiring structure, and insulating walls 66 exerting the similar function as that of the embodiment 12 described above. The multilayer liquid crystal display element 1 according to the embodiment has the insulating walls 66 formed to cover the pattern gap between adjacent scanning electrodes 21b and to surround through holes 61b1. A conductive member filled in a through hole TH spreads around the through hole TH to some extent between the scanning electrode substrate 9b and a data electrode substrate 11b and between the adjacent insulating walls 66. Similarly, the conductive member spreads around the through hole TH to some extent between a scanning electrode substrate 9g and a data electrode substrate 11g and between the adjacent insulating walls 66. On this account, the scanning electrode layer-to-layer interconnects 14 formed by drying the conductive member contact with the scanning electrodes 21b and 21g in a relatively large area. Thus, electrical connections between the scanning electrode layer-to-layer interconnects 14 and the scanning electrodes 21b and 21g are excellent. Moreover, because the insulating walls 66 prevent a short circuit between the adjacent scanning electrodes 21b, the production yields of the multilayer liquid crystal display element 1 can be improved.

Next, the method of fabricating the multilayer liquid crystal display element 1 according to the embodiment will be described. Because the method of fabricating the multilayer liquid crystal display element 1 according to the embodiment is almost the same as that of the embodiment 12 described above, different points will be briefly described. For example, in a process of forming a wall structure for maintaining the cell gap on a roll upper film substrate, insulating walls are formed so as to cover the pattern gap between the adjacent scanning electrodes and to surround the positions of forming through holes. Subsequently, R, G, and B roll-formed panels having the roll upper film substrate and a roll lower film substrate formed with data electrodes bonded together are placed in layers and bonded together to form a roll-formed multilayered panel. Subsequently, the through hole TH is formed almost in the center of each of the scanning electrodes 21b and 21g between the insulating walls 66 with laser, for example. Subsequently, a conductive member is filled in the through hole TH. At this time, as shown in FIGS. 26A and 26B, the conductive member spreads around the through hole TH to some extent. Then, the conductive member is dried to form the scanning electrode layer-to-layer interconnects 14. After that, through the similar fabrication processes as those in the embodiment 8 described above, the multilayer liquid crystal display element 1 is completed.

In the liquid crystal display panel having a cell gap of about 5 μm, the area outside a sealing material is space. In this space, data electrodes and scanning electrode are exposed. On this account, when a paste conductive member is filled in the through hole formed to penetrate through the space, the conductive member sometimes spreads into the space. When this occurs, it is likely that the adjacent data electrodes or the adjacent scanning electrodes have a short circuit caused by the conductive member.

According to the embodiment, the multilayer liquid crystal display element 1 has the insulating walls arranged around the through holes. On this account, the insulating walls can prevent the event that the conductive material is formed across the adjacent data electrodes or across the adjacent scanning electrodes. Thus, the multilayer liquid crystal display element 1 can prevent the occurrence of a short circuit between the data electrodes or a short circuit between the scanning electrodes. In addition, according to the method of fabricating the multilayer liquid crystal display element 1 of the embodiment, the insulating walls can be formed of the same material as that of the wall structure used for maintaining the cell gap in the same layer at the same time. Therefore, according to the embodiment, production yields can be improved with no increase in fabrication man-hours.

Embodiment 14

A multilayer display element and a method of fabricating the same according to embodiment 14 of the exemplary embodiment will be described with reference to FIGS. 27A to 28. A multilayer display element according to the embodiment is characterized in that a metal conductive layer is provided on data electrodes and scanning electrodes in the non-display area. The multilayer display element according to the embodiment has a two-layer wiring structure in which in the non-display area, the data electrode or the scanning electrode is laid on the metal conductive layer.

In the case of side surface wiring in which data electrode layer-to-layer interconnects and scanning electrode layer-to-layer interconnects are formed on the side surface of a multilayer liquid crystal display panel 3, transparent electrodes (data electrodes 23r, 23g, and 23b and scanning electrodes 21r, 21g, and 21b) exposed in the side surface of the multilayer liquid crystal display panel 3 have a film thickness of 1 µm or below. Thus, the multilayer liquid crystal display element 1 has a narrow electrical contact area between the data electrodes 23r, 23g, and 23b and data electrode layer-to-layer interconnects 2 or a narrow electrical contact area between the scanning electrodes 21r, 21g, and 21b and scanning electrode layer-to-layer interconnects 14.

In addition, when the R, G, and B data electrodes 23r, 23g, and 23b are led out, it is necessary that the electrode width of the lead part is made narrow one-third of the electrode width of the display area or below. Because the lead parts are exposed in the side surface of the multilayer liquid crystal display panel 3, the area of the exposed portions become much smaller. Thus, the electrical contact area between the data electrodes 23r, 23g, and 23b and the data electrode layer-to-layer interconnects 2 or the electrical contact area between the scanning electrodes 21r, 21g, and 21b and the scanning electrode layer-to-layer interconnects 14 becomes much narrower. Because the cross sections of the data electrodes 23r, 23g, and 23b and the scanning electrodes 21r, 21g, and 21b are smaller, the resistance of the lead parts is increased.

In the meantime, an active matrix liquid crystal display panel before has an opaque conductive member such as metal for driving pixel TFTs inside the display area. On the other hand, a simple matrix liquid crystal display panel before is not provided with a special metal layer inside and outside the display area. When a simple matrix liquid crystal display panel is used to provide a multilayer wiring structure like the exemplary embodiment, it is necessary that data electrodes or scanning electrodes, which are ITO wire lines, are gathered to narrow the wiring width for forming the lead parts. On this account, a problem arises that only ITO wiring layers are used to cause an increase in the resistance value of wiring. Thus, in the multilayer structure in which simple matrix liquid crystal display panels are placed in layers, such a scheme is required that the wiring width of the gathered area is reduced while the wiring resistance of the data electrode or the scanning electrode is decreased.

Then, metal wire lines are formed on the ITO wiring layer in the gathered area outside the display area. The metal wire lines can have a smaller resistance value than that of ITO wire lines having the same cross section. In addition, because the ITO wire lines in the gathered area are one end parts of the data electrodes or the scanning electrodes, it is incapable of increasing the film thickness of the ITO wire lines. In contrast to this, the metal wire lines can be provided with a thicker film thickness than that of the ITO wire lines as long as the film thickness is equal to or below the thickness of the liquid crystal layer. Thus, the wiring resistance of the metal wire lines can be further reduced in the gathered area. Moreover, when the film thickness of the metal wire lines is increased, the metal wire lines can provide an increased contact area between the data electrode layer-to-layer interconnects and the scanning electrode layer-to-layer interconnects in the side surface wiring structure or through wiring structure. In the descriptions below, a multilayer liquid crystal display element having these metal wire lines and a method of fabricating the same will be described.

Figure 28:
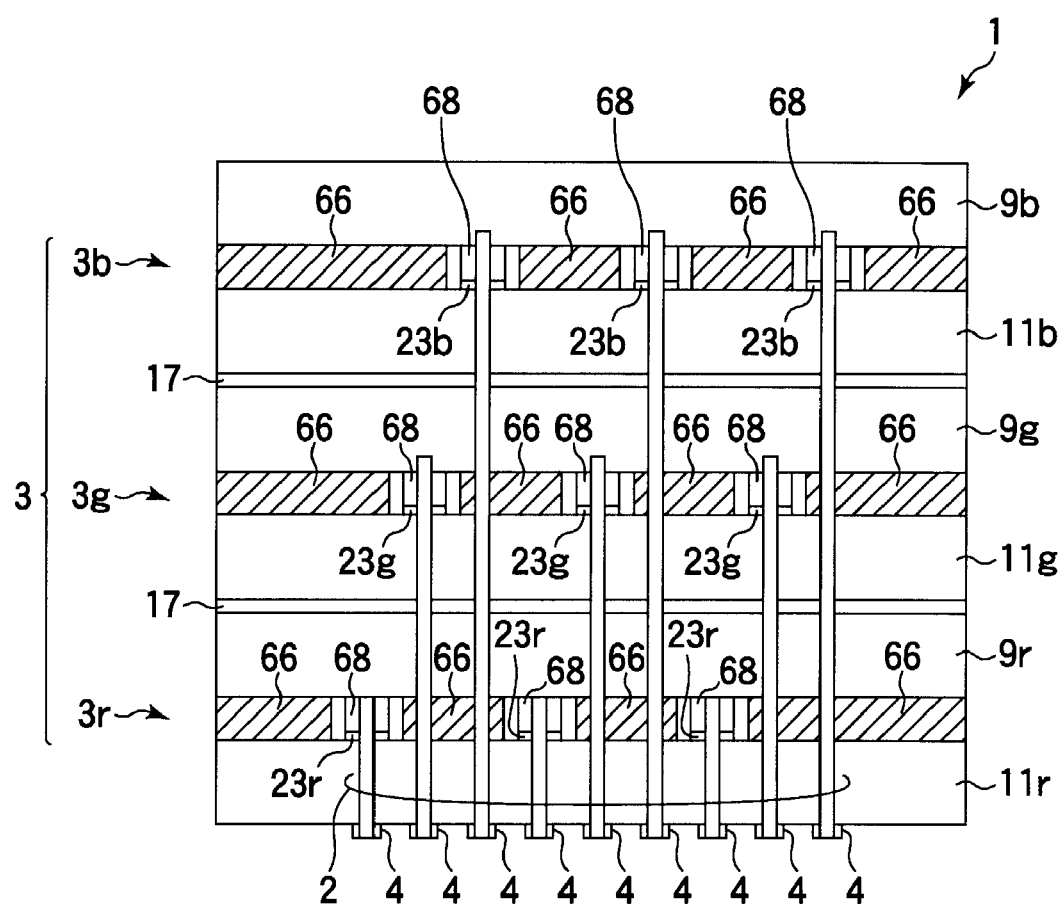
FIG. 28 is a diagram schematically depicting the essential part of the multilayer liquid crystal display element 1 according to the embodiment 14 of an exemplary embodiment.
Figure 29:
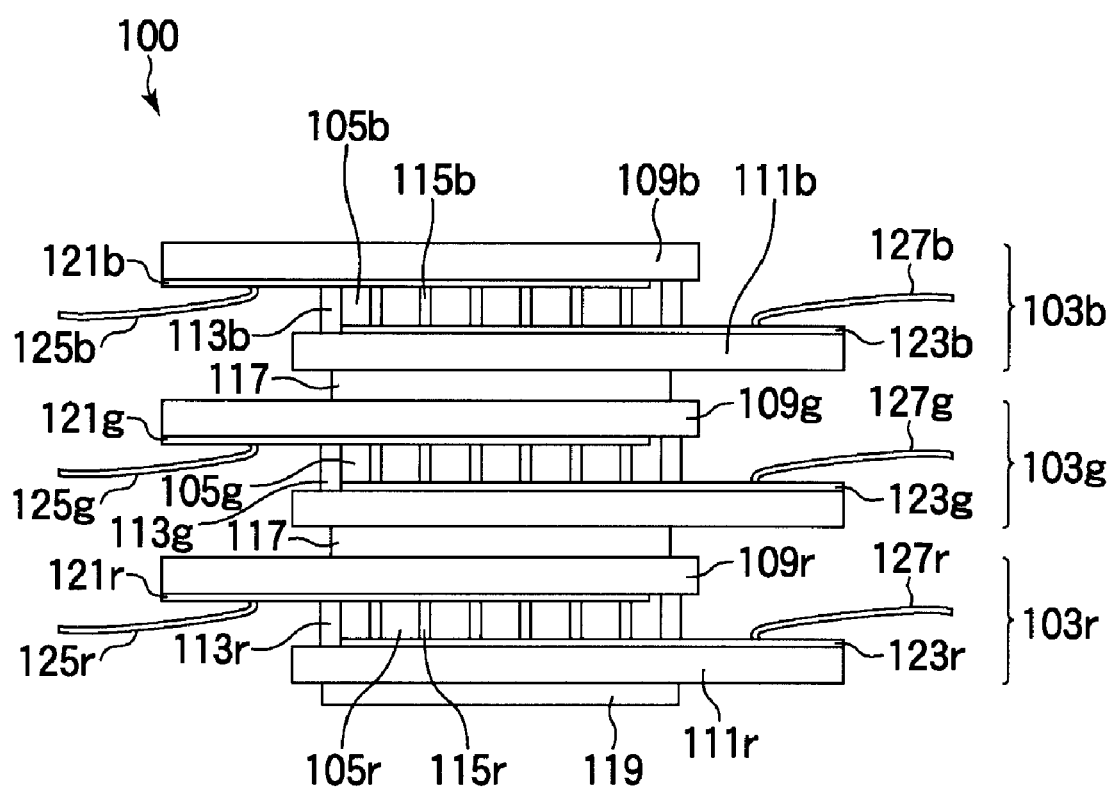
FIG. 29 is a diagram schematically depicting the cross-sectional configuration of a liquid crystal display element 100 before, which is capable of color representation using cholesteric liquid crystals.
Figure 32:
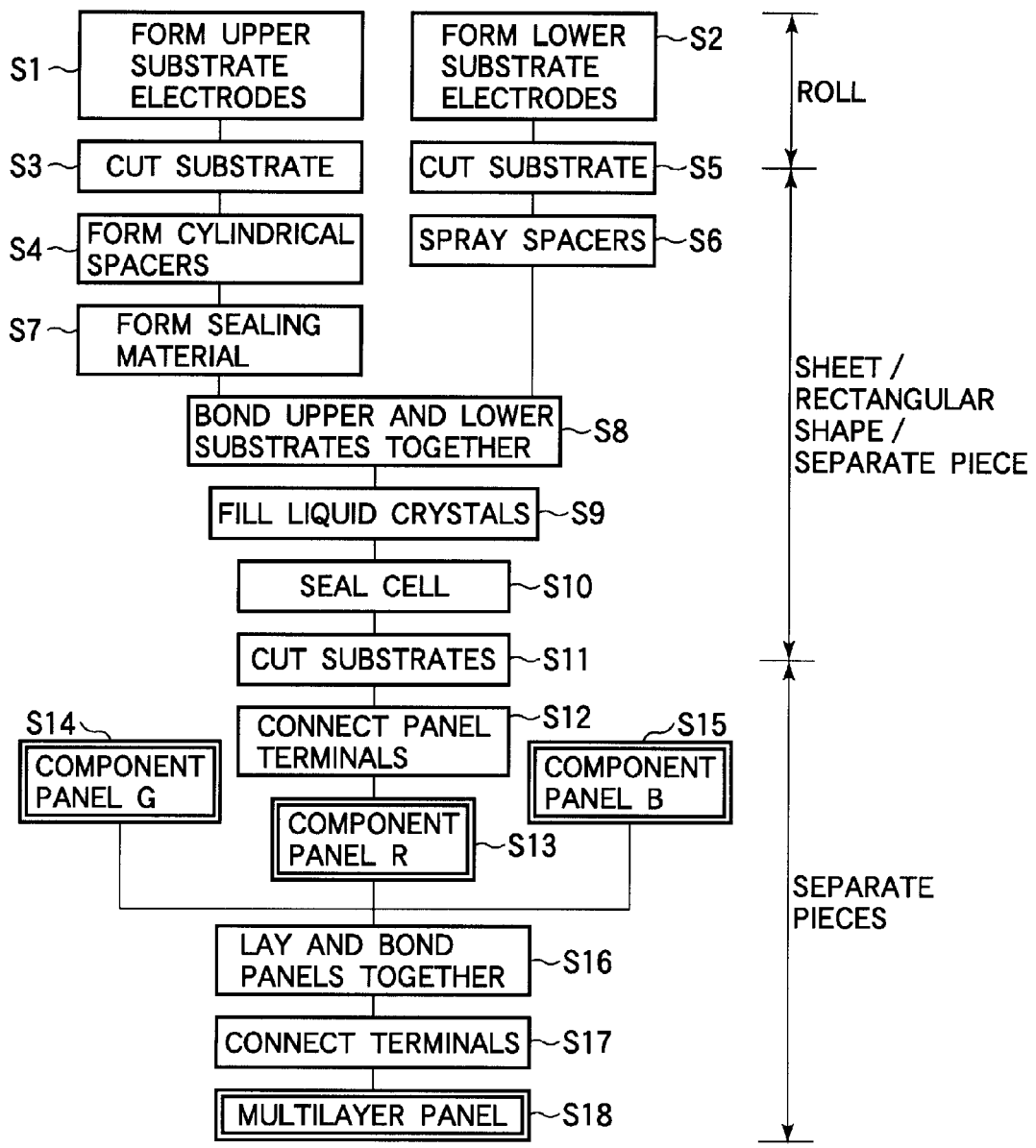
FIG. 32 is a flowchart depicting a fabrication process of the multilayer liquid crystal display element before using film substrates.

FIGS. 27A to 28 schematically show the essential part of the multilayer liquid crystal display element 1 according to the embodiment. FIG. 27A is a plan view depicting a data electrode substrate 11b of the multilayer liquid crystal display element 1, FIG. 27B is an enlarged diagram depicting a part of broken line α shown in FIG. 27A, and FIG. 27C is a cross section cut at line A-A shown in FIG. 27B. FIG. 28 is a side view depicting the multilayer liquid crystal display element 1 in which the data electrode layer-to-layer interconnects 2 are formed.

As shown in FIGS. 27A to 27C and FIG. 28, the multilayer liquid crystal display element 1 according to the embodiment has a metal conductive layer 68 formed on the data electrodes 23r, 23g, and 23b in the non-display area. The metal conductive layer 68 has the thickness almost equal to that of the R, G, and B liquid crystal layers 5r, 5g, and 5b, and has the electrode width almost equal to the data electrodes 23r, 23g, and 23g in the non-display area. The metal conductive layer 68 is a film layer of Ni (nickel)/Cu (copper) having a film thickness of about 4 µm formed on the data electrodes 23r, 23g, and 23b that are transparent electrode layers. The metal conductive layer 68 may be a film layer of Ni/Au (gold) or Ti (titanium)/Cu, in addition to Ni/Cu. Preferably, the film thickness of the metal conductive layer 68 is almost the same as the thickness of the R, G, and B liquid crystal layers 5r, 5g, and 5b. However, the film thickness may be thinner than the thickness of the R, G, and B liquid crystal layers 5r, 5g, and 5b.

In addition, as shown in FIGS. 27A to 27C and FIG. 28, the multilayer liquid crystal display element 1 may have insulating walls 66 for preventing a short circuit between the adjacent data electrodes on both sides of the metal conductive layer 68. As shown in FIG. 28, the metal conductive layer 68 is exposed in the side surface of the multilayer liquid crystal display element 1 in a relatively large area. On this account, the data electrode layer-to-layer interconnects 2, which are formed by coating a conductive material over the metal conductive layer 68 by using an ink jet method, contact with the metal conductive layer 68 in a relatively large area. Thus, the multilayer liquid crystal display element 1 can implement excellent wiring with no connection failure.

Not shown in the drawing, a metal conductive layer in the similar configuration is provided on the scanning electrodes 21r, 21g, and 21b side, whereby the multilayer liquid crystal display element 1 can prevent connection failure between the scanning electrode layer-to-layer interconnects 14 and the scanning electrodes 21r, 21g, and 21b. In addition, even in the data electrode layer-to-layer interconnects and the scanning electrode layer-to-layer interconnects in the through wiring structure as the multilayer liquid crystal display element 1 according to the embodiment 8 to 11 and 13 described above, a metal conductor layer is provided in the lead wiring parts formed with through holes, whereby the film thicknesses of the data electrodes and the scanning electrodes can be substantially thickened. Thus, because in the multilayer liquid crystal display element 1, the electrical contact area between the data electrodes and the data electrode layer-to-layer interconnects or the electrical contact area between the scanning electrodes and the scanning electrode layer-to-layer interconnects is increased, connection failure can be prevented.

Next, the method of fabricating the multilayer display element according to the embodiment will be described. Because the method of fabricating the multilayer liquid crystal display element 1 according to the embodiment is almost the same as that of the embodiment 1 described above, only different points will be described briefly. For example, in preparing the roll lower film substrate, the metal conductive layer 68 is formed by Ni/Cu plating. So-called selective plating can be used in which non plated parts are covered as Cu plating. After that, through the similar fabrication processes as those of the embodiment 1 described above, the multilayer liquid crystal display element 1 is completed. The plating layer may be Ni/Au plating. In addition, the metal conductive layer 68 may be formed by vapor deposition or sputtering.

Although a suitable thickness is provided to the film thickness of the metal conductive layer 68 depending on forming schemes, almost the same thickness is provided as the thickness of the R, G, and B liquid crystal layers 5$r$, 5$g$, and 5$b$, whereby it can be avoided that a burden is put on the strength of the multilayer liquid crystal display panel 3.

As described above, according to the embodiment, because connection failure between the data electrodes 23$r$, 23$g$, and 23$b$ and the data electrode layer-to-layer interconnects or connection failure between the scanning electrodes 21$r$, 21$g$, and 21$b$ and the scanning electrode layer-to-layer interconnects 14 can be prevented, the production yields of the multilayer liquid crystal display element 1 can be improved. Therefore, fabrication costs of the multilayer liquid crystal display element 1 can be reduced.

The invention can be modified variously, not limited to the exemplary embodiment described above.

In the exemplary embodiment described above, as the display element, the liquid crystal display element is taken and described as an example. However, the invention is not limited to this. For example, the invention can be adapted to even an electrophoretic type, twisting ball type, or organic EL display element as long as the display elements have the multilayer structure.

In addition, in the exemplary embodiment described above, the simple matrix liquid crystal display element using cholesteric liquid crystals is taken and described as an example. However, the invention is not limited to this. For example, the invention can be also adapted to an active matrix display element.

The invention can be adapted to layer-to-layer interconnections for a plurality of display elements placed in layers.

What is claimed is:

1. A multilayer display element comprising:
   a first display panel having a first data electrode, a first scanning electrode formed as intersecting with the first data electrode, and at least one of a plurality of data signal input terminals to which a first data signal is inputted for driving the first data electrode and a plurality of scan signal input terminals to which a first scan signal is inputted for driving the first scanning electrode;
   a second display panel having a second data electrode driven by a second data signal, and a second scanning electrode formed as intersecting with the second data electrode and driven by a second scan signal, wherein the second display panel is placed on the first display panel in layers;
   a plurality of data electrode layer-to-layer interconnects formed in a non-display area of the first and second display panels for connecting each of the first and second data electrodes of the first and second display panels to the plurality of the data signal input terminals; and
   a plurality of scanning electrode layer-to-layer interconnects formed in the non-display area for connecting the first and second scanning electrodes of the first and second display panels to the plurality of the scan signal input terminals.

2. The multilayer display element according to claim 1, further comprising:
   a data electrode drive circuit board having a plurality of data signal output terminals from which the first and second data signals are outputted for driving the first and second data electrodes of the first and second display panels; and
   a scanning electrode drive circuit board having a plurality of scan signal output terminals from which the first and second scan signals are outputted for driving the first and second scanning electrodes of the first and second display panels.

3. The multilayer display element according to claim 1, wherein the first and second display panels have a liquid crystal layer showing a reflective state in which light is reflected, a transmissive state in which the light is transmitted, or an intermediate state that is a middle state between the reflective state and the transmissive state, wherein the liquid crystal layers reflect lights in different colors.

4. The multilayer display element according to claim 1, wherein the first and second display panels have first and second data electrode substrates with flexibility on which the first and second data electrodes are formed; and first and second scanning electrode substrates with flexibility on which the first and second scanning electrodes are formed, wherein the first and second scanning electrode substrates are arranged to face the first and second data electrode substrates such that the first and second data electrodes face the first and second scanning electrodes.

5. The multilayer display element according to claim 1, wherein the data electrode layer-to-layer interconnects are formed on a first side surface of the first and second display panels, and the scanning electrode layer-to-layer interconnects are formed on a second side surface different from the first side surface of the first and second display panels.

6. The multilayer display element according to claim 5, wherein the first and second side surfaces are formed to have a slope.

7. The multilayer display element according to claim 5, wherein the first side surface has a first interconnect forming groove for forming the data electrode layer-to-layer interconnect, and the second side surface has a second interconnect forming groove for forming the scanning electrode layer-to-layer interconnect.

8. The multilayer display element according to claim 4, wherein the data electrode layer-to-layer interconnects and the scanning electrode layer-to-layer interconnects are formed to penetrate through at least one of the first and second data electrode substrates and the first and second scanning electrode substrates.

9. The multilayer display element according to claim 8, wherein the data electrode layer-to-layer interconnects and the scanning electrode layer-to-layer interconnects are formed by filling a conductive material in through holes opened in at least one of the first and second data electrode substrates and the first and second scanning electrode substrates.

10. The multilayer display element according to claim 9, wherein the diameters of the through holes are different between the first and second data electrode substrates and the first and second scanning electrode substrates.

11. The multilayer display element according to claim 9, wherein the diameters of the through holes are larger toward a display surface, and wherein the display surface is orthogonal to a first and second side surface of the first and second display panels.

12. The multilayer display element according to claim 5, wherein the first and second display panels have a plurality of the first and second data electrodes and a plurality of the first and second scanning electrodes, respectively, and wherein the multilayer display element further comprises a data electrode short circuit prevention insulating layer for preventing a short circuit between adjacent the first data electrodes and a short circuit between adjacent the second data electrodes; and a scanning electrode short circuit prevention insulating layer for preventing a short circuit between adjacent the first scanning electrodes, and a short circuit between adjacent the second scanning electrodes.

13. The multilayer display element according to claim 12, wherein the first and second display panels have first and second data electrode substrates with flexibility on which the first and second data electrodes are formed; and first and second scanning electrode substrates with flexibility on which the first and second scanning electrodes are formed, wherein the first and second scanning electrode substrates are arranged to face the first and second data electrode substrates such that the first and second data electrodes face the first and second scanning electrodes; and the data electrode short circuit prevention insulating layer and the scanning electrode short circuit prevention insulating layer have almost the same thickness as the thickness of a liquid crystal layer, and are arranged between the first data electrode substrate and the first scanning electrode substrate and between the second data electrode substrate and the second scanning electrode substrate, respectively.

14. The multilayer display element according to claim 4, wherein the first and second display panels have a metal conductive layer formed on the first and second data electrodes and the first and second scanning electrodes in the non-display area.

15. The multilayer display element according to claim 14, wherein the thickness of the metal conductive layer is almost equal to the thickness of a liquid crystal layer.

16. The multilayer display element according to claim 14, wherein the metal conductive layer is a film layer made of copper, nickel, titanium, or gold.

\* \* \* \* \*